United States Patent
Harris et al.

(10) Patent No.: US 12,332,455 B2
(45) Date of Patent: Jun. 17, 2025

(54) WEARABLE NEAR-TO-EYE VISION SYSTEMS

(71) Applicant: Gentex Corporation, Zeeland, MI (US)

(72) Inventors: Mark Harris, Woodlawn, CA (US); Evan Fitzpatrick, Winnipeg (CA); Mehdi Arezmoomand Ershadi, Ottawa (CA); Mukesh Kumar, Ottawa (CA); James Benson Bacque, Ottawa (CA); Charles Lim, Vaughan (CA); Gurpreet Singh, Kanata (CA); Krishna Balekai, Stittsville (CA); Rod Batterton, Kanata (CA); Phong Lieu, Ottawa (CA); Jon Pawson, Ottawa (CA)

(73) Assignee: GENTEX CORPORATION, Zeeland, MI (US)

( * ) Notice: Subject to any disclaimer, the term of this patent is extended or adjusted under 35 U.S.C. 154(b) by 964 days.

(21) Appl. No.: 17/306,516

(22) Filed: May 3, 2021

(65) Prior Publication Data
US 2021/0349322 A1   Nov. 11, 2021

Related U.S. Application Data

(60) Provisional application No. 63/018,747, filed on May 1, 2020.

(51) Int. Cl.
*G02B 27/01* (2006.01)
*G02C 5/22* (2006.01)
(Continued)

(52) U.S. Cl.
CPC ..... *G02B 27/0176* (2013.01); *G02B 27/0172* (2013.01); *G02C 5/2272* (2013.01);
(Continued)

(58) Field of Classification Search
CPC ............ G02B 27/0149; G02B 27/0176; G02B 2027/015; G02B 2027/0152;
(Continued)

(56) References Cited

U.S. PATENT DOCUMENTS

| 2002/0008677 A1* | 1/2002 | Saito | G02B 27/0176 345/8 |
| 2006/0238878 A1* | 10/2006 | Miyake | G02B 27/0176 348/E5.145 |

(Continued)

FOREIGN PATENT DOCUMENTS

WO   WO-2020219005 A1 * 10/2020

*Primary Examiner* — Henry Duong
(74) *Attorney, Agent, or Firm* — Price Heneveld LLP; Brian James Brewer

(57) ABSTRACT

Users exploiting near-to-eye (NR2I) displays for augmented reality and/or correction of low vision are typically wearing these NR2I displays for specific tasks or for extended periods of time, potentially all their time awake. Conflicting tradeoffs between user comfort and minimal fatigue and strain during use, ease of attachment, minimizing intrusiveness and aesthetics should be concurrently balanced with providing an optical vision system that provides the user with a wide field of view, high image resolution, and a large exit pupil for eye placement with sufficient eye clearance. Accordingly, embodiments of the invention provide NR2I displays meeting these conflicts whilst also addressing the inherent variations between user in respect of their head dimensions, head and eye geometry, as well as adapting the displayed content to reflect the user's task at-hand, visual defects or degradations, visual focus and intent upon various regions-of-interest within their field of view. Such HMDs providing enhanced user experiences.

26 Claims, 41 Drawing Sheets

(51) Int. Cl.
  *G02C 11/00* (2006.01)
  *H04L 67/10* (2022.01)
  *H04L 67/55* (2022.01)
(52) U.S. Cl.
  CPC .............. *G02C 11/10* (2013.01); *H04L 67/10* (2013.01); *H04L 67/55* (2022.05); *G02B 2027/0132* (2013.01); *G02B 2027/014* (2013.01); *G02B 2027/0178* (2013.01)
(58) Field of Classification Search
  CPC .... G02B 2027/0154; G02B 2027/0156; G02B 2027/0159; G02B 2027/0165; G02B 27/0172; G02B 2027/0132; G02B 2027/014; G02B 2027/0178; G02C 5/00; G02C 11/00; G02C 5/2272; G02C 11/10; G02C 5/2263; G02C 11/08; H04L 67/10; H04L 67/55; H04L 63/083; H04L 67/34
  USPC ......................................................... 359/632
  See application file for complete search history.

(56) References Cited

U.S. PATENT DOCUMENTS

| | | | |
|---|---|---|---|
| 2014/0009845 A1* | 1/2014 | Cheng ................. | G02B 17/006 359/720 |
| 2015/0033365 A1* | 1/2015 | Mellor ................. | G06F 8/71 726/29 |
| 2015/0316773 A1* | 11/2015 | Tazbaz ............... | G02B 27/0176 359/630 |
| 2017/0323615 A1* | 11/2017 | Hazra ................. | G06T 11/60 |
| 2018/0045964 A1* | 2/2018 | Jones ................. | G02B 27/0172 |
| 2018/0373038 A1* | 12/2018 | Ishii ................. | G02B 27/48 |

* cited by examiner

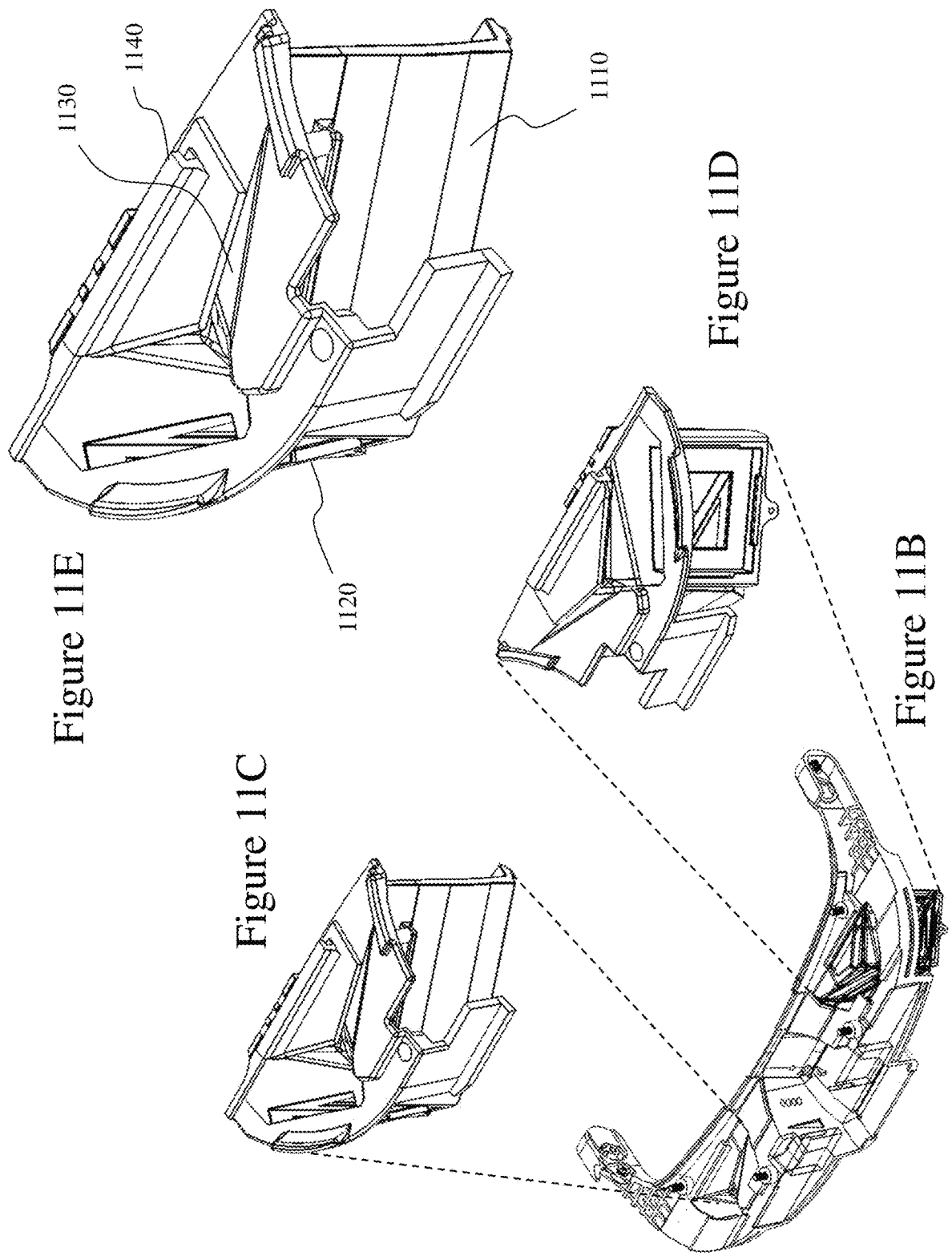

Figure 19: HMD Hardware

WEARABLE NEAR-TO-EYE VISION SYSTEMS

FIELD OF THE INVENTION

This invention relates to wearable near-to-eye (NR2I) vision systems and more particularly to providing wearable NR2I vision systems with enhanced performance for users. Specifically, NR2I vision systems with a wide field of view, high image resolution, low latency, large exit pupil for eye placement, enhanced eye clearance are provided in combination with ergonomic design and advanced automated features to provide NR2I vision systems with enhanced adaptation for a user's physical profile together with improved comfort, performance and usability.

BACKGROUND OF THE INVENTION

Wearable near-to-eye (NR2I) vision systems or NR2I displays are a class of wearable device that creates a display in front of the user's field of vision from an electronic display. The display may be transparent such that the viewer can view the external world and the projected electronic display simultaneously or opaque wherein the viewer may directly view the electronic display or a projected electronic display, depending on the application. For example, a transparent display can overlay information and graphics on top of a real-world image, while an opaque display can provide an immersive theater-like experience. Further NR2I displays may provide information within the full visual field of view of the user or may alternatively provide information within part of the user's field of view.

NR2I displays can be broadly placed in two categories, immersive and see-through. Immersive NR2I displays block a user's view of the real world and create a large field of view image, typically 30°-60° for cinema glasses and 90° or more for virtual reality displays. See-through NR2I displays leave the user's view of the real world open and create either a transparent image or a small opaque image that blocks only a small portion of the user's peripheral vision. The see-through category can be further broken down into two applications, augmented reality and smart glasses. Augmented reality headsets typically offer 20°-60° fields of view and overlay information and graphics on top of the user's view of the real world. Smart glasses in contrast typically have a smaller field of view and a display which the user glances at periodically rather than looking through the display continuously.

For users exploiting NR2I displays for augmented reality and/or correction of low vision, then the user is typically either going to wear the NR2I displays for specific tasks, for specific visual environments, etc. and hence there is an issue of repeatedly attaching and removing the NR2I display or they are going to be wearing the NR2I display for extended periods of time, potentially all their time awake. Accordingly, the majority of applications irrespective of whether they are for short-term, long-term, low vision, augmented reality, etc. yield a conflicting set of tradeoffs between user comfort and minimal fatigue and strain during use, ease of attachment, minimizing intrusiveness and aesthetics which should be concurrently balanced with and are often in conflict with providing an optical vision system within the NR2I display that provides the user with a wide field of view and high image resolution whilst also offering a large exit pupil for eye placement with sufficient eye clearance. Further, individual users' needs vary between users, and vary both with the user's head and eye geometry, the general task at-hand and with a user's visual focus and intent upon various regions-of-interest within their field of view. Accordingly, it would be beneficial to provide NR2I systems that address these issues and provide a high performance optical system within an advance in the field of head-mounted displays and NR2I systems to provide an eyepiece design and system features which overcome these limitations. Herein we describe systems and methods that allow for an improved user experience when using NR2I HMDs.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to wearable near-to-eye (NR2I) vision systems and more particularly mitigating limitations within the prior art relating to providing wearable NR2I vision systems with enhanced performance for users, more reliable system operation, and improved network and cloud connectivity. Specifically, embodiments of the invention provide NR2I vision systems with a wide field of view, high image resolution, low latency, large exit pupil for eye placement, enhanced eye clearance in combination with ergonomic design and advanced automated software and hardware features to provide NR2I vision systems with enhanced adaptation for a user's physical characteristics together with improved comfort, performance and usability.

In accordance with an embodiment of the invention there is provided a near-to-eye (NR2I) head-mounted display (HMD) system comprising:
a frame configured to encompass a head of a user;
a first temple arm attached at a first end to a first side of the frame and configured to project forward along a first side of the head of the user;
a second temple arm attached at a first end to a second side of the frame opposite the first side of the frame and configured to project forward along a second side of the head of the user opposite to the first side of the head of the user; and
a display assembly attached at a first location to a second distal end of the first temple arm with a first universal joint and at a second location to a second distal end of the second temple arm with a second universal joint; wherein
each of the first universal joint and the second universal joint provide for motion in two degrees of freedom with respect to the head of the user;
a first degree of freedom of the two degrees of freedom is rotational motion within a sagittal plane of the user;
the second degree of freedom of the two degrees of freedom is rotational motion within an axial plane of the user; and
each of the first universal joint and the second universal joint are located proximal a first temple and a second temple of the user respectively when worn by the user.

In accordance with an embodiment of the invention there is provided a removable battery subsystem for powering a host comprising
at least one or more cells for storing electrical charge;
an output element;
a processor; and
an inertial sensor; wherein
the processor establishes motion of the removable battery subsystem through indications or measurements acquired from the inertial sensor and generates an output with the output element in dependence upon a state of charge of the one or more cells.

In accordance with an embodiment of the invention there is provided a near-to-eye (NR2I) head-mounted display (HMD) comprising:

a processor for executing software comprising instructions stored upon one or more non-volatile, non-transitory storage media; wherein the software when executed by the processor comprises:
an operating system layer;
an HMD-specific service layer comprising a plurality of HMD-specific services; and
an HMD application-layer comprising a plurality of HMD applications; wherein
the HMD-specific service layer provides the plurality of HMD-specific services to the plurality of HMD applications via one or more application programming interfaces; and
each HMD application of the plurality of HMD applications is isolated from the remaining HMD applications of the plurality of HMD applications; and
each HMD application of the plurality of HMD applications is isolated from the plurality of HMD-specific services.

In accordance with an embodiment of the invention there is provided a near-to-eye (NR2I) head-mounted display (HMD) system comprising:

a frame configured to encompass a head of a user;
a first temple arm attached at a first end to a first side of the frame and configured to project forward along a first side of the head of the user;
a second temple arm attached at a first end to a second side of the frame opposite the first side of the frame and configured to project forward along a second side of the head of the user opposite to the first side of the head of the user; and
a display assembly attached at a first location to a second distal end of the first temple arm with a first universal joint and at a second location to a second distal end of the second temple arm with a second universal joint; wherein
each of the first universal joint and the second universal joint are located proximal a first temple and a second temple of the user respectively when worn by the user.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 11B depicts an optical sub-assembly portion of the display portion of the NR2I HMD according to an embodiment of the invention;

FIGS. 11C and 11D depict the right and left eye optical pods forming part of the optical sub-assembly portion of the display portion of the NR2I HMD according to an embodiment of the invention;

FIGS. 11E and 12A depict detailed views of an optical pod according to the designs depicted in FIGS. 11B and 11C respectively;

DETAILED DESCRIPTION

Figure 1:
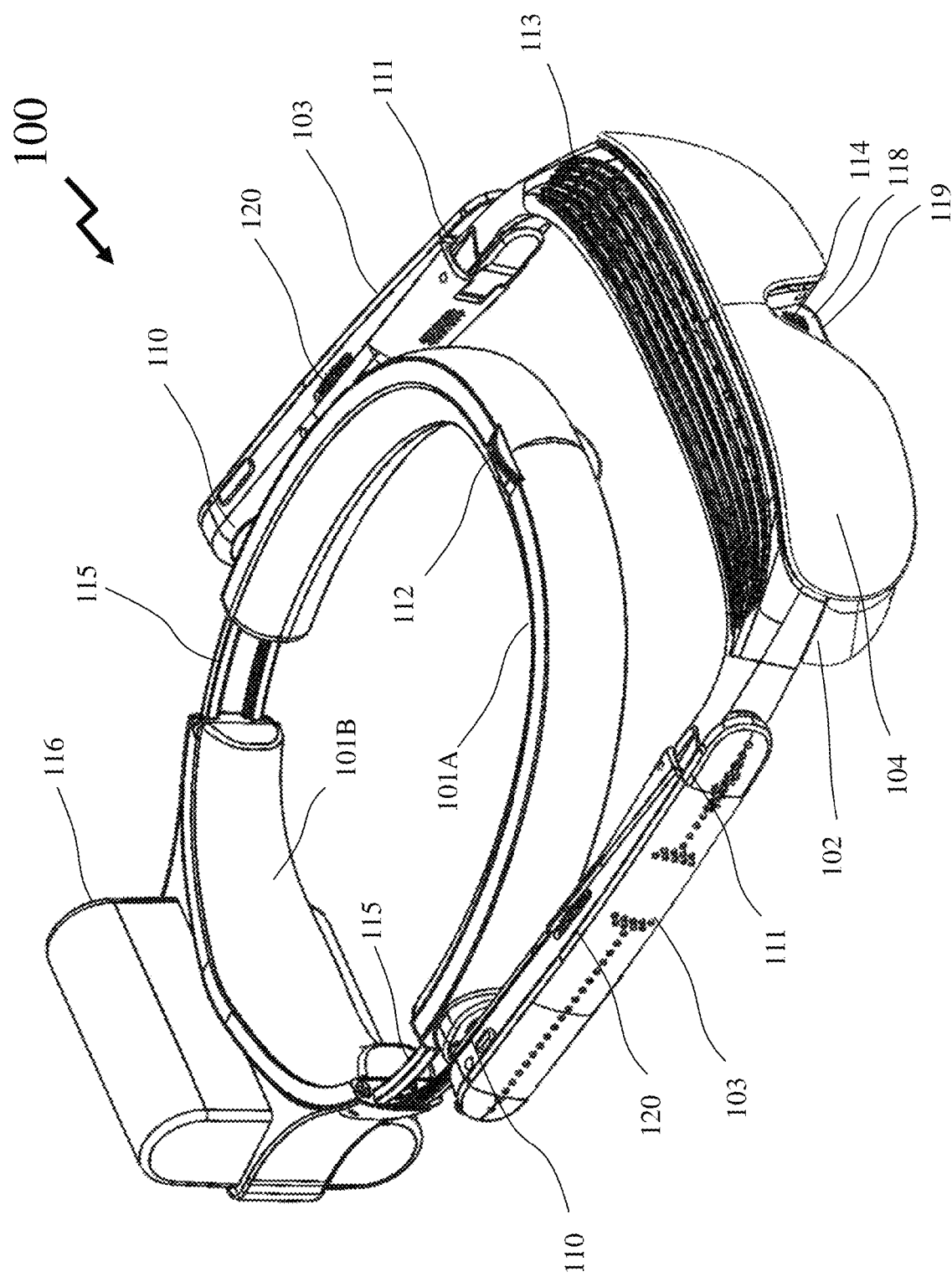
FIG. 1 depicts a near-to-eye (NR2I) head mounted display (HMD) based vision system according to an embodiment of the invention.

The present invention is directed to wearable near-to-eye (NR2I) vision systems and more particularly to providing wearable NR2I vision systems with enhanced performance for users. Specifically, NR2I vision systems with a wide field of view, high image resolution, low latency, large exit pupil for eye placement, enhanced eye clearance are provided in combination with ergonomic design and advanced automated and security features to provide NR2I vision systems with enhanced adaptation for a user's physical profile comfort, performance and usability.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when employed herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "near-to-eye head-mounted display" system (NR2I HMD, HMD, NR2I display or simply NR2I system or NR2I vision system) as employed herein and throughout this disclosure refers to a wearable device that incorporates an image presentation device operating in conjunction with a microprocessor such that a predetermined portion of an image may be presented to the user on the image presentation device (NR2I display). The image presentation device is typically an LCD display, LED display, or OLED display although any display generation device capable of being mounted and supported as part of a NR2I may be considered. As noted supra a NR2I may be configured as immersive, wherein the user views the display absent any direct external visual view, or non-immersive, wherein the user views the display with direct external visual view. Configurations of NR2I and their associated NR2I display may include immersive with direct viewer viewing of NR2I display, immersive with indirect viewer viewing of NR2I display through an intermediate optical assembly, non-immersive with direct viewer viewing of NR2I display which is substantially transparent, immersive with indirect viewer viewing of NR2I display through an intermediate optical assembly. Optical sub-assemblies for indirect viewer viewing of the NR2I display may employ the NR2I display to the sides of the viewer's head or above the viewers eyeline. Non-immersive configurations may employ a non-transparent display or optical assembly where the display presents to a smaller field of view than the user's full field of view or is within their peripheral vision such that it does not overlay the central portion of their field of view.

A NR2I may be monocular or binocular. A NR2I display may be fixed, i.e. when worn it is in a fixed configuration relative to the user's head, or bioptic, i.e. when worn it allows the user to vary the NR2I configuration relative to their head in two (2), three (3), or more predetermined positions and/or may be continuously or pseudo-continuously variable. In some instances, the NR2I may pivot automatically between positions based upon user's head position or it may be moved manually etc. The NR2I display may be mounted to a frame worn by the user that simply supports the NR2I display or the frame may include one or two lenses, prescription lenses, filters, polarizing elements, photochromic elements, electrochromic elements, etc. The NR2I display may be fixed to the frame or demountably attached to the frame. The NR2I display may include additional elements such as electronics, one or more cameras, one or more user interface devices (audio or physical/tactile) one or more optical emitters, one or more wireless interfaces, one or more wired interfaces, and one or more batteries.

A NR2I display may present an image to the user which may be acquired from one or more cameras also forming part of the NR2I or a camera associated with the user such as through a remotely connected camera for example. Alternatively, the image(s)—video content may be acquired from a portable electronic device, a fixed electronic device, a cable set-top box, satellite set-top box, or any video or image source. The image presented to the user may be as directly acquired, processed to fit display, etc. or aligned to elements within the field of view based upon image processing such that, for example, a schematic overlay may be aligned to a circuit being worked upon by the user. A NR2I HMD may provide information to a single eye of a user, a monoscopic display or system, or to both eyes of a use, a stereoscopic display or system. The image presented to the user may be processed by a processor associated with the NR2I HMD in order to enhance the user's visual processes by, for example, processing the image to address one or more visual defects of the user, augmenting aspects of the image and modifying or replacing portions of the image. Within other embodiments of the invention the image may be processed to augment/enhance the visual perception of the user.

An NR2I display may include a microprocessor together with any other associated electronics including, but not limited to, memory, user input device, gaze tracking, inertial sensors, context determination, graphics processor, and multimedia content generator may be integrated for example with the NR2I, form part of an overall assembly with the NR2I, form part of the PED, or as discrete unit wirelessly connected to the NR2I and/or PED. Accordingly, for example, the NR2I displays may be coupled wired or wirelessly to the user's PED whereas within another embodiment the NR2I may be self-contained.

A "freeform optical element" as employed herein and through this disclosure refers to, but is not limited to, an optical element such as a lens, prism, mirror, etc. which exploits one or more freeform optical surfaces.

A "freeform optical surface" as employed herein and through this disclosure refers to, but is not limited to, an optical surface that is by design non-rotationally symmetric and/or has non-symmetric features. These surfaces leverage a third independent axis, the C-axis from traditional diamond turning terminology, during the creation process to create these optical surfaces with as designed non-symmetric features.

A "wearable device" or "wearable sensor" as employed herein and through this disclosure refers to, but is not limited to, miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, smart glasses, head-mounted displays, environmental sensors, medical sensors, biological sensors, physiological sensors, chemical sensors, ambient environment sensors, position sensors, and motion sensors.

A "wearer", "user" or "patient" as employed herein and through this disclosure refers to, but is not limited to, a person or individual who uses the NR2I. This may be a patient requiring visual augmentation to fully or partially overcome a vision defect or an ophthalmologist, optometrist, optician, or other vision care professional preparing a NR2I for use by a patient. A "vision defect" as employed herein may refer to, but is not limited, a physical defect within one or more elements of a user's eye, a defect within the optic nerve of a user's eye, a defect within the nervous system of the user, a higher order brain processing function of the user's eye, and an ocular reflex of the user. A "wearer" or "user" may also be an individual with healthy vision, using the NR2I in an application other than for the purposes of ameliorating physical vision defects. Said applications could include, but are not necessarily limited to gaming, augmented reality, night vision, computer use, viewing movies, environment simulation, training, remote-assistance, etc. Augmented reality applications may include, but are not limited to, medicine, visual assistance, engineering, aviation, training, remote-assistance, tactical, gaming, sports, virtual reality, environment simulation, and data display.

A "server" as employed herein, and throughout this disclosure, refers to either one or more physical computers co-located and/or geographically distributed running one or more services as a host to users of other computers, PEDs, FEDs, etc. to serve the client needs of these other users, or to a server-process executing upon a processor. This includes, but is not limited to, a database server, file server, mail server, print server, web server, gaming server, or virtual environment server. A single physical server may support many different servers, one for HTTP, one for database, etc. A server may reside in a PED, FED, an HMD, or in an internet or intranet or cloud service provider network.

A "service" as employed herein may refer to, but is not limited to, a software process executing upon a processor that may be accessed using an application programming interface by one or more service clients which access the service to perform one or more tasks for them. The service may execute upon a dedicated server, virtual server or upon a device such as a PED, FED, or HMD. "Services" may, within embodiments of the invention, present their application programming interfaces (APIs) over networks and network protocols such as HTTP(S) Representation State Transfer (REST).

A "mini-service" or "micro-service" as employed herein may refer to, but is not limited to, a service which is executing in a dedicated embedded environment such as an HMD, for example, or upon a server. Within embodiments of the invention, for example, an HMD-embedded "microservice" may present one or more internal APIs using, for example, operating-system messaging mechanisms or native-language (for example the C++ or java languages) methods and calling structures.

An "application" (commonly referred to as an "app") as employed herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), a service or mini-service or micro-service and a programming tools (with which computer programs are created). Generally, within the following description with respect to embodiments of the invention an application is generally presented in respect of software permanently and/or temporarily installed upon a PED and/or FED. The term "mini-app" may be used to refer to a small application running on and HMD or in the cloud.

"User information" as employed herein may refer to, but is not limited to, user behavior information and/or user profile information. It may also include a user's biometric information, an estimation of the user's biometric information, or a projection/prediction of a user's biometric information derived from current and/or historical biometric information.

"Biometric" information as employed herein may refer to, but is not limited to, data relating to a user characterised by data relating to a subset of conditions including, but not limited to, their iris, pupil, cornea, retina shapes and characteristics, environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"Electronic content" (also referred to as "content" or "digital content") as employed herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MPG, MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List of file formats. Within a broader approach digital content may include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

"Selection" or "user selection" or "user feedback" or "user action" as employed herein may refer to, but is not limited to any means of a user interacting with the NR2I system, including manual pressing of a button or switch, a gesture that is made in front of the NR2I system and detected by one or more forward-facing cameras, a tapping on the device whose vibrations are detected by inertial or vibration sensors within the device, an audio cue such as a click or vocal command, such as "stop" "go" or "select", etc., or detection via the eye-tracking system, for instance detected gaze-direction and blink-detection, or any electronic signal from a different device to which a user has access, and with which the NR2I system is in communication, for instance an external mobile phone or personal electronic device, or Web Application.

A "profile" as employed herein may refer to, but is not limited to, a computer and/or microprocessor readable data file comprising data relating to settings and/or limits of a device. Such profiles may be established by a manufacturer of the adult device or established by an individual through a user interface to the adult device or a PED/FED in communication with the adult device.

An "optical emitter" as employed herein may refer to, but is not limited to, a device emitting within a region of the electromagnetic spectrum such as within the wavelength ranges of near ultra-violet (300 nm to 400 nm), visible (400 nm to 700 nm), and infra-red (750 nm to 2,500 nm (2.5 μm)). This may be generally sub-divided based upon choice of semiconductor employed for the devices such that, for example, aluminium gallium nitride (AlGaN), indium gallium nitride (InGaN) and gallium nitride (GaN), gallium arsenide (GaAs), gallium aluminium arsenide (GaAlAs), aluminium gallium indium phosphide (AlGaInP), gallium phosphide (GaP), indium gallium arsenide (InGaAs), aluminium gallium arsenide (AlGaAs), indium gallium arsenide phosphide (InGaAsP), and gallium indium arsenide antimonide. Semiconductor devices may include light emitting diodes (LED) such as surface-emitting LED (SLED) and edge-emitting LED (ELED), superluminescent diodes (SLEDs), laser diodes (LDs) and vertical cavity surface emitting lasers (VCSELs).

An "optical detector" as employed herein may refer to, but is not limited to, an optical receiver or display capable of detecting signals within a region of the electromagnetic spectrum such as within the wavelength ranges of near ultra-violet (300 nm to 400 nm), visible (400 nm to 700 nm), and infra-red (750 nm to 2,500 nm (2.5 μm)). Common materials for optical detectors include silicon (Si), germanium (Ge), and indium gallium arsenide (InGaAs) which may be employed as photodiodes or phototransistors discretely, in linear arrays or two-dimensional (2D) arrays to form an "infra-red image sensor". Such devices may exploit associated silicon processing circuits or in the instances of CMOS or charge-coupled devices (CCDs) be formed integrally with the silicon circuits.

A "sensor" as employed herein may refer to, but is not limited to, a transducer providing an electrical output generated in dependence upon a magnitude of a measure and selected from the group comprising, but is not limited to, environmental sensors, medical sensors, biological sensors, chemical sensors, physiological sensors, ambient environment sensors, position sensors, motion sensors, thermal sensors, infrared sensors, visible sensors, RFID sensors, neurological sensors, drug delivery systems, medical testing devices and diagnosis devices.

A "coronal plane" (frontal plane) as employed herein refers to a vertical plane running from one side of a user to another side of the user which divides the body or any of its parts into anterior and posterior portions.

A "sagittal plane" (lateral plane) as employed herein refers to a vertical plane running from a front of a user to a back (rear) of a user which divides the body or any of its parts into right and left sides.

An "axial plane" (transverse plane) as employed herein refers to a horizontal plane which divides a user's body or any of its parts into upper and lower parts.

A "median plane" as employed herein refers to a sagittal plane through the midline of a body of user which divides the body or any of its parts into right and left halves.

A "display" as employed herein may refer to, but is not limited to, a flat panel display using an array of optical emitters as pixels for generating image content. A display may include, but not be limited to, an electroluminescent display, a LED display, a MicroLED display, an organic LED (OLED) display, an active matrix OLED (AMOLED) display, a quantum dot LED (LED) display, a LED backlit liquid crystal display (LCD), a thin-film transistor (TFT) LCD display, and a plasma (PDP) display.

An "optical train" as employed herein may refer to, but is not limited to, an optical system which couples a display to a user's eye. Such optical trains may incorporate one or more optical elements, e.g. prism, lens, etc. between the display and the user's eye in conjunction with other elements such as shutters. The optical train may be designed solely to couple the image(s) on the display or displays to the user's eye in an immersive NR2I vision system or it may be designed to couple the image(s) on the display or displays to the user's eye whilst allowing the user to also view part of all of their real world surroundings in a non-immersive. NR2I system. Within non-immersive NR2I systems the optical train may cover a portion of the user's field of view or it may cover the Whole of the user's field of view. The optical train may contain a plurality of micro-shutters disposed with respect to the optical train between the external environment and the optical train.

A "structured optical emitter" as employed herein may refer to, but is not limited to, an optical emitter Which illuminates with a defined spatial and/or temporal pattern. For example a structured optical emitter may generate a fixed grid, a raster scanning line or a raster scanning point in order to provide illumination of objects and/or the environment within the vicinity of the device of which the structured optical emitter forms part in order to provide information to the device such as depth information for example.

An "unstructured optical emitter" as employed herein may refer to, but is not limited to, an optical emitter which illuminates generally, e.g. providing illumination without detailed spatial and/or temporal pattern, such as a white LED providing broad spatial illumination for example.

A "service-orientated architecture" (SOA) as employed herein may refer to, but is not limited to, an application architecture that employs software-based services which are independent and employ one or more protocols defining how they pass and parse messages using description metadata. This description metadata may describe both the functional characteristics of the service and quality-of-service characteristics. Accordingly, a SOA allows a service provider or equipment provider to combine multiple elements of functionality to form new applications which are built solely or predominantly from previously existing services. Beneficially, a SOA allows for these multiple elements of functionality to be combined in a deterministic manner, a predetermined manner or in an ad-hoc manner. Accordingly, an SOA presents an interface to applications that removes, by abstracting it away, the underlying complexity so that services act as black boxes. In this manner a user can also access one or more independent services through an SOA without requiring or having any knowledge of their internal implementation. Individual services may started, stopped, and upgraded/downgraded to different versions. In an SOA the physical location of execution of the process delivering the service may differ from that of the application requesting service. In an SOA the failure of an application or of any given service does not impact the others, as each runs in a separate context. Should a service fail, the operating system is capable of restarting the service automatically.

Near-to-Eye (Nr2I) Vision Systems

The disclosures described and depicted below in respect of the specification and figures respectively in this patent specification extend and build-upon novel and inventive NR2I systems, devices, and software established by the inventors. This application also incorporates by reference the entire disclosure of each of the following commonly owned U.S. patents and patent applications:

U.S. Pat. No. 8,135,227 filed Apr. 2, 2008 entitled "An Apparatus and Method for Augmenting Sight."

U.S. Pat. No. 8,494,298 filed Feb. 13, 2012 entitled "An Apparatus and Method for Augmenting Sight."

U.S. Pat. No. 10,223,833 filed Sep. 20, 2017 entitled "An Apparatus and Method for Augmenting Sight."

U.S. Patent Application Publication No. 2019/0304194, filed Mar. 4, 2019, now U.S. Pat. No. 10,867,449, entitled "Apparatus and Method for Augmenting Sight."

U.S. Pat. No. 9,618,748 filed Sep. 27, 2010 entitled "Apparatus and Method for a Dynamic "Region of Interest" in a Display System."

U.S. Pat. No. 9,720,238 filed May 25, 2016 entitled "Apparatus and Method for a Dynamic "Region of Interest" in a Display System."

U.S. Pat. No. 10,129,530 filed Mar. 31m 2017 entitled "Apparatus and Method for a Dynamic "Region of Interest" in a Display System."

U.S. Pat. No. 8,976,086 filed Dec. 2, 2011 entitled "Apparatus and Method for a Bioptic Real Time Video System."

U.S. Pat. No. 9,372,348 filed Dec. 5, 2014 entitled "Apparatus and Method for a Bioptic Real Time Video System."

U.S. Pat. No. 10,495,885 filed Jun. 14, 2016 entitled "Apparatus and Method for a Bioptic Real Time Video System."

U.S. Pat. No. 9,516,283 filed Jun. 13, 2013 entitled "Apparatus and Method for Enhancing Human Visual Performance in a Head Worn Video System."

U.S. Patent filed U.S. Pat. No. 10,225,526 filed Nov. 25, 2016 entitled "Apparatus and Method for Enhancing Human Visual Performance in a Head Worn Video System."

U.S. Patent Application Publication No. 2019/0199974, filed Mar. 4, 2019, now U.S. Pat. No. 10,778,944, entitled "Apparatus and Method for Enhancing Human Visual Performance in a Head Worn Video System."

U.S. Patent Application Publication No. 2017/0235161, filed May 3, 2017, entitled "Apparatus and Method for Fitting Head Mounted Vision Augmentation Systems."

U.S. patent application Ser. No. 16/822,731, filed Mar. 18, 2020, published as U.S. Application Publication No. 2020/0218096, entitled "Apparatus and Method for Fitting Head Mounted Vision Augmentation Systems."

U.S. Design Patent D847,893 filed Feb. 21, 2017 entitled "Vision Apparatus comprising Eyewear Frame and Pivotable Display."

U.S. Pat. No. 9,836,828 filed Apr. 22, 2016 entitled "Methods and Devices for Optical Aberration Correction."

U.S. Pat. No. 10,460,426 filed Oct. 31, 2017 entitled "Methods and Devices for Optical Aberration Correction."

U.S. patent application Ser. No. 16/665,239, filed Oct. 28, 2019, now U.S. Pat. No. 10,803,560, entitled "Methods and Devices for Optical Aberration Correction."

U.S. Patent Application Publication No. 2018/0203240, filed Jan. 8, 2018, now U.S. Pat. No. 10,712,573, entitled "Methods and Devices for Demountable Head Mounted Displays."

U.S. Design Patent D834,017 filed Feb. 21, 2017 entitled "Vision Apparatus comprising Eyewear Frame and Pivotable Display."

U.S. Patent Application Publication No. 2018/0284437, filed Apr. 5, 2018, now U.S. Pat. No. 10,712,563, entitled "Methods for Near-to-Eye Displays Exploiting Optical Focus and Depth Information Extraction."

U.S. patent application Ser. No. 16/821,026, filed Mar. 17, 2020, now U.S. Pat. No. 11,644,671, entitled "Large Exit Pupil Wearable Near-to-Eye Vision Systems Exploiting Freeform Eyepieces."

U.S. Pat. No. 10,127,706 filed Jan. 12, 2017 entitled "Language Element Vision Augmentation Methods and Devices."

U.S. Pat. No. 10,565,766 filed Sep. 27, 2018 entitled "Language Element Vision Augmentation Methods and Devices."

U.S. patent application Ser. No. 16/749,187, filed Jan. 22, 2020, now U.S. Pat. No. 11,195,315, entitled "Language Element Vision Augmentation Methods and Devices."

U.S. Patent Application Publication No. 2019/0179049, filed Dec. 3, 2018, now U.S. Pat. No. 11,132,055, entitled "Enhancing the Performance of Near-to-Eye Vision Systems."

NR2I Display Design

Referring to FIG. 1 there is depicted a NR2I HMD 100 according to an embodiment of the invention; The NR2I HMD 100 employs a frame which mounts upon the user's head, referred to as a halo or halo shaped frame. Accordingly, as depicted NR2I HMD 100 comprises a halo shaped frame split into front halo 101A and rear halo 101B which are joined via track 115 or a pair of tracks 115. Attached to the front halo 101A are a pair of pivotable temple arms 103 attached via first hinges 110 which are disposed along either side of the user's head and projecting forward. Each temple arm 103 being attached at a first end to a first hinge 110 and at a second distal end to a Display Assembly 102 via a second hinge 111. The Display Assembly 102 incorporates one or more displays for generating image content to be displayed to the user and one or more optical trains to couple the one or more displays to the user's one or more eyes. Additionally, the Display Assembly 102 incorporates an imaging sensor 114, range-finder 118 and an optical emitter 119 which may be structured or unstructured.

Figure 3B:
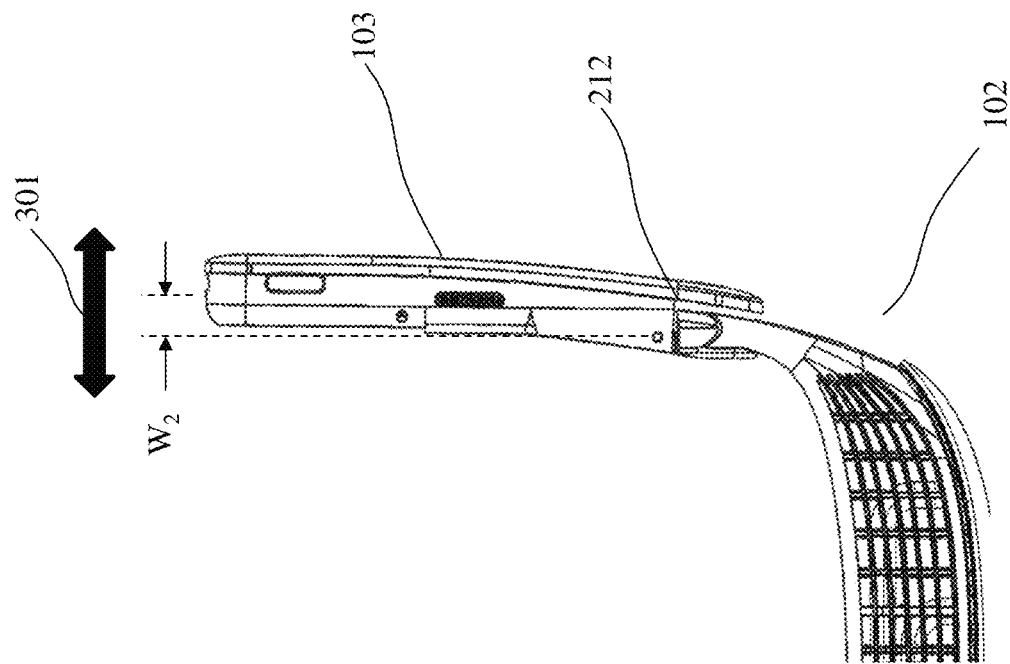
FIGS. 3A and 3B respectively depict portions of a NR2I HMD according to an embodiment of the invention wherein vertical axis hinges of a universal joint and its range of motion allow accommodation of varying head size.
Figure 3A:
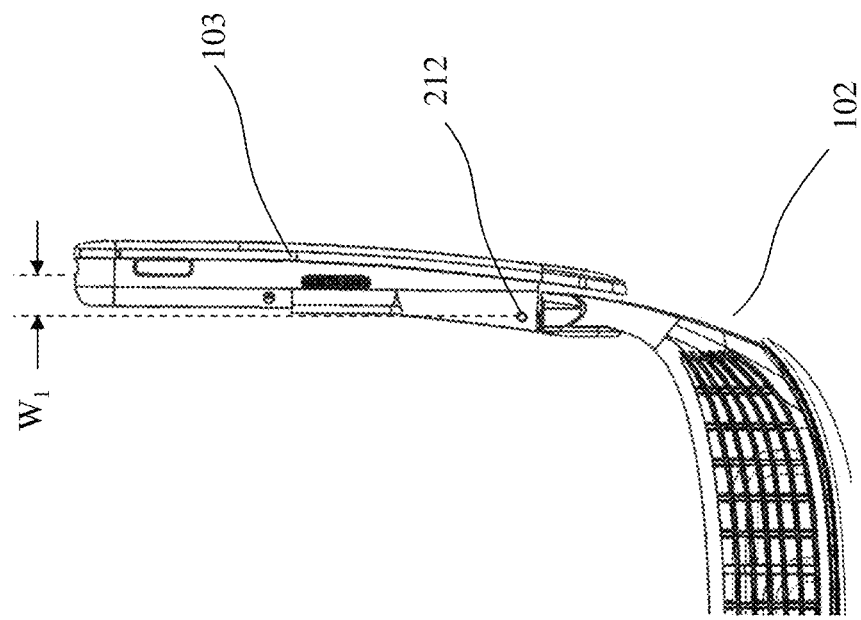
Figure 4A:
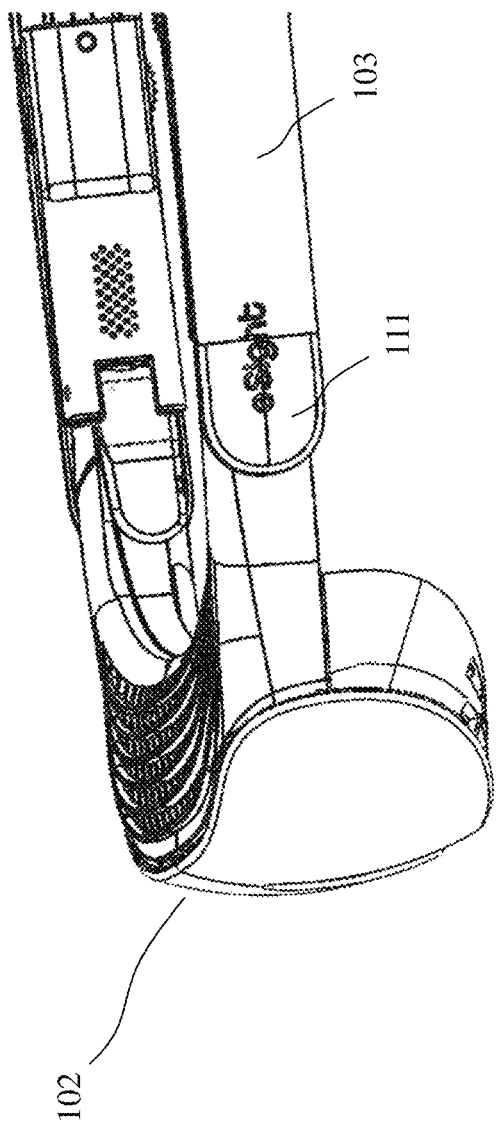
FIGS. 4A and 4B respectively depict the NR2I HMD according to an embodiment of the invention as depicted in FIG. 1 wherein horizontal-axis hinges of a universal-joint and its range of motion accommodate varying bioptic viewing angles for a user.
Figure 4B:
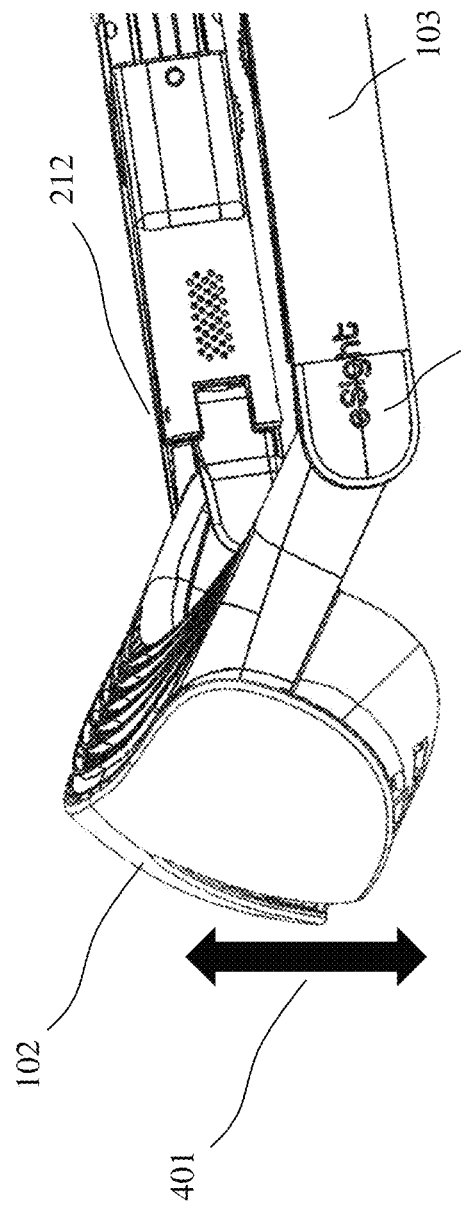

The first hinges 111 provide for accommodation of different halo frame dimensions, the halo frame comprising front portion 101A, rear portion 101B, and tracks 115, relative to the fixed width of the Display Assembly 102 as described and depicted in FIGS. 3A and 3B respectively whilst the second hinges 111 allow for the Display Assembly 102 to pivot relative to the halo frame and the pair of temple arms 103 as described and depicted in FIGS. 4A and 4B respectively.

Optionally, the imaging sensor 114 may be one of multiple image sensors which may be employed to provide additional imaging data to the electronic processor within Display Assembly 102 or remote to the NR2I HMD 100 which is processed in conjunction with or in isolation to that of imaging sensor 114 for rendering to the user. Accordingly, for example, a pair of imaging sensors may be employed to provide stereoscopic viewing for the user or imaging sensors in different regions of the electromagnetic spectrum may provide data. For example, a near-infrared (NIR) imaging sensor may provide for active infrared night vision whilst alternatively another imaging sensor may employ a photomultiplier to provide passive night vision.

With a pair of imaging sensors are employed to provide forward-facing image capture, the inter-sensor distance may be adjusted in a manner similar to an inter-pupillary distance display setting so that improved stereoscopic capture is performed (i.e. closer to realistic stereoscopic vision), whilst adjusting to the user's head geometry.

Further, the image sensors may articulate independently from the Display Assembly 102 in order, for example, to accommodate bioptic angle adjustment whilst keeping the image sensor(s) pointed at the user's imaging target. Accordingly, the image sensor or plurality of image sensors may automatically adjust their angle with respect to the Display Assembly 102 as the bioptic angle (the angle between the display assembly and the temple arms) is adjusted so that the image sensor's field of view is largely unchanged as the bioptic angle is adjusted. This sensor-adjustment may also be made in dependence on the angle of hinge 110.

Optionally, the image sensors may be mechanically adjusted in imaging direction by mechanical means, for example through wire or mechanical gearing, or electronic means, for example adjusting region of imaging sensor presented to user to tilt adjustment under motorized control. Optionally, the image sensor or plurality of imaging sensors may have a vertical angle adjustment which is independent of the bioptic tilt angle, such that for example, their direction is fixed with respect to the NR2I HMD 100 by being disposed upon one or both temple arms 103, for example, rather than within the Display Assembly 102. Optionally, the imaging sensor or plurality of imaging sensors may have a direction defined by a horizontal plane relative to the user such as through the use of a gimbal or gimbals for example so that the camera direction is fixed for a range of motion of the user and/or the Display Assembly 102.

Within embodiments of the invention the second hinges 111 may provide for a bioptic range of motion between a lower angle of −10° (i.e. the Display Assembly 102 is directed down further in front of the user's eyes) and an upper angle of +35° (i.e. the Display Assembly 102 is directed above the user's eyes). Optionally, within other embodiments of the invention the lower angle may be −35°, −30°, −25°, −20°, −15°, −5°, and 0° or other angles. Optionally, within other embodiments of the invention the upper angle may be +45°, +40°, +30°, +25°, +20°, +15°, +5°, and 0° or other angles. Within embodiments of the invention the angles of hinges 110 and 111 may be measured, and functions of the HMD may operate in dependence on these measurements.

Within embodiments of the invention the temple arms provide internal storage space for management of the cabling between the battery 116 and the Display Assembly 102 as it is adjusted for the user's specific eye relief as described below. Such cabling management may also relate to other cabling between other electronics forming part of the NR2I HMD 100 such as, for example, disposed upon or within the temple arms, upon or within the front portion 101A of the halo frame, or upon or within the rear portion 101B of the halo frame.

Optionally, the front portion 101A of the halo frame, the rear portion 101B of the halo frame, a temple arm 103 or both temple arms 103 individually or in combination may support the mounting of other passive and/or active devices to the NR2I HMD 100 which are either designed to mount and interconnect both mechanically and electronically with the Display Assembly 102 at specific points, designed to mount and interconnect wirelessly with the Display Assembly, or simple designed to mount upon or be attached to the Display Assembly 102. For example, these active devices may include, but not be limited to, a microphone, a headphone, a pair of headphones, a camera, and a light. For example, these passive devices may include, but not be limited to, ear defenders, face mask, and a band going over the user's head.

The halo frame, comprising front portion 101A, rear portion 101B and the pair of tracks 115 allows the NR2I HMD 100 to be configured for a range of user head sizes through circumferential adjustment which is enabled and controlled by a wheel-in-track mechanism comprising a wheel 112 which engages the pair of tracks 115 thereby increasing or decreasing the overall circumference of the halo frame. The positioning of the wheel 112 at the middle front of the halo frame acts upon the pair of tracks 115 symmetrically. Optionally, the wheel 112 may be positioned at the rear of the halo frame upon rear portion 101B rather than the front portion 101A. Optionally, a pair of wheels 112 may be employed wherein each wheel 112 of the pair of wheels 112 engages a track 115 of the pair of tracks 115.

Within embodiments of the invention the halo frame comprising front portion 101A, rear portion 101B and the pair of tracks 115, is formed from a flexible material or materials allow some deformation as either the overall circumference is adjusted, or the halo frame is worn by the user. Optionally, the front portion 101A and rear portion 101B may be semi-rigid with the pair of tracks 115 formed from a flexible material or materials. Optionally, the front portion 101A and rear portion 101B may be formed from flexible material(s) and the pair of tracks 115 formed from a semi-rigid or rigid material or materials.

Optionally, to provide additional weight relief a further headband may be employed running fore-aft from front to back across the top of the user's head. Optionally, this additional weight relief may be a further headband from side-to-side of the halo frame. Optionally, this additional weight relief may be a pair of further headbands, either discrete or forming a single piece part, one from side-to-side and the other front to back. Optionally, the weight relief or weigh reliefs may form part of another structure, e.g. a construction hat (also known as a hard hat), either permanently or non-permanently allowing demountable attachment of the other structure.

Each temple arm 103 of the pair of temple arms 103 may in addition to being attached by first hinges 110 to the front portion 101A of the halo frame can be each individually extended or retracted by operation of a temple arm thumbwheel 120. Accordingly, rotation of a thumbwheel 120 in one direction extends the temple arm 103 whilst rotation in the other direction retracts the temple arm 103. Accordingly, these adjustable temple arms allow for independent adjustment of the user's eye-relief of the Display Assembly 102 of the NR2I HMD 100 so that the Display Assembly 102 can be positioned for optimal viewing.

Optionally, the temple arms 103 may be attached to the rear portion 101B of the halo frame.

The Display Assembly 102 of the NR2I HMD 100 comprises an outer protective shell, for example formed from a non-thermally conducting material such as a plastic, comprising a front cover 104 and louvered top cover 113. This protective shell not only guards against internal damage but protects the user from high temperatures associated with the electronic processing elements of the NR2I HMD 100 and associated heatsinks etc. as described and depicted below in respect of FIGS. 5 to 8 respectively.

As described above a battery 116 provides power for the NR2I HMD 100. This battery may incorporate a charger connector, or this may be provided elsewhere as part of the NR2I HMD 100. Optionally, within embodiments of the invention the battery 116 is permanently attached. Optionally, within embodiments of the invention the battery 116 is demountable allowing replacement. Optionally, within embodiments of the invention the battery 116 is demountable and operates in conjunction with a second battery housed within the NR2I HMD 100 allowing "hot swapping"

of the battery 116 whilst maintaining temporary operation of the NR2I HMD 100 through this second battery.

Figure 2:
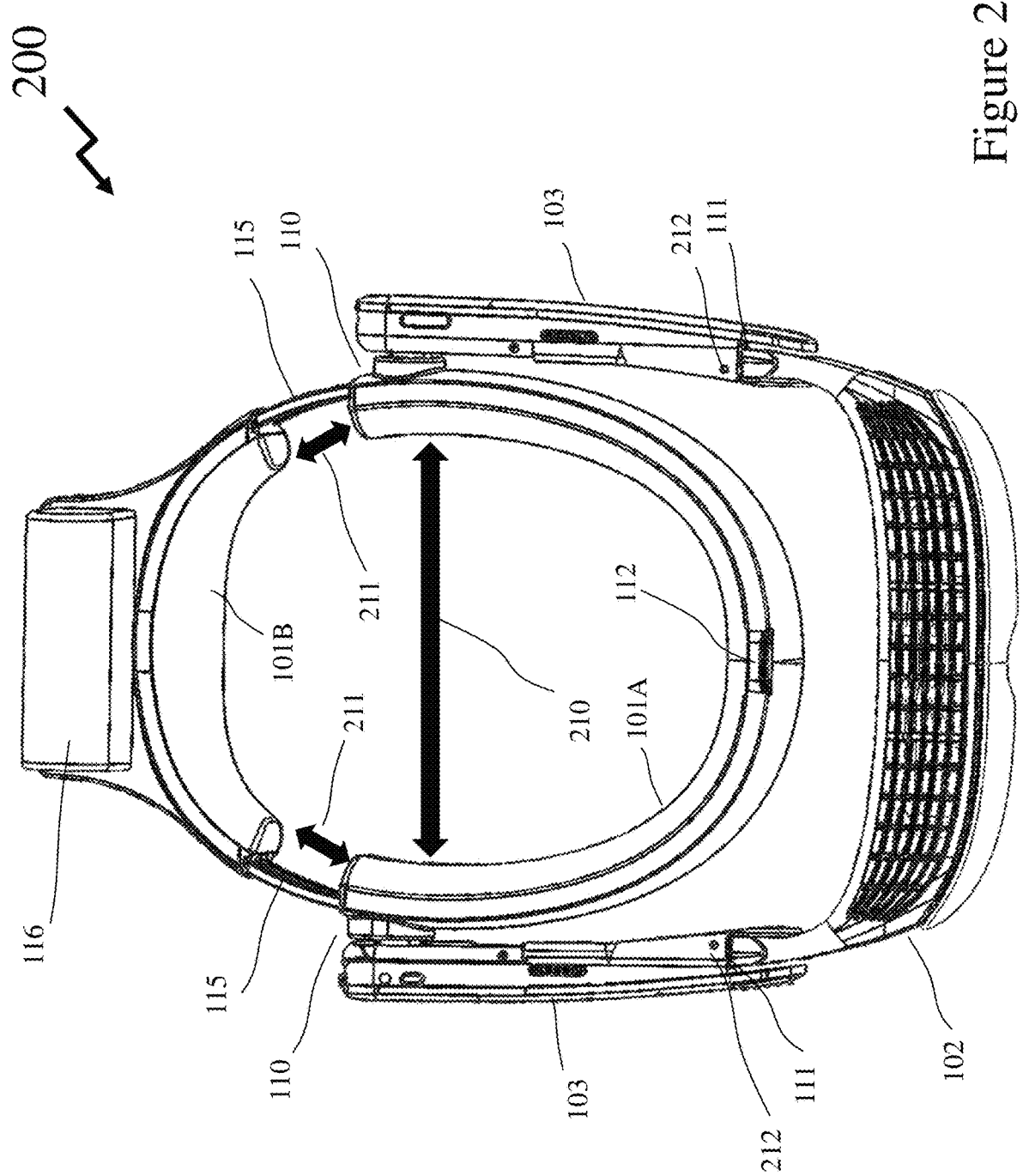
FIG. 2 depicts the NR2I HMD according to an embodiment of the invention as depicted in FIG. 1 in plan view illustrating features for user head-size adjustment(s) and viewing-optimization.

Now referring to FIG. 2 the NR2I HMD 100 of FIG. 1 is depicted in plan view 200 in order to illustrate operation of the head size adjustment. Accordingly, the user's head width 210 is accommodated through flexure of the front portion 101A of the halo frame and the pair of tracks 115. Overall circumference adjustment is provided by adjusting the length of the tracks exposed or deployed between the front portion 101A of the halo frame and the rear portion 101B of the halo frame. This being depicted by circumference adjustments 211 and is achieved by rotating the thumbwheel 112 within the front portion 101A of the halo frame. The Display Assembly 102 of the NR2I HMD is attached to the pair of temple arms 103 by dual-hinged universal joints, second hinges 111, the vertical axis hinges of which are identified as hinge elements 212. Accordingly, as the width of the halo frame adjusts then the dual hinged universal joints, second hinges 111, at the ends of the temple arms 103 where the Display Assembly 102 is attached adjust as do the angles of the pair of temple arms relative to the sagittal plane of the user as the width of the Display Assembly 102 is fixed whereas the spacing between the pair of temple arms 103 at the first hinges 110 varies according to the user's head geometry.

Referring to FIGS. 3A and 3B there is depicted operation of the vertical axis hinges, hinge elements 212, of the dual hinged universal joints, which also comprise the second hinges 111, of the NR2I HMD according to embodiments of the invention. As depicted the vertical axis hinges of which are identified as hinge element 212 are depicted in FIG. 3A at an initial configuration, where the lateral distance between the hinge element 212 and the middle of the distal end of the temple arm 103 is depicted as $W_1$. This being, for example, an initial as sold configuration of a configuration for a first user. Accordingly, as depicted in FIG. 3B as the halo frame, not depicted for clarity, is adjusted the end of the temple arm at the first hinge 110, also not depicted for clarity, connecting the temple arm to the halo frame moves left or right as denoted by motion arrow 301. Accordingly, the lateral distance between the hinge element 212 and the middle of the distal end of the temple arm 103 adjusts and is now depicted as $W_2$. Further, the universal joint, second hinge 111, may change angle around its vertical axis so as to accommodate the fixed width of Display Assembly 102 versus the changing diameter of the halo frame 210, as it is circumferentially adjusted using wheel 112 to adapt to the user's head.

As the circumference of the halo frame is adjusted, the distances 211 change, and any cabling from the Battery 116 providing power to the Display 102 will require cable-management, as it traverses this variable-distance region. Accordingly, within embodiments of the invention, the forward and/or rear portions of the halo-frame 101A, 101B respectfully may be made with hollow regions, and the power-cabling looped in a configuration, for example what are commonly referred to as "U" or "S" shapes, within these hollow regions so as to accommodate the variable cable-length required as the halo frame is adjusted. The cabling may be run forward of the hinge 110 within a hollow region of halo frame 101A, be looped back in a "U" turn, thereafter, to enter the temple-arm 103 at the hinge-point 110. Alternately, this cable management may be accomplished, for example by "S"- or "U"-shaped cable routing, within a hollow region of the rear halo 101B. A similar "U" or "S" cable-routing may be used to accommodate cabling within variable-length temple arms in an interior hollow region thereof.

Now referring to FIGS. 4A and 4B there is depicted operation of the other element of the dual hinged universal joints, second hinges 111, which act in combination with the hinge elements 212. The Display Assembly 102 of the NR2I HMD as described above in respect of FIG. 1 may be lowered down in front of the user's eyes (FIG. 4A) or raised up (FIG. 4B) so that the user's forward-view is unimpeded. The range of motion 401 is provided by pivoting the NR2I display about an axis near to or in front of the center of the user's eyeball. As noted above in respect of FIG. 1 the upper and lower limits of this range of motion may be different for different embodiments o the invention.

As noted above in respect of FIG. 1 the NR2I HMD incorporates within the Display Assembly 102 not only the displays for rendering content to the user along with their associated optical trains but also an electronic processor to generate the images rendered to the user from data acquired with the one or more image sensors or from external sources, e.g. content accessed from a global communications network to which the NR2I HMD is in communication either directly or through an intermediate PED and/or FED. Further, the Display Assembly, e.g. Display Assembly 102 in FIG. 1, has an outer casing protecting these optical and electrical elements. However, it is necessary to manage the heat from the electronics. Accordingly, within the outer casing of the Display Assembly, e.g. Display Assembly 102 in FIG. 1, there is a heatsink thermally coupled to the electronics, particularly the electronic processor, microprocessor or equivalent.

Figure 5:
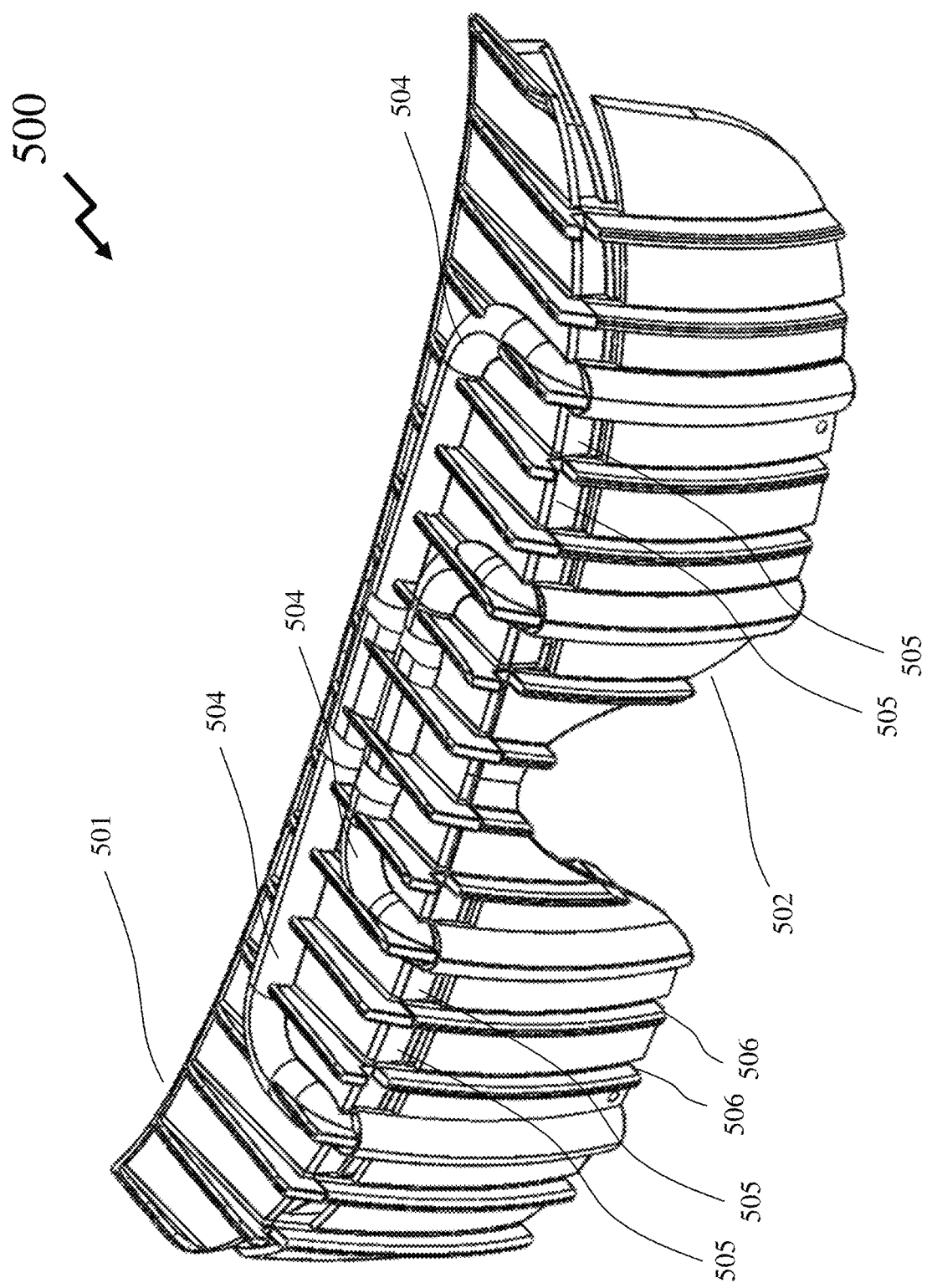
FIG. 5 depicts an exterior view of the heat-sinks of the NR2I HMD according to an embodiment of the invention as depicted in FIG. 1 employed to dissipate heat from the electronic processor(s) within the NR2I HMD.

Accordingly, referring to FIG. 5 there is depicted an exterior view of a heatsink 500 according to an embodiment of the invention employed to extract the heat generated by the electronics within the Display Assembly, e.g. Display Assembly 102 of the NR2I HMD 100 in FIG. 1. The heatsink 500 comprises two individual heat sinks, a top heatsink 501 and a front heatsink 502. The top heatsink 501 is attached to the front heatsink 502 with a plurality of heat pipes 504 which allow the top heatsink 501 and front heatsink 502 to be physically separated by gaps 505 such that airflow between the two heatsinks is possible but the top heatsink 501 and front heatsink 502 are thermally connected. A set of features 506 are provided on the front heatsink 502 such that when assembled with optical sub-assemblies, referred to by the inventors as Prism-Lens Optical Displays or PODs, and the front cover, a series of plenums are formed in order to aid with heat flow through the convective chimney effect.

Figure 6:
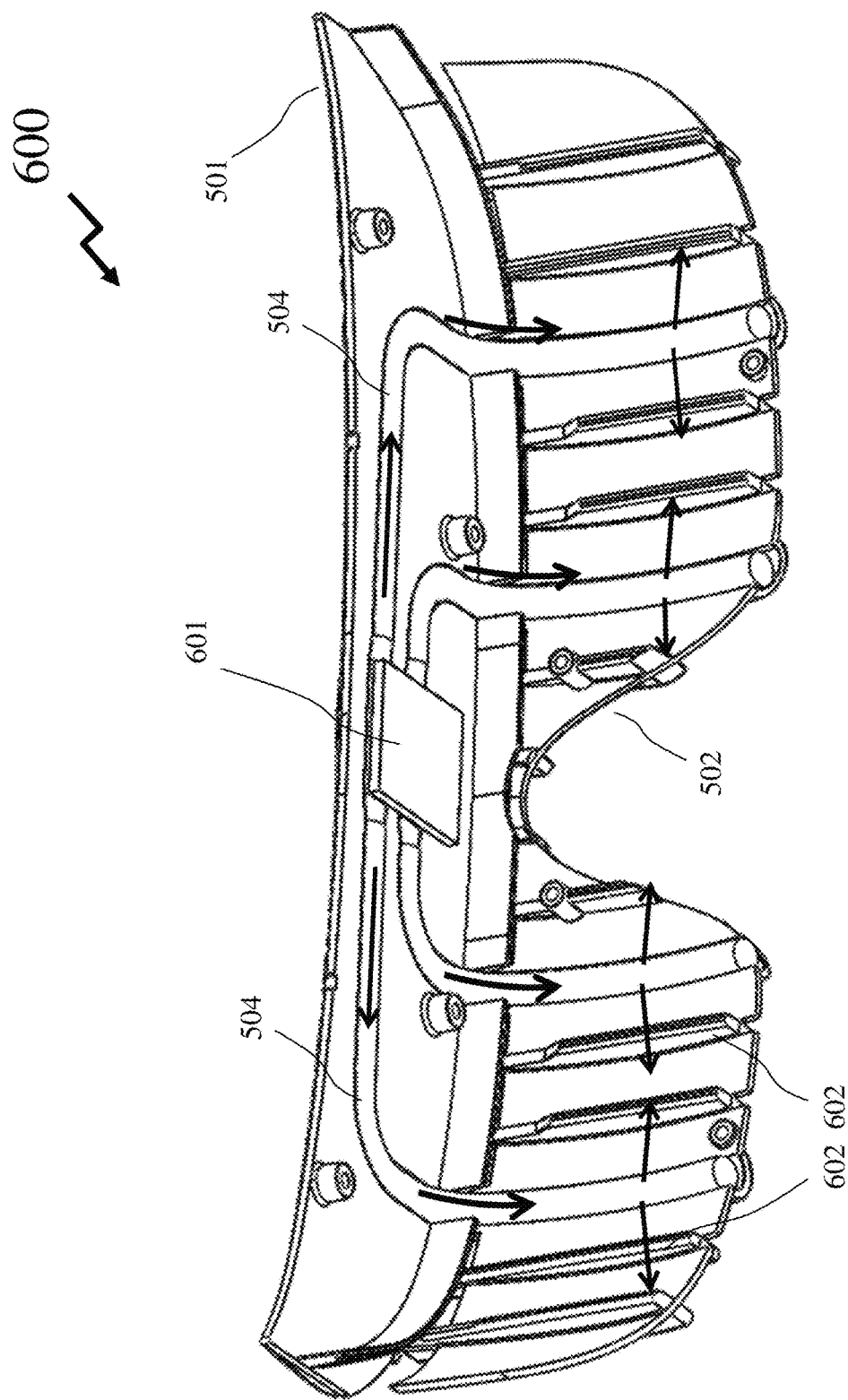
FIG. 6 depicts the interior of the heatsinks of the NR2I HMD according to an embodiment of the invention as depicted in FIG. 1 and the directions of heat-flow through the heat-pipes.

Now referring to FIG. 6 there is depicted an interior view 600 of the heat-sink 500 described and depicted in FIG. 5 comprising the top heatsink 501 and the front heatsink 502 with the interconnected heat pipes 504. As depicted, a heat plate 601 is in mechanical and thermal contact with the electronic, e.g. the microprocessor package, and is employed to efficiently extract heat from the electronic processor. Optionally, the heat plate 601 may contact a heatsink of the electronics or it may comprise several heat plates each contacting a different portion of the electronics circuit, e.g. a microprocessor and a graphics processor if these are provided discretely, for example. The direction of heat flow from the electronics through the heat pipes 504 and hence to the top heatsink 501 and then to the front heatsink 502 is illustrated by the arrows.

By appropriate design, placement and material selections these heat-pipes 504 allow the surface temperature across the top heatsink 501 and front heatsink 502 to be equalized individually and together resulting in high convection efficiency. The features 602 correspond to the inner portions of the features of the set of features 506 depicted in FIG. 5 which are provided such that when assembled with PODs and the front cover the series of plenums are formed to aid in exploiting the chimney-effect for convective heat-flow. The heat pipes 504 may be formed, within some embodiments of the invention, from a sintered metal or a sintered alloy, or from graphene.

Figure 7:
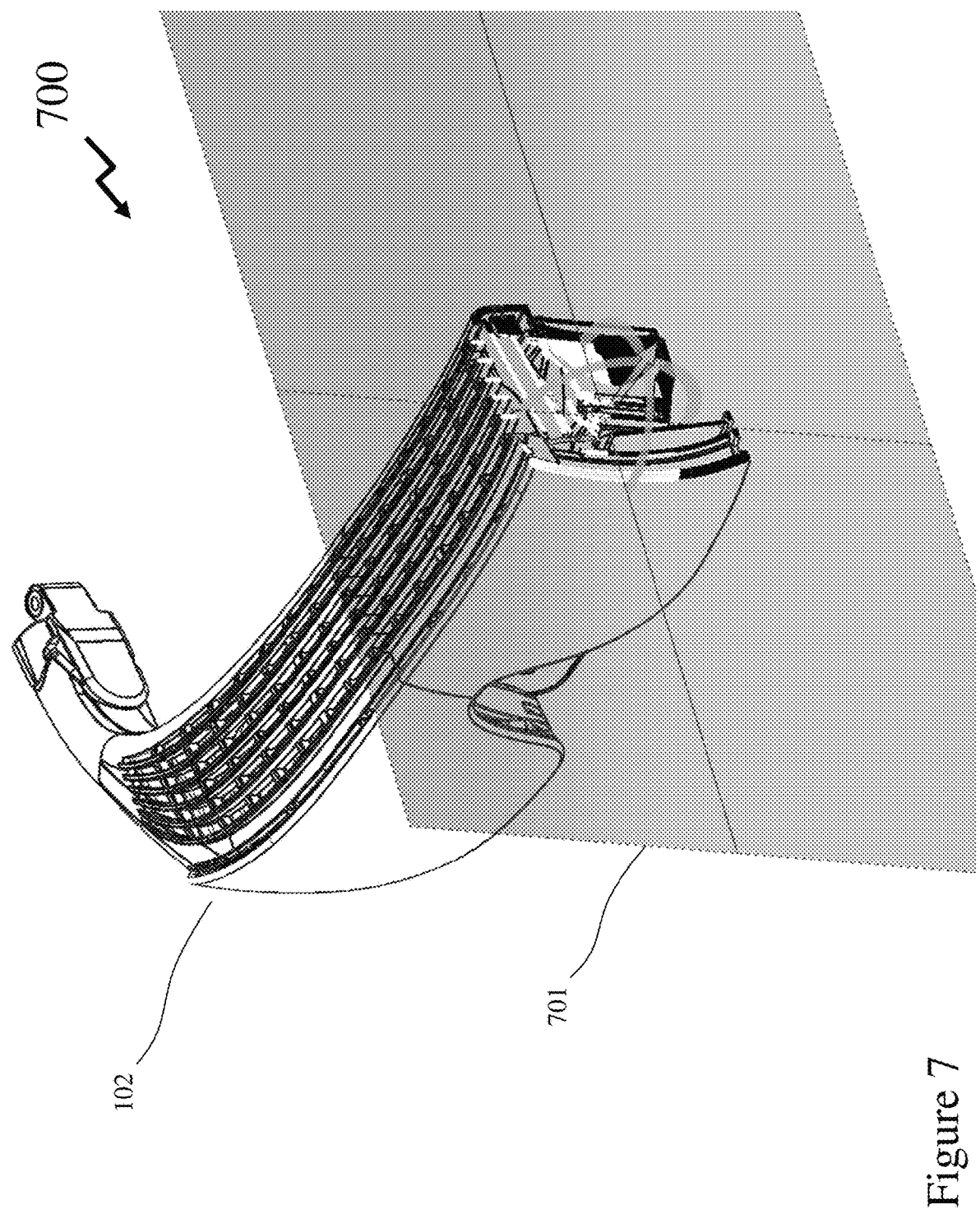
FIG. 7 depicts the display portion of the NR2I HMD according to an embodiment of the invention as depicted in FIG. 1 in perspective cross-sectional view shows where the cross-sectional view for FIG. 8 is taken.

FIG. 7 depicts the Display Assembly 102 for a NR2I HMD according to an embodiment of the invention such as NR2I HMD 100 depicted in FIG. 1 in perspective cross-sectional view 700. The cross-sectional view 700 shows the plane 701 through which cross-sectional view 800 in FIG. 8 is taken.

Figure 8:
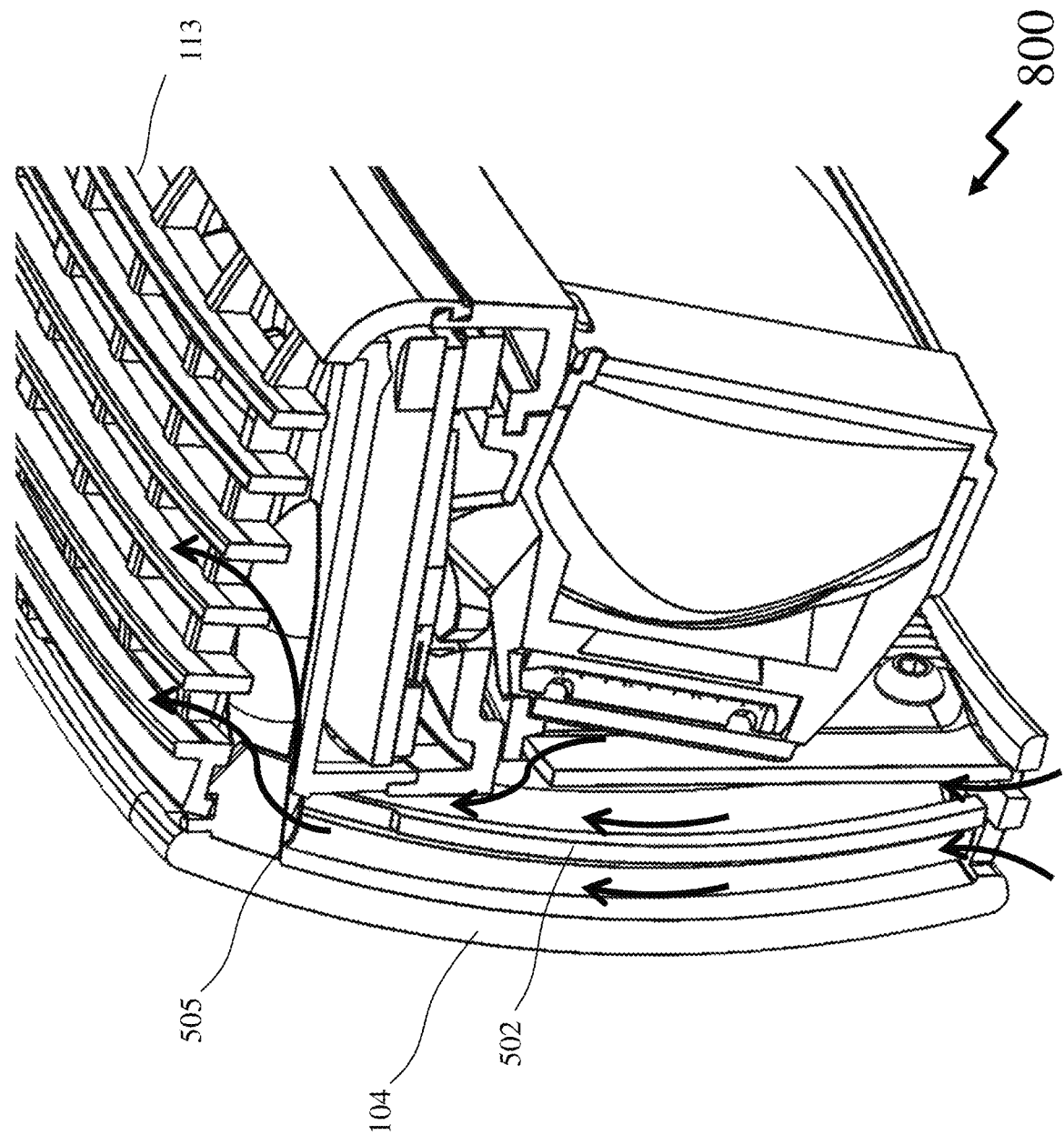
FIG. 8 depicts the display portion of the NR2I HMD according to an embodiment of the invention at the section depicted in FIG. 7 indicating the chimney-effect-assisted airflow over the vertical heatsink.

Accordingly, referring to FIG. 8 there is illustrated in cross-section view 800 the airflow within a Display Assembly, such as Display Assembly 102 of NR2I HMD 100 in FIG. 1. As depicted the front heatsink 502 is disposed between the front cover 104 and the internal elements of the PODs, the NR2I display optics described and depicted below with respect to FIGS. 11A to 13B respectively, allowing airflow (indicated by the arrows) up and through the gaps 505 between the top heatsink 501 and the front heatsink 502 allowing the convected air to extract heat which is then "vented" through the openings within the upper cover 113 of the Display Assembly.

In alternate embodiments requiring a more lightweight assembly, the foregoing heat-dissipation mechanisms may be replaced. A graphene thermal conductor may be placed in thermal contact with the heat-dissipating elements of the Processor (for example, microprocessor, graphics processor, etc.) running forward and conducting heat to surface 104 where the heat will be radiated. In one embodiment surface 104 is made of aluminum. In the case of a transmissive or augmented-reality display where an opaque surface 104 is undesired, the graphene thermal conductor may be routed to an aluminum structure located above the Display Assembly 102.

Figure 9:
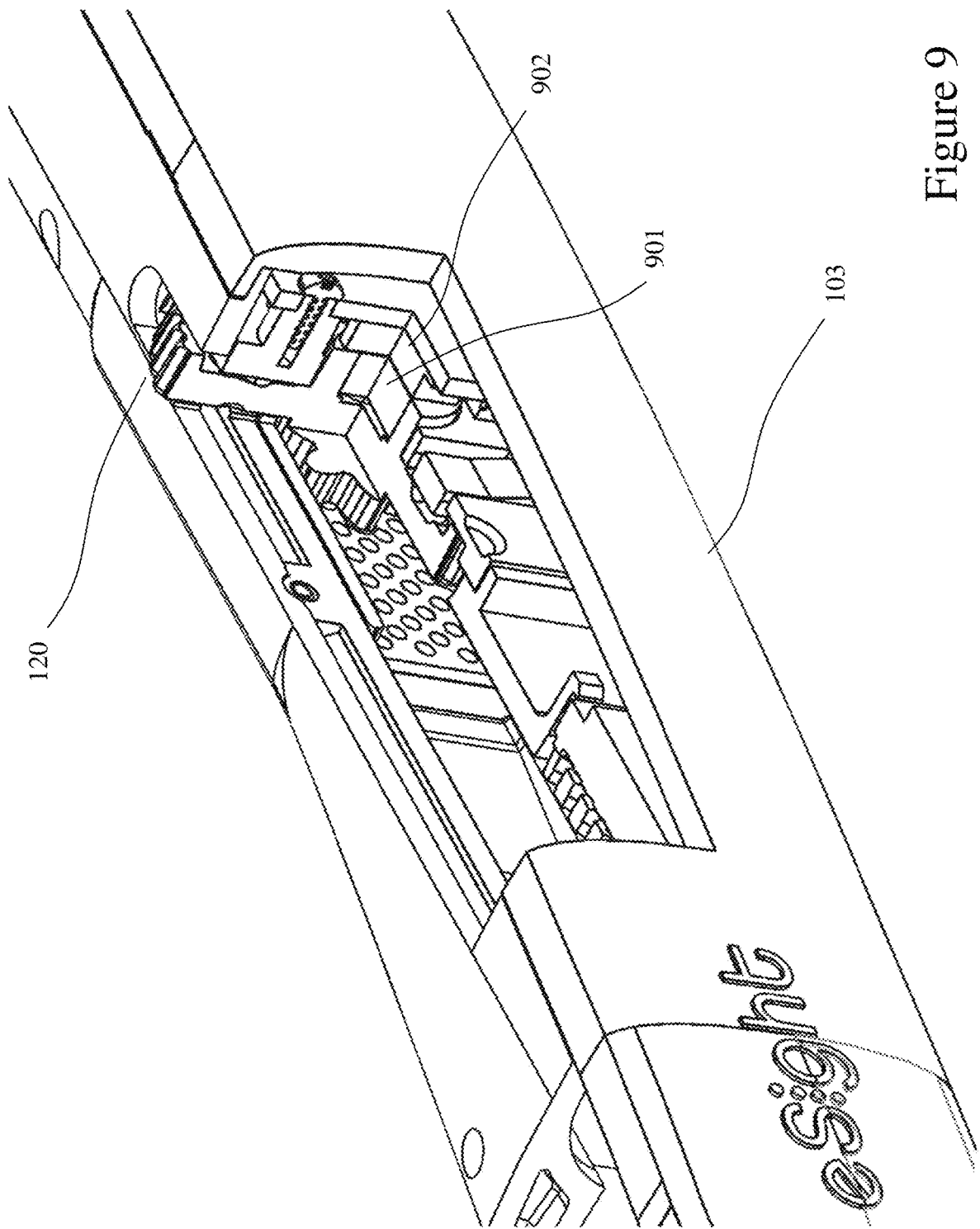
FIG. 9 depicts a cutaway view of the NR2I HMD according to an embodiment of the invention as depicted in FIG. 1 to show the Z-axis eye-relief adjustment, magnet, and Hall-effect eye-relief sensor elements.

As described above in respect of FIGS. 1 and 2 the temple arms 103 of the NR2I HMD 100 provide for movement of the Display Assembly, such as Display Assembly 102 of NR2I HMD 100 in FIG. 1, in order to provide eye-relief. These eye-relief mechanisms employed within the temple arms 103 being depicted in FIG. 9. As noted above a thumb-wheel 120 engages in a track so that rotation of the thumbwheel causes translation between the first hinge 110 where the temple arm 103 is attached to the halo-frame and second hinge 111, where the temple arm 103 attaches to the Display Assembly 102 thereby extending and/or retracting each temple arm independently from each other and independent of any adjustment in respect of the overall dimensions of the halo frame. Within each temple arm 103 there is disposed a magnet 901 and a magnetic sensor 902, for example a Hall effect sensor. Accordingly, the output of the Hall effect sensor is coupled to the processor of the Display Assembly 102 allowing the processor to determine, and potentially display to the user, the amount of eye-relief as it is adjusted by the user on each of the left and right temple arms 103. Optionally, other forms of encoding the extended position of the temple arm 103 may be implemented.

Optionally, each temple arm 103 may incorporate a speaker. Optionally, each temple arm 103 may incorporate a microphone. Optionally, one or both temple arms 103 may incorporate a touchpad or other haptic interface allowing the user to provide haptic based input to the processor. Optionally, a temple arm 103 may incorporate one or more electrical connections such as a USB connector, HDMI connector, an IEEE 1394 FireWire connector, audio connector, video connector, camera interface, etc.

Figure 10A:
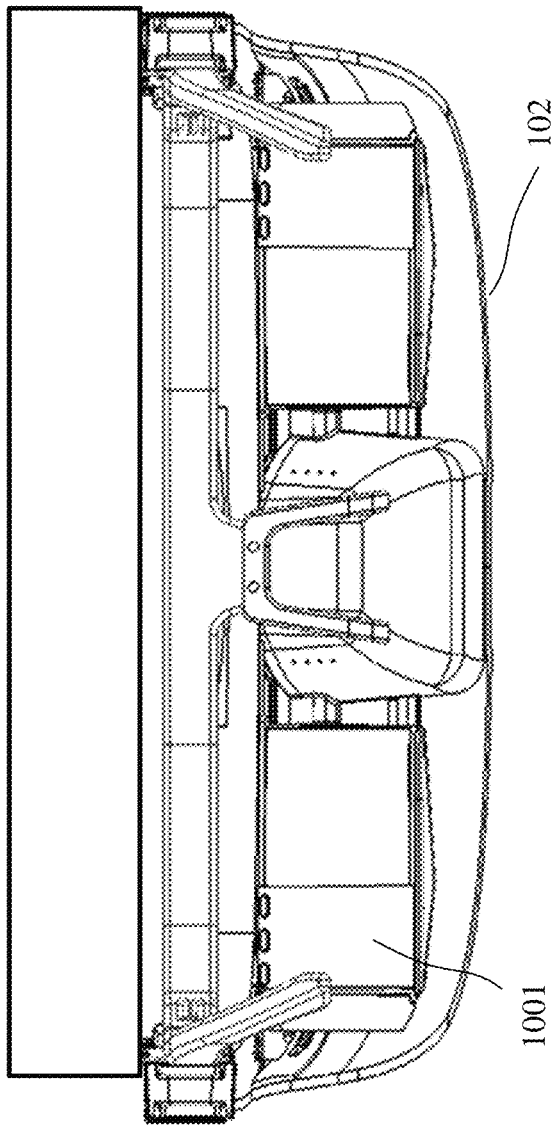
FIGS. 10A and 10B depict front and rear views of the display portion of the NR2I HMD according to an embodiment of the invention.
Figure 10B:
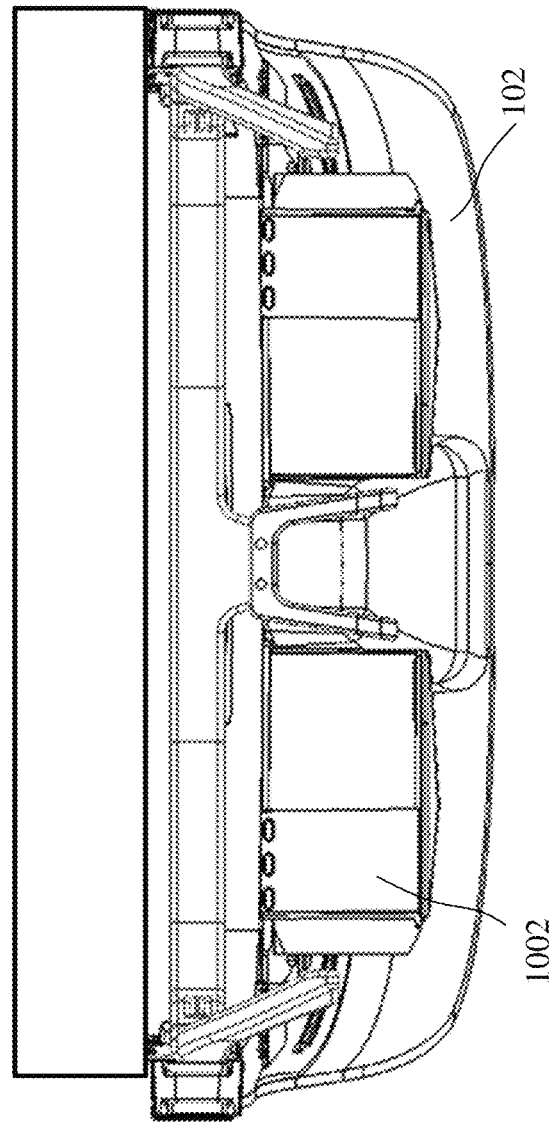

As described above the Display Assembly 102 of NR2I HMD 100 in FIG. 1 employs discrete PODs 1001 for the left and right sides. Accordingly, the discrete left and right positions of the pair of PODs 1001 can be set within embodiments of the invention discretely and uniquely accommodating inter-pupillary distance (IPD) adjustment for the user but also left/right asymmetry of the user's eyes relative to their head. Within other embodiments of the invention the PODs may be linked together with an adjustment means moving them together. Referring to FIG. 10A the PODs 1001 within the Display Assembly 102 are depicted at maximum IPD whilst in FIG. 10B the PODs within the Display Assembly 102 are depicted at minimum IPD. As described and depicted by the inventors within U.S. Patent Application 2017/0,235,161 filed May 3, 2017 entitled "Apparatus and Method for Fitting Head Mounted Vision Augmentation Systems" the PODs are mounted to a rigid rail which allows their placement in left/right directions prior to them being fixed into position. However, it would be evident to one of skill in the art that other mounting means may be employed without departing from the scope of the invention as defined within the claims.

Figure 11A:
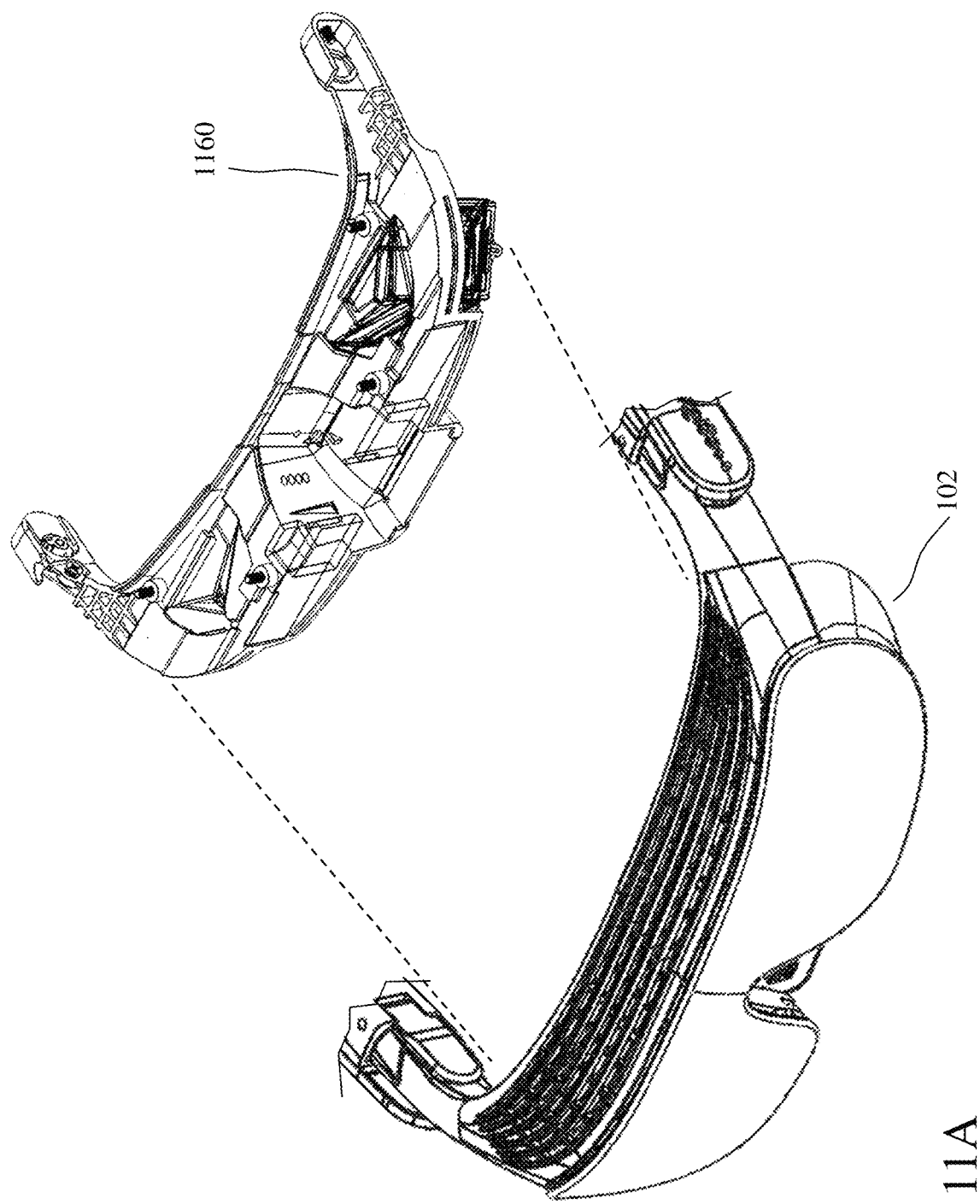
FIG. 11A depicts a display assembly of an NR2I HMD according to an embodiment of the invention.

Now referring to FIGS. 11A to 11E a NR2I display such as employed within the NR2I systems depicted in FIGS. 1 to 10 is depicted sequentially separated to a subset of its constituent parts. Accordingly, the Display Assembly 102 of the NR2I HMD 100 is depicted in FIG. 11A and then depicted as NR2I Core 1160 wherein the cover 104, louvered top cover 113, top heatsink 501, front heatsink 502 have been removed. NR2I Core 1160 is depicted in FIG. 11B within which are the right hand side (RHS) Prism-Lens Optical Display (POD) depicted in FIG. 11B and left hand side (LHS) POD depicted in FIG. 11C. Left/right within this specification referring to the user's eye from their viewpoint. Each POD of RHS POD and LHS POD depicted in FIGS. 11C and 11D comprising as depicted in FIG. 11E a Casing 1110 with appropriate fixturing for mounting to the Core 1160. Such fixturing includes the provision for dependent or independent lateral translation of the two PODs, for instance using rail-shaped Mounting 1140, in order to allow lateral motion to accommodate users of differing inter-pupil distance (IPD). Each POD may therefore be laterally moved by sliding the POD Mounting 1140 along a corresponding mounting projection within the Core 1160 and fixing the POD(s) in position when the correct Inter-Pupil Distance (IPD) is achieved. These also comprise MicroDisplay 1120 mounted to the Casing 1110 and Free Form Prism-Lens 1130 disposed within the Casing 1110. The Casing 1110 also includes electrical connections for power and data to the MicroDisplay 1120 from the electronics within the Display Assembly 102.

Figure 12C:
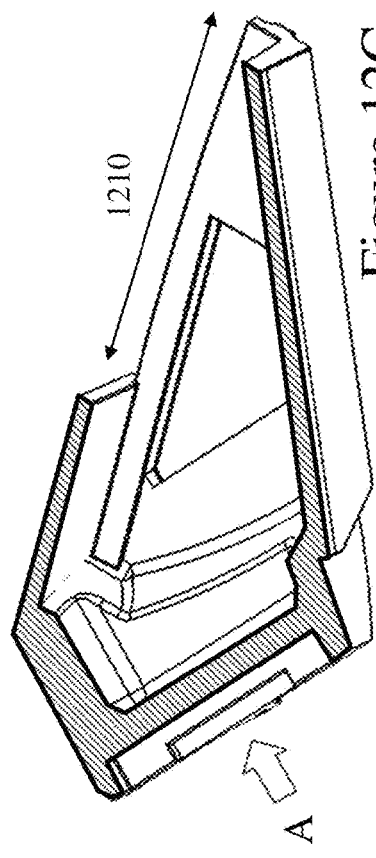
FIGS. 12C and 12D depict cross-sectional views of the optical pod according to the designs depicted in FIGS. 11B and 11C respectively.
Figure 12D:
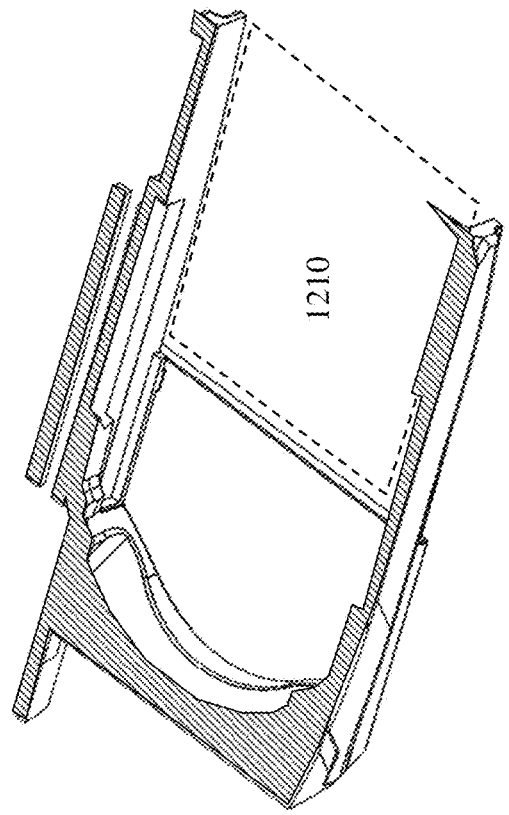
Figure 12B:
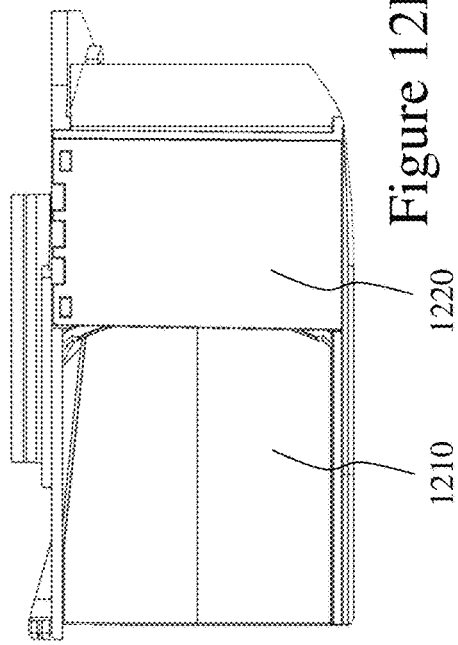
FIG. 12B depicts an elevation view of the optical pod according to the designs depicted in FIGS. 11B and 11C respectively.
Figure 12A:
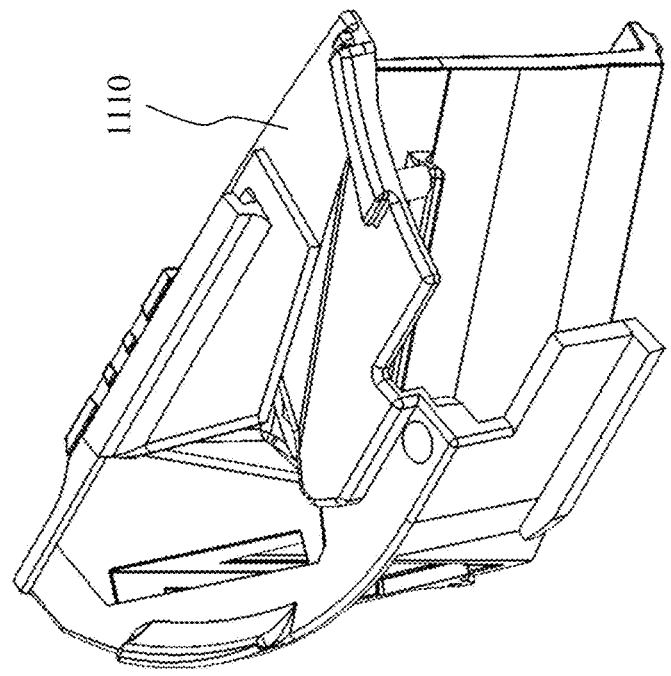
Figure 13B:
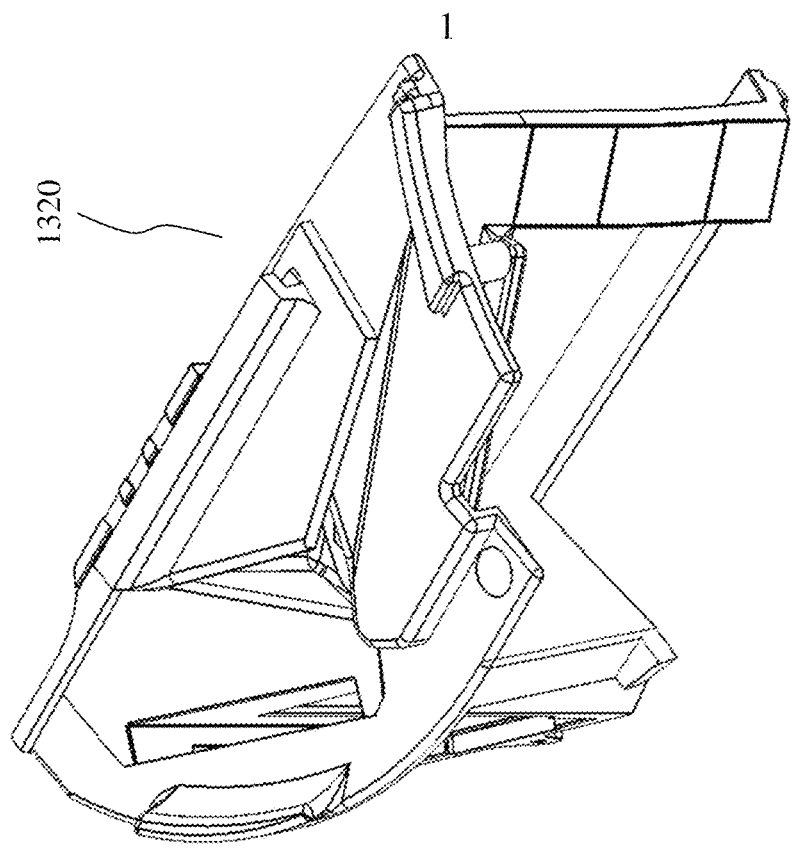
FIGS. 13A and 13B depict detailed views of an optical pod according to the designs depicted in FIGS. 11B and 11C respectively.
Figure 13A:
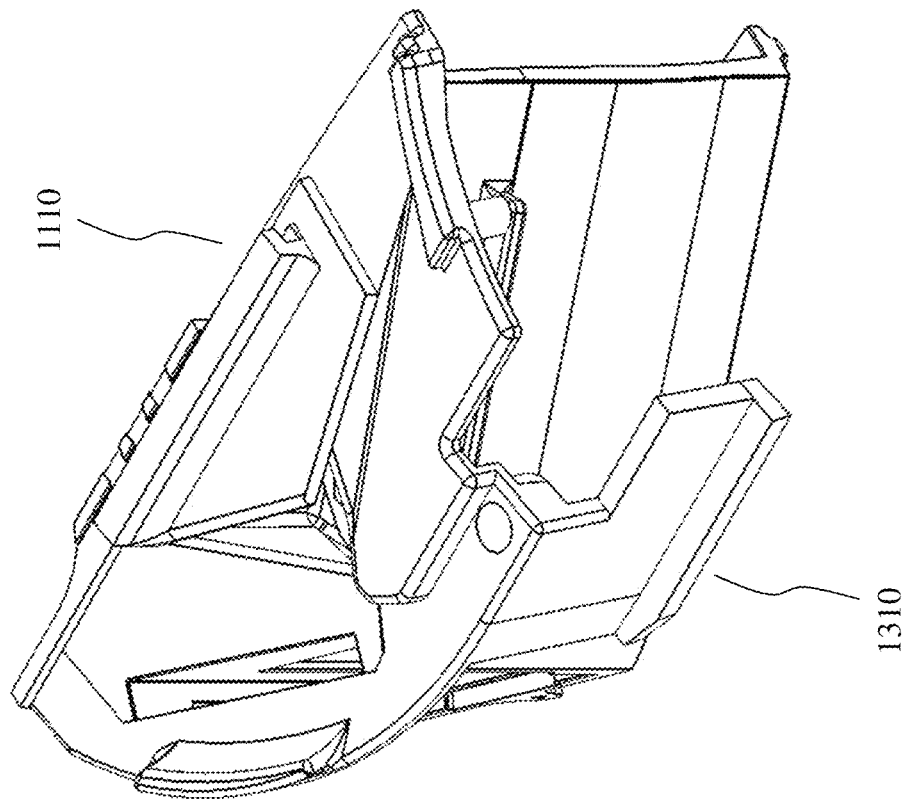

Casing 1110 as depicted in FIG. 11E is repeated as FIG. 12A. Accordingly, FIG. 12B depicts the front face of the Casing 1110 as a discrete element from the viewing perspective of the user. Accordingly, Window 1210 represents the image region within which the MicroDisplay 1120 is projected to the user's pupil via the Prism-Lens 1130. A portion of the Prism Lens 1130 may be covered by an opaque baffle 1220 in order to minimize stray light from corrupting the user's perception of the image. Similarly, where the POD Casing 1110 and Core 1160 are implemented in opaque materials this further prevents stray light from entering other surfaces of the Prism-Lens 1130. FIGS. 12C and 12D depict cross-sections of the Casing 1110 wherein the external geometry of the Prism Lens 1130 is evident. Arrow A depicts the region wherein the MicroDisplay 1120 is positioned. Further, referring to FIG. 13A the Casing 1110 is depicted representing an immersive shell for assembly of the MicroDisplay 1120 and Prism Lens 1130 where the Casing 1110 has Material 1310 disposed proximate the surface S2 of the Prism Lens 1130. In contrast Mounting 1320 in FIG. 18B whilst supporting assembly of the Micro-Display 1120 and Prism Lens 1130 does not have Material 1310 covering that portion of the Prism Lens 1130 allowing room for a Corrector Element to be employed so that there is no opaque material to interfere with the user's view through the Prism Lens 1130 and Corrector Element when the NR2I HMD within which the PODs and a NR2I core are employed supports non-immersive operation wherein the user views their environment through the Prism Lens 1130 and Corrector Element. When such a transmissive Mounting 1320 is employed an alternate design of NR2I Core 1160 would be employed.

Modular and Demountable Hmd

Optionally, the Display Assembly portion of the NR2I HMD may be demountable from the halo frame such as described by the inventors within World Patent Application PCT/CA2016/000,189 filed Jul. 6, 2016 entitled "Methods and Devices for Demountable Head Mounted Displays." The point of connection may in some embodiments of the invention be at the location of the first hinges 110 whilst within other embodiments of the invention it may be at the second hinges 111. The NR2I HMD may also support additional positions either discretely or in a continuous manner such as described and depicted in U.S. Pat. Nos. 8,976,086 and 9,372,348 entitled "Apparatus and Method for a Bioptic Real Time Video System."

Figure 14:
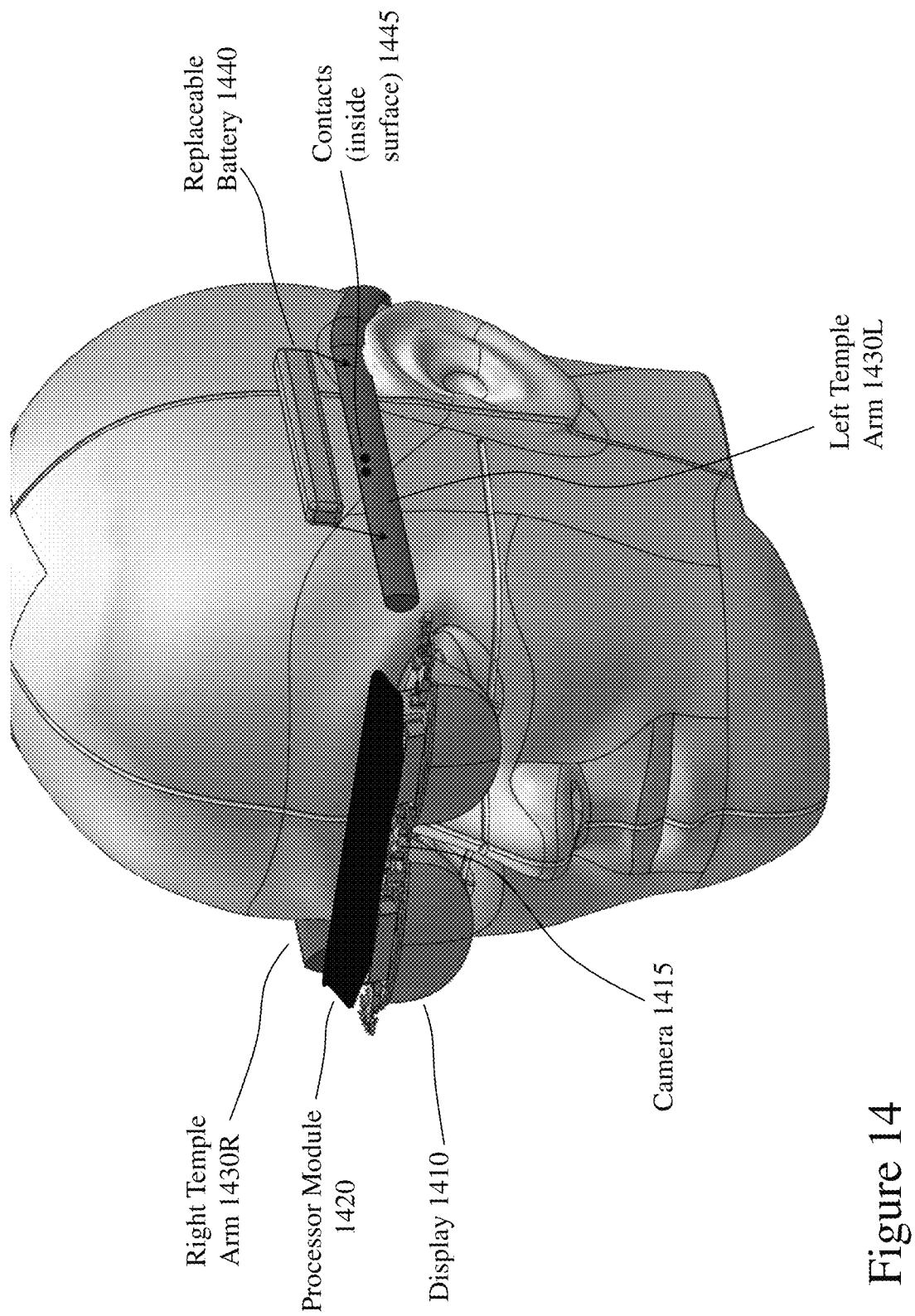
FIG. 14 depicts an alternate modular HMD design wherein modular sub-components are individually replaceable.

Referring to FIG. 14 there is depicted an alternate modular NR2I HMD design. The HMD is comprised of several types of modular components:
- a Display Module 1410 that includes the electro-optic displays, and optionally a camera and other functions from FIG. 19;
- a Processing Module 1420 that acts as a controller for the system and may process image content, communicate over wired or wireless networks, etc.;
- a Right Temple Arm 1430R and a Left Temple Arm 1430L, hereinafter Temple Arms 1430s; and
- Replaceable Batteries 1440 that mate with one or more Temple Arms 1430 using contacts 1445.

Electrical and mechanical connections are made where Temple Arms 1430 meet the Display 1410, where the Processor 1420 meets the Display 1410, and where the Battery 1440 meets the Temple Arms 1430. In one embodiment the electrical connection between Temple Arms 1430 and Display Module 1410 is implemented using a USB Type C connection although it would be evident that a wide range of standard and custom electrical connector formats may be employed. In one embodiment one of the temple arm modules acts as a battery module and provides power, for example over the USB Type C interface, and the other temple arm has at least two variants, one of which contains a processing element and one of which does not. That is, in one embodiment the Processor Module 1420 is located not above the Display Module 1410 but is instead located in one of the Temple Arms 1430, and the battery located in the other. Power flows from the battery-temple arm through the Display 1410 and into the other Temple Arm wherein resides the processor.

In one embodiment there is no image-processing functionality implemented within the HMD. Accordingly, in this embodiment the image data received from Camera 1415 is sent over a wired or wireless connection to a paired PED or FED, and video information from the paired PED or FED is sent to the HMD, wired or wirelessly, and then sent to the display module for display. In one embodiment a USB type C connection is used wherein image data from the PED is sent using the DisplayPort protocol for display on the HMD, and image-data from the display-mounted Camera 1415 is sent to the PED using a USB 3.0 data stream. In the case where there is little or no image-processing capability in the modular design, the image pre-distortion functions described herein may be executed upon a paired PED or FED. The advantage of the modular design being flexibility and potentially lower cost when used with paired PEDs which already contain substantial processing power, memory, wireless interfaces etc.

Figure 15:
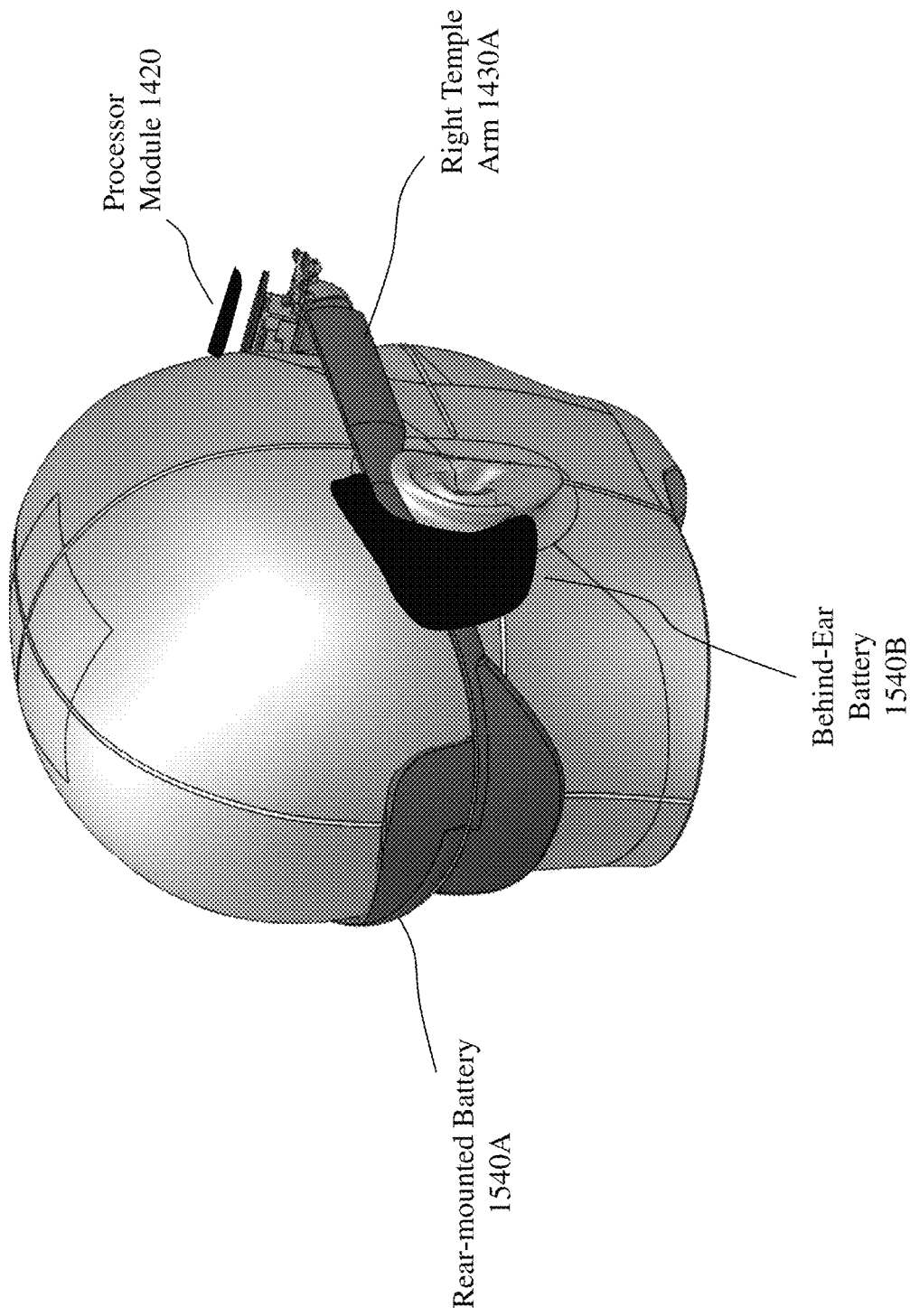
FIG. 15 depicts alternate battery locations for the modular HMD design of FIG. 14.

Referring to FIG. 15, a rear view of a Modular HMD according to an embodiment of the invention is depicted wherein alternate locations for the battery are illustrated. The Rear-Mounted Battery 1540A is attached to extensions of the Temple-Arms 1430 that wrap around behind a wearer's head. An alternate arrangement where the battery is located behind the user's ear is shown as 1540B. In this latter arrangement the Temple-Arm 1430 may be divided into two pieces, the rearmost piece holding the battery, which is designed with a curved shape to fit around and behind a user's ear as shown in FIG. 15, and the front part of the Temple-Arm 1430 is either removably or fixedly attached to the Display Module 1410 (not shown for clarity) and/or Processor Module 1420.

Figure 16:
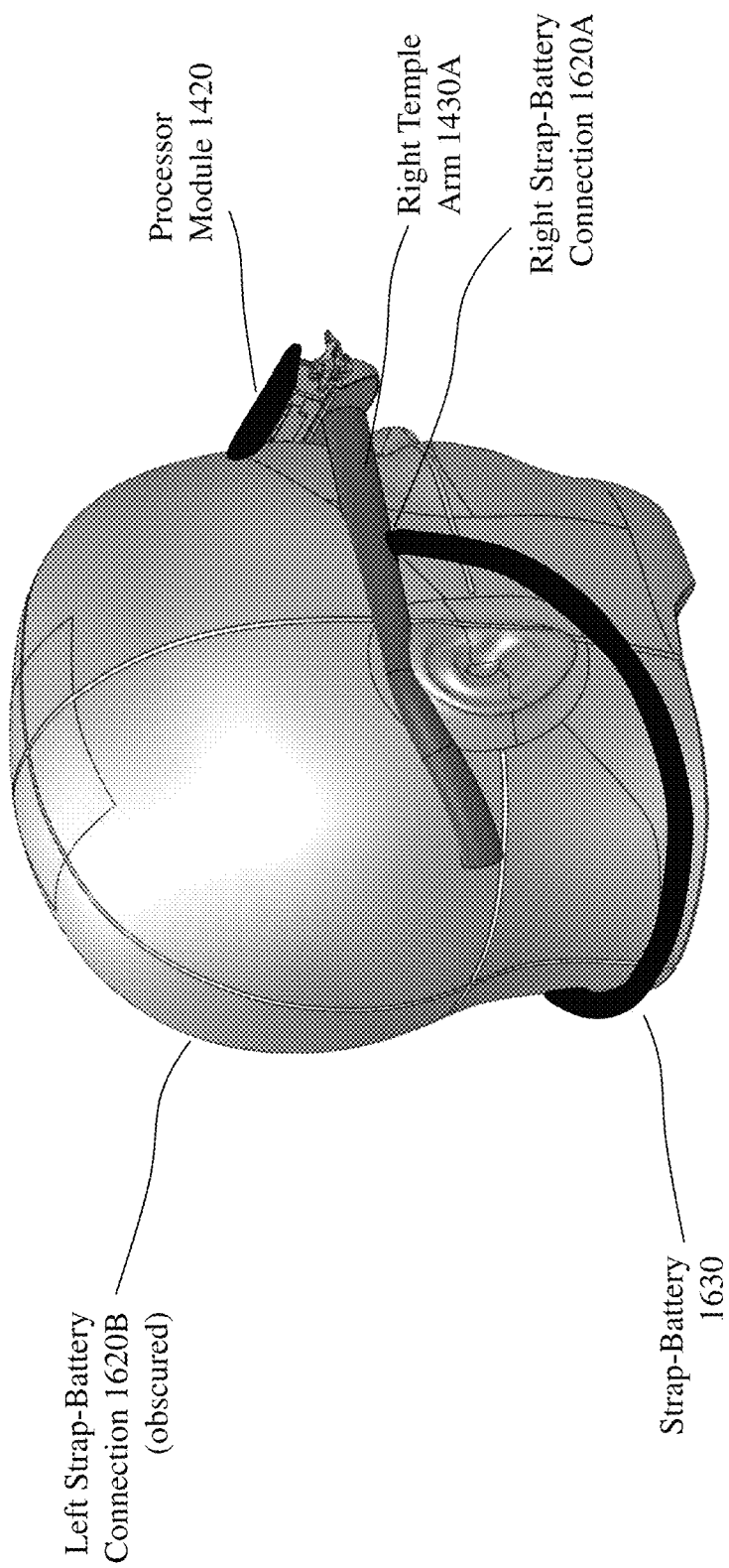
FIG. 16 depicts another alternate battery design and location for the modular HMD design of FIG. 14.

Referring to FIG. 16 there is depicted an alternate design methodology, referred to by the inventors as a "Strap-Battery", wherein battery cells are located in a flexible strap-like assembly that runs from one Temple Arm 1430R to the other 1430L, making electrical contact with at least one of the two temple arms for the provision of power, the temple arms providing electrical connection to provide power to the Display 1410 and Processor 1420. The Connections 1620A and 1620B may also include features for the bearing of the weight of the Strap-Battery 1630. The Connections 1620 may be made at an orthogonal angle to the Temple Arms 1430 as shown in FIG. 16, or may be made in-line at the end of the Temple Arms 1430. In one embodiment the Strap-Battery 1630 has cells distributed along its length, whereas in another the cells are centrally located along the length of the Strap Battery 1630, and these cells may lie either behind the user's neck as shown in FIG. 16, or in front (not shown). Optionally, the Strap-Battery 1630 may be detachable allowing replacement or it may be attached constantly to the HMD. Optionally, where a removable battery is provided then a small battery may also be provided within the HMD such that temporary disconnection and replacement of a replaceable battery does not result in the HMD powering down, what might be considered to be a "hot swap" of one battery for another.

Within the following section with respect to intelligent safe battery subsystem design, the concepts are universal and might be applied to any of the foregoing physical implementations of a battery or batteries for an HMD according to an embodiment of the invention. However, it would be evident that the techniques, designs, etc., described for HMDs may be applied to other wearable devices, PEDs, etc. For simplicity within the following section Battery 116 from FIG. 1 is referenced, although the embodiments of the invention may be applied to any of the battery concepts discussed within this specification.

Intelligent Safe Battery Subsystems

As described and depicted below in respect of Schematic 1900 in FIG. 19 the NR2I HMD includes a Battery Sub-System 1940 which includes the Battery 116 as depicted in FIGS. 1 and 2 or alternate battery configurations such as described and depicted with respect to Replaceable Battery 1440 in FIG. 14, Rear-Mounted Battery 1540A or Behind-Ear Battery 1540B in FIG. 15, and Strap-Battery 1630 in FIG. 16. As noted there may be multiple Batteries 116, and additional batteries internal to the HMD located in the frame, arms, or display. Further, a battery may contain features to improve ease-of use by the user, particularly vision-impaired users. Accordingly, the Battery 116 may be hot-pluggable, and may be removed and replaced whilst the NR2I HMD is in operation. While the description of the intelligent battery operation described herein is in the context of powering an HMD, such a battery subsystem might be employed in powering any manner of host device, including but not limited to PEDs, FEDs, and wearable devices. Accordingly, embodiments of the invention may include one or more protection features including, but not limited to:

Battery power terminals are not live when the Battery 116 is removed, i.e. by default the outputs are disabled until a Battery 116 is inserted into a host device;

Detection of a short circuit results in the Battery 116 entering a "pause" mode wherein it will subsequently attempt re-connection periodically;

Detection of a short circuit by the Battery 116 once inserted and operation greater than a predetermined duration threshold (for example 100 ms) results in the Battery 116 disabling until removed.

Optionally, the Battery 116 may provide an independent indication of state-of-charge to any provided to the user of the HMD or other device the battery is connected to. Optionally, the Battery 116 may include internal linear and/or rotational inertial sensors allowing display of the state-of-charge of the Battery 116 via the following process:

if an inertial sensor associated with the Battery 116 indicates no motion, do nothing; and if the inertial sensor indicates motion or motion is detected in a specific manner, for example "shake to wake", an internal microprocessor within the Battery 116 determines the state-of-charge and provides feedback to the user.

The "shake to wake" function of the Battery 116 may, within embodiments of the invention, exploit a monitoring or "sleep" state for the Battery 116 wherein the internal microprocessor remains in a low-power state until the inertial sensor or inertial sensors determine whether an appropriate sequence of motion or motions are detected indicating to the internal microprocessor that the Battery 116 should be "woken" from the monitoring/sleep state. For example, the microprocessor or sensor itself may apply appropriate filtering to the inertial sensor output in order to remove, for example, higher frequency variations indicative of vibration and/or low frequency variations indicative of motion of a user walking with the battery in a pocket, backpack etc. The filtering may employ acceleration thresholds in determining its output. The raw and/or filtered inertial sensor signals may be processed with one or more algorithms to determine whether the appropriate "shake to wake" motion or motions have been made by a user with the Battery 116. The motion-filtering functions may be shared between the processor and the sensor itself, for example by the processor providing threshold-levels to the sensor, only above which shall it be interrupted. The filtering functions may reject motions in only a subset of all axes, for instance, requiring motion in multiple axes above a certain threshold before waking the microprocessor. In some embodiments these acceleration thresholds are set at 1G or higher. For example, the detected motion to trigger the waking of the Battery 116 may be a number of approximately circular or rotational motions, a number of defined essentially linear motions in one or a number of directions, a series of short motions defining a predetermined sequence (e.g. a pair of short motions vertically, a pause, and a pair of short lateral motions or rotations). The filtering and/or algorithms are intended to differentiate a deliberate "shake to wake" from false triggers arising from motion of the Battery 116 during different stages such as shipping, storage, being carried by a user, stored in a vehicle, etc. Filtering functions may be adapted through machine-learning: a repetitive motion-pattern may be learned and rejected, for example the repetitive accelerations experienced during normal walking or running gait.

Feedback to the user may be provided in one or more means including, but not limited to, visual means such as multiple LEDs each indicating a partial state-of-charge, or an LED blink-rate or colour corresponding to state-of charge, tactile, e.g. the battery could buzz multiple times proportional to the state-of-charge, or audio means may be employed, for example a single beep for empty, four beeps for full, or the tone of a beep may vary or a spoken word may be given, e.g. "empty", "full", "50% charged".

Figure 17:
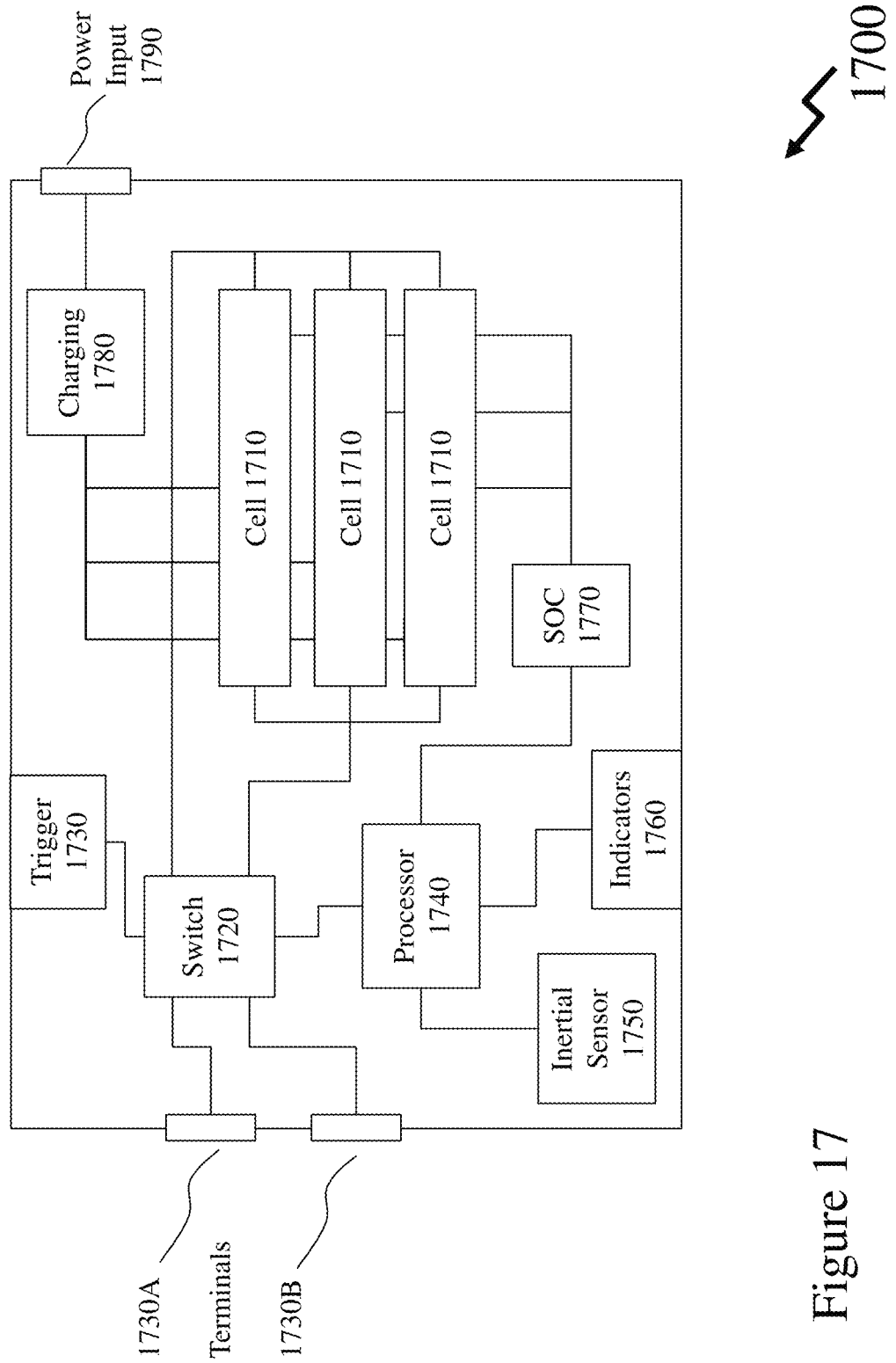
FIG. 17 depicts the internals of an intelligent battery design for HMDs.

FIG. 17 depicts schematically a Battery 1700 according to an embodiment of the invention such as may be employed to provide Battery 116. For clarity, not all functional connections are shown, for instance the Trigger 1730 may also be directly connected to the Processor 1740, as might be the Charging circuit 1780, or other components. As depicted Battery 1700 incorporates a plurality of Cells 1710 which are coupled via a Switch 1720 to the Terminals 1730A and 1730B of the Battery 1700. The Switch 1720 being connected to a Trigger 1730 which detects insertion of the Battery 1700 within the housing upon the host device. Only upon insertion into the host, then insertion detection from Trigger 1730, and then closure of Switch 1720 does power flow from the Battery 117 to the host device.

Also connected to the plurality of Cells 1710 is a Processor 1740. The Processor 1740 being coupled to an Inertial Sensor 1750 and Indicator Means 1760. The Inertial Sensor 1750 providing motion data to the Processor 1740 such as described above to allow activation and charge state to be determined independent of the Battery 1700 being inserted into the host. The Indicator Means 1760 such as described above may provide one or more of audible, visual and tactile outputs dependent upon the state of charge of the Battery 1700. The Processor 1740 is also connected to a State of Charge Detector 1770 which detects the state of charge of the plurality of Cells 1710. The plurality of Cells 1710 are also coupled to a Charging Circuit 1780 which is coupled to a Power Input 1790 connector.

Optionally, the Trigger 1730 may be a mechanical switch which is depressed as the Battery 116 is inserted into a housing forming part of the host device. Optionally, the Trigger 1730 may be a Hall sensor detecting a magnet within the housing forming part of the host device. Optionally, the Trigger 1730 may be directly coupled to the Switch 1720 or it may be coupled to the Processor 1740 which then determines the state to put the Switch 1720 into. Optionally, trigger detection is performed using voltage and/or current-sensing at the Terminals 1730A and/or 1730B.

Optionally, the Battery 116 may incorporate a wireless interface, e.g. BLE, allowing communication to a PED or FED for example allowing the triggering of an alarm or indication to the user with respect to the state of charge of their spare battery(ies) so that they can monitor these rather than finding it is uncharged when they go to insert it.

Figure 18:
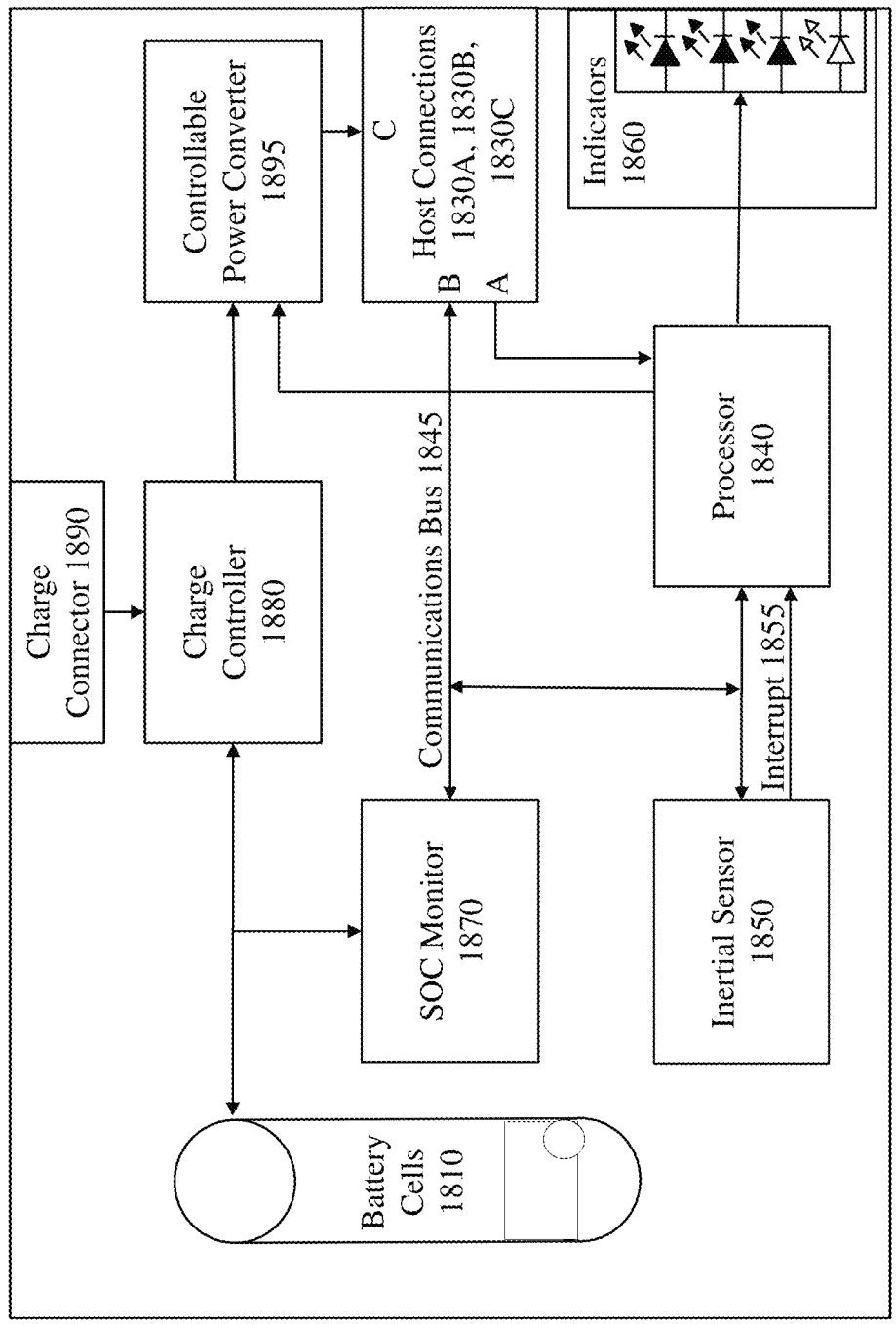
FIG. 18 depicts an alternate implementation of an intelligent battery design for HMDs.

Optionally, the Battery 116 may be implemented as shown schematically in FIG. 18. In this configuration the processor remains asleep and consuming little power when the Battery 116 not yet inserted in the host device. Upon motion detection as described in supra the processor is awoken using Interrupt 1855, and may read sensed motion from the Inertial Sensor 1850 using Communication Bus 1845. If the motion detected indicates the user wishes to see the state-of-charge (SOC) using indicators, the Processor 1840 may communicate with the SOC Monitor 1870 using the Communications Bus 1845, for example but not limited to I2C, SPI, or others, and thereupon communicate that status to the user using indicators 1860. One or more indicators may be differentiated in colour, sound, vibration etc. to indicate important or critical status, as shown.

The processor may also be interrupted using signal 1830A. This signal is resistively pulled high to a logic level "1" and shorted to ground (or logic level "0") upon insertion to generate the interrupt. When the processor is awoken in this manner, upon determination of a safe state of charge it enables the Power Converter 1895 to provide power to the host connector 1830C. Until this closed-loop sequence of events occurs, the host Contacts 1830 are unpowered and in a high-impedance state.

Further, voltage translation and signal buffering are provided on Communications Bus 1845 at interface 1830B such that until power is supplied to the host through 1830C the Bus 1845 is isolated from the connector pins. Once the battery is inserted and 1830C is being powered, the Processor 1840 ceases to operate as the sole master of the Communications Bus 1845, and relinquishes control to the host processors so that they might directly inspect the battery state of charge and other parameters using Communications Bus 1845 and interface 1830B. Upon detection of signal 1830A returning to the logic "1" state, indicating removal from the host, the processor immediately disables the Power Converter 1895 thus stopping power-flow at 1830C, and it resumes mastership of the Communications Bus 1845.

In operation the Power Converter 1895 performs autonomous short-circuit detection and current-limiting. The Processor 1840 monitors the voltage supplied at terminals 1830C, and if below a given threshold for a given length of time will disable the Power Converter 1895 and enter a special state where it requires battery removal (as detected using 1830A) and subsequent re-insertion before attempting to re-enable the Power Converter 1895. Appropriate level and duration values of approximately 60% of nominal voltage for 100 mS in order to trigger this shutdown mode have been used, though any suitable values may be chosen. Thus through a number of mechanisms the Battery 116 is rendered both safe and easy to use.

HMD Hardware

Figure 19:
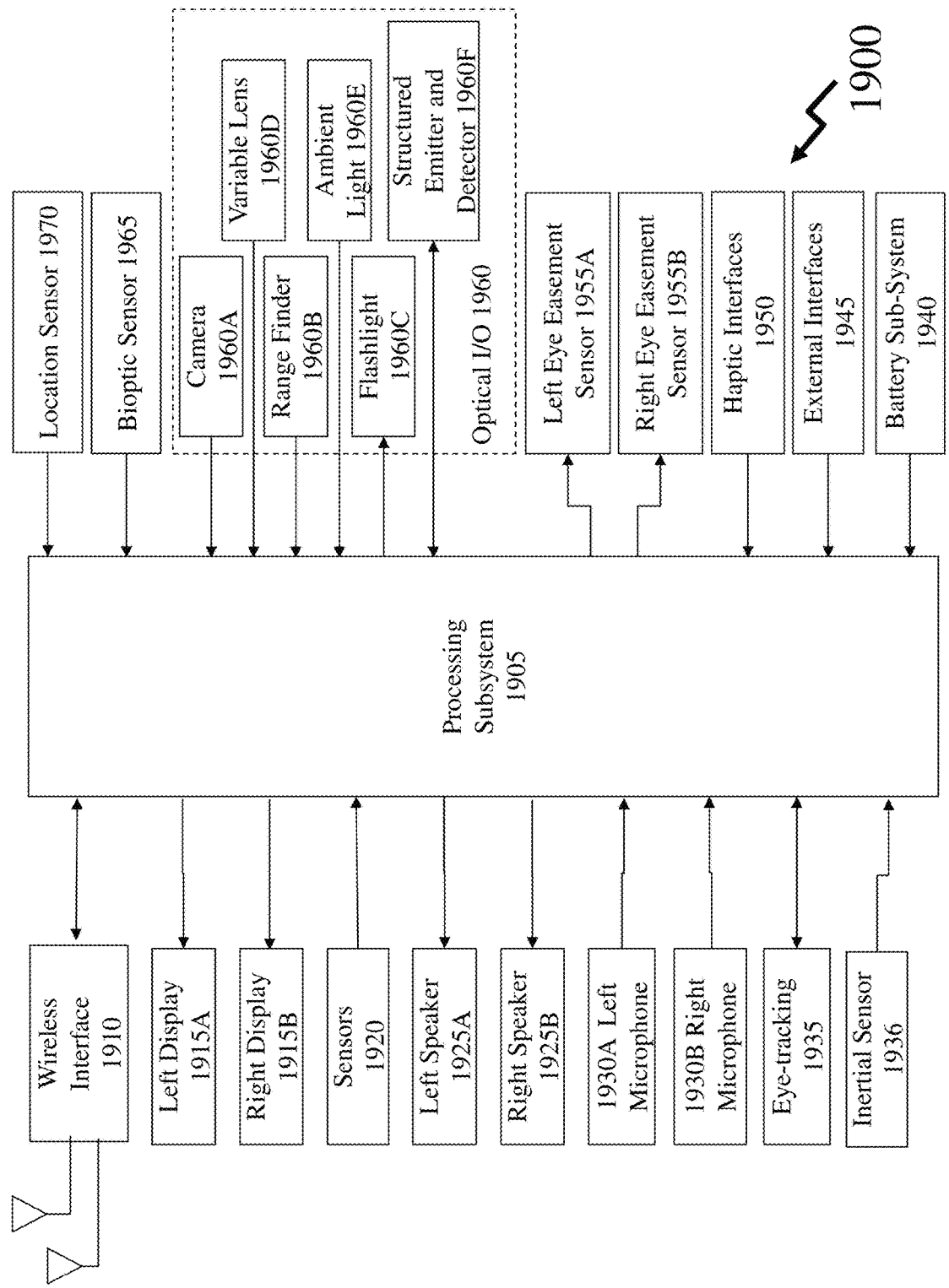
FIG. 19 depicts the hardware elements of an HMD system.

Now referring to FIG. 19 there is depicted a simplified Schematic 1900 of a NR2I HMD according to an embodiment of the invention. As depicted a Processor 1905, for example a processing subsystem comprising memory, microprocessor(s), image- or graphics-processors, and input/output interfaces is connected to a series of elements. As depicted on the left hand side of Schematic 1900 these comprise:

Wireless interface(s) 1910, such as Bluetooth, Wi-Fi, WiMAX etc. by which the NR2I HMD communicates with local and global communications networks, ancillary devices, other elements of the NR2I HMD, a PED or a FED for example;

Left display 1915A within the left POD of the NR2I HMD for rendering content to a left eye of a user of the NR2I HMD;

Right display 1915B within the right POD of the NR2I HMD for rendering content to a right eye of the user of the NR2I HMD;

Sensors 1920 which can provide additional contextual and environmental information to the NR2I HMD;

Left speaker 1925A, for example, within the left temple arm of the NR2I HMD for providing audio information to a left ear of the user;

Right speaker 1925B, for example, within the right temple arm of the NR2I HMD for providing audio information to a right ear of the user;

Left microphone 1930A, for example, within the left temple arm of the NR2I HMD for receiving audio information from the user and/or the user's environment;

Right microphone 1930B, for example, within the right temple arm of the NR2I HMD for receiving audio information from the user and/or the user's environment;

Eye-tracking subsystem 1935 for tracking the position of the user's eye and direction of the user's gaze; and Inertial Sensor 1936 for detecting motion of the NR2I HMD.

As depicted on the right hand side of Schematic 1900 these comprise:

Battery Sub-System 1940 which provides electrical power to the NR2I HMD including the Battery 116 and associated charger interface, power management circuits etc.;

External interfaces 1945 which provide connectivity of the NR2I HMD to external devices through wired connections, e.g. though USB and HDMI connectors etc.;

Haptic interfaces 1950 which allow the user of the NR2I HMD to enter commands or select functionalities etc. such as navigating the menu of software options etc. Such haptic interfaces 1950 may include a touchpad within a temple arm of the NR2I HMD, a touchpad upon the side of the Display Assembly, etc.;

Left Eye Easement Sensor 1955A, for example, within the left temple arm of the NR2I HMD to provide data to the Display Assembly with respect of the eye easement position of the Display Assembly;

Right Eye Easement Sensor 1955B, for example, within the right temple arm of the NR2I HMD to provide data to the Display Assembly with respect of the eye easement position of the Display Assembly;

Optical I/O 1960 wherein
optical inputs (data) are acquired by the NR2I HMD through interfaces including, for example, Camera 1960A, Range Finder 1960B, Variable Lens 1960D (allowing extraction of depth information or providing wide depth of focus for example) and Ambient Light 1960E;

optical outputs are generated by the NR2I HMD through interfaces including, for example, Flashlight 1960C; and optical outputs are generated by the NR2I HMD with associated optical inputs acquired by the NR2I HMD through interfaces including, but not limited to, Structured Emitter and Detector 1960F;

Bioptic Sensor 1965 wherein the rotary position of the Display Assembly relative to the NR2I HMD is detected through a sensor and employed, for example, to disable displays when raised or adjust displayed content in dependence upon the rotation angle; and Location Sensor 1970, for example, a global positioning system (GPS) subsystem.

An Optical I/O 1960 may further comprise a high dynamic range optical sensor comprising an optical sensor and at least one micro-shutter of a plurality of micro-shutters.

The Left Eye Easement Sensor 1955A and Right Eyer Easement Sensor 1955B, when implemented, provide the Processing Sub-System 1905 with positional information with respect to the position of the Left Display 1915A and Right Display 1915B. These may be discretely positionable or within a single housing wherein the temple arms, such as described and depicted in FIG. 1, allow for the overall distance of the displays to be adjusted relative to the user's face but also allow for it to be "twisted"/rotated relative to the user's coronal plane. This data may be used to adjust one or more aspect of the rendered content upon the Left Display 1915A and Right Display 1915B. Optionally, a minimum distance may be set to avoid eye strain on the user wherein the Left Display 1915A and Right Display 1915B are turned off if the user brings the Left Display 1915A and Right Display 1915B too close to their face.

Monolithic Versus Service-Oriented Software Architectures: Web/Enterprise

As computing and communications technology have evolved there has been a consistent transition from monolithic computing towards distributed and parallel computation in mainframe, enterprise, and internet-based services. In early days systems were designed as "single monolithic applications" wherein each application was responsible for all aspects of its execution, making calls upon an operating system for access to needed resources. As the cost of maintaining and evolving such systems began to grow exponentially, internet application system architects developed a design methodology that allowed decomposition of application functions into a set of services each of which have a defined Application Programming Interface (API) and set of services offered. This architectural change has allowed rapid evolution and scaling of internet-based services.

Service Oriented Architectures (SOAs) and software differ from past paradigms in their underlying design principles and design philosophy in that a service expresses behaviors as capabilities in the abstract divorced from any state data which is particularly useful for a technology platform exploiting web services. This arises as web services rely on the stateless HyperText Transfer Protocol (HTTP) to exchange messages coupled with which a web service contract cannot define a private operation unlike prior art object-orientated design methodologies which attributed attributes to associate behaviour and data with objects (software elements). The Web services technology platform introduces unique design considerations that are readily met by SOA design principles.

Figure 20:
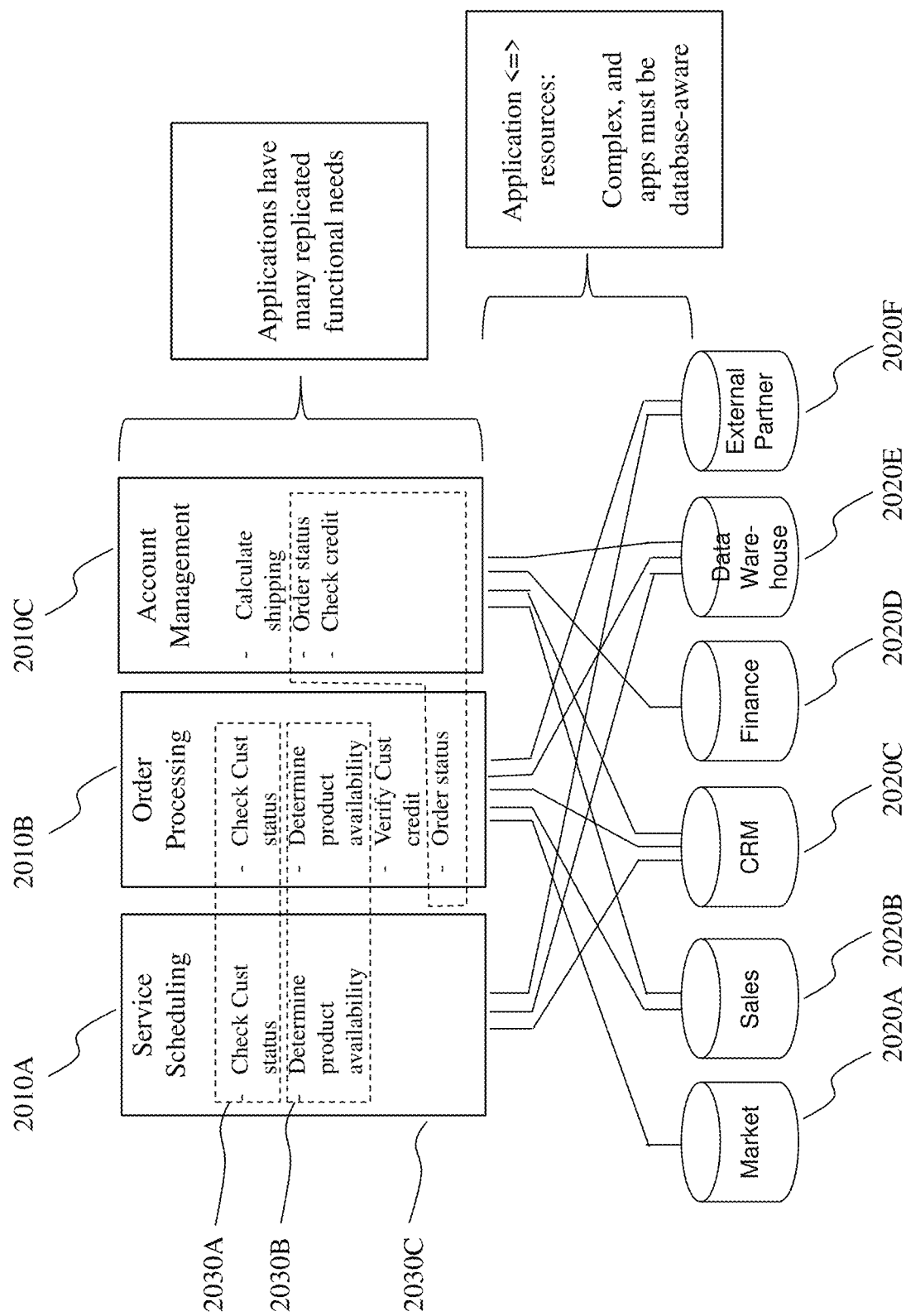
FIG. 20 depicts a traditional enterprise software application architecture.
Figure 21:
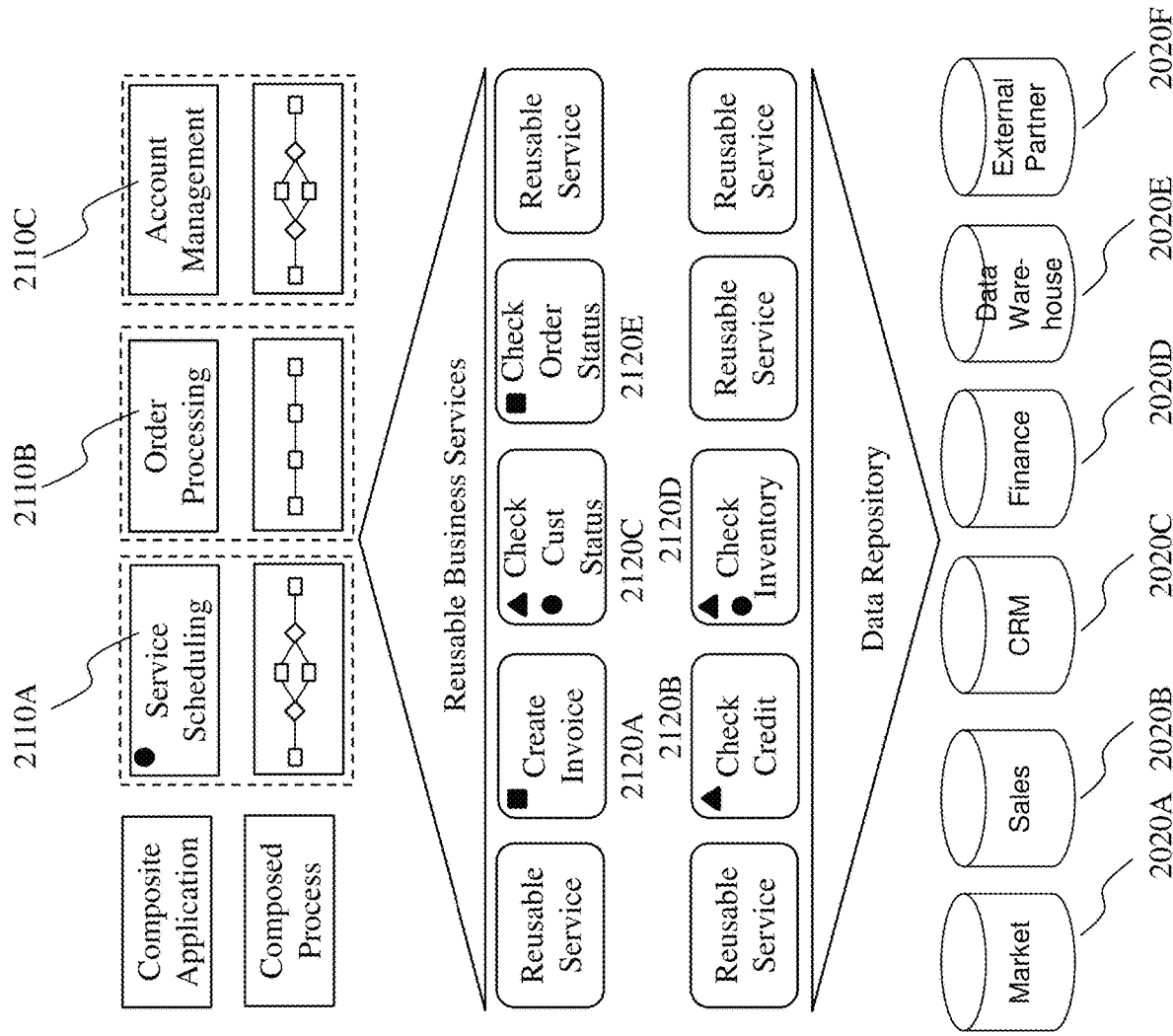
FIG. 21 depicts a service-oriented architectural approach to the same applications as in FIG. 20.

This differentiation in architectural approach in modern Internet, Web, and Enterprise services such as depicted schematically in FIGS. 20 and 21. In FIG. 20 an exemplary monolithic application approach is depicted wherein three applications 2010A, 2010B, and 2010C are required to fulfill business needs, namely Service Scheduling, Order Processing and Account Management, respectively. Each may require access to various data repositories, Repositories 2020A through 2020F for Marketing, Sales, Customer Relationship Management (CRM), Finance, Data Warehouse, and External Partners, respectively. Within this architectural approach not only are functions, such as first to third Functions 2030A through 2030C respectively, required but they are replicated in multiple applications. Further, each application must be aware of and able to query and update a variety of databases. Accordingly, there are a large number of "couplings" in this system between applications and databases that make evolution and feature enhancement extremely difficult and error-prone.

This is to be contrasted with a Services-Oriented Architecture of FIG. 21, wherein the same application-layer features and functions are provided, but within a services-oriented architecture. Instead of complex monolithic applications 2010A-2010C with duplicated code 2030A-2030C, we now have much simpler Composite Application layer with Composite Applications 2110A, 2110B, and 2110C that implement the required business logic as a composed process of service requests to a set of reusable services, for example first to fifth Reusable Business Services 2120A through 2120E. In this example, the Service Scheduling application 2110A makes use of third and fourth Reusable Business Services 2120C and 2120D to check customer status and inventory, respectively. The Order Processing application 2110B makes use of second to fourth Reusable Business Services 2120B, 2120C, and 2120D respectively to check customer credit, status, and product inventory, respectively. The Account Management application 2110C makes use of first and fifth Reusable Business Services 2120A and 2120E respectively to create invoices and to check order status, respectively. It would be evident that within the Services Oriented architecture of FIG. 21 that:

the Composite Applications 2110A, 2110B, and 2110C do need to be aware of the details of data storage in the data repository;

functions that previously required replication in multiple applications have now been moved into services with standard interfaces (APIs) so that re-use by multiple applications is now possible (e.g. first to fifth Reusable Business Services 2120A-to 2120E respectively);

individual components of the architecture may now be co-located or remote, implemented in the same or different programming languages, running on the same or different operating systems, and there may be only a single instance thereof, or the component may be replicated so that multiple instance may run in parallel, providing improved performance.

Figure 22:
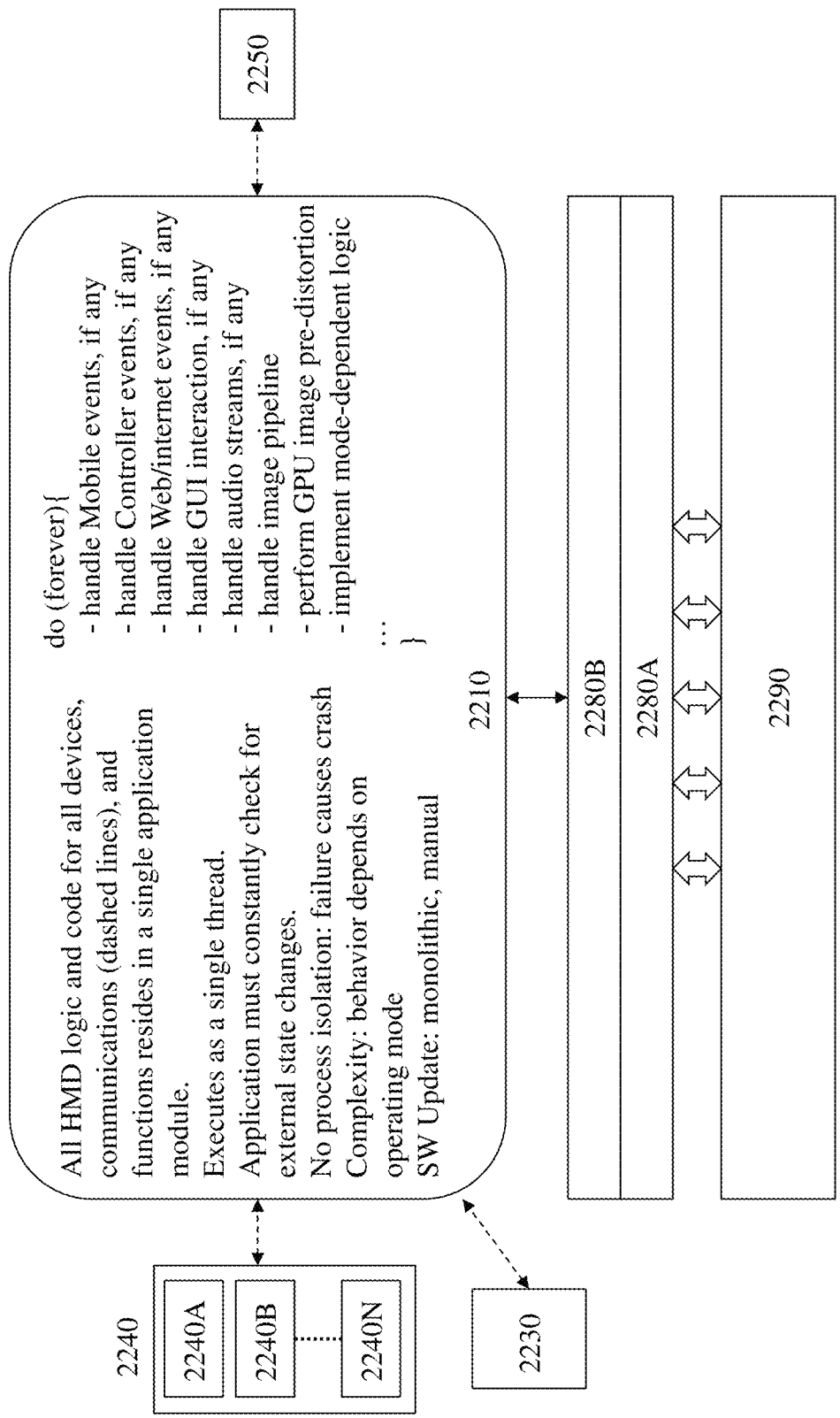
FIG. 22 depicts typical prior-art HMD monolithic software architecture.

Referring to FIG. 22 a monolithic HMD application architecture representative of prior art is depicted schematically wherein an HMD application 2210 executes upon an Operating System 2280B employing a Firmware Layer 2280A in order to access HMD Hardware 2290. The single Application 2210 is responsible for interacting with all external devices such as PED 2240, HMD Controller 2230, and Web Application 2250. The application should support the multiple modes of operation desired, and interpretation of external events may be dependent on operating mode, making code complex, and requiring code to be replicated amongst the operating modes. The application should also handle the image pipeline and any transformations required in real-time, yet execute as a single thread, rendering speedup through concurrent execution impossible. Further, as the operating modes are all within a single execution context, a fault in one operating mode may cause failure of all modes and a total system crash. Software updates in this architecture require a complete application image and are manually invoked at the HMD. Such an architecture is rigid in terms of its ability to accommodate future change, and fragile in terms of its ability to tolerate faults.

Accordingly, the inventors have established a "micro-service"-based architecture for HMDs so that the HMD might interoperate with other services and leverage a cloud-services-oriented design approach in a hybrid HMD-embedded/enterprise/cloud network environment. The instant application discloses means to extend the internet-based services-oriented architecture into the embedded realm, particularly for HMDs.

Micro-Services and Service-Oriented Architecture (SOA)

A NR2I HMD such as NR2I HMD 100 employs a processor to generate content to be rendered to a user via one or more displays which the user sees through one or more optical trains coupled to the displays. The content may within embodiments of the invention be content acquired directly with the one or more image sensors forming part of the NR2I HMD, content acquired indirectly from another source communicated to the NR2I HMD via an interface of the NR2I HMD, e.g. a wired or wireless interface, content acquired directly or indirectly but processed in dependence upon a user profile stored within the HMD or within a Cloud Database establishing adjustments, corrections, compensations etc. to be applied to the content to enhance the user's viewability of the acquired content, content generated in dependence upon the content acquired directly or indirectly, or content generated in dependence upon a portion of the content acquired directly or indirectly for example, or content synthesized by the NR2I HMD for purposes of user interaction such as menus, status information, data entry windows, or other GUI-related content. Accordingly, the NR2I HMD will exploit a software/firmware/hardware hierarchy, with optional communication to external devices, the internet, and cloud-based services to achieve this.

Figure 23:
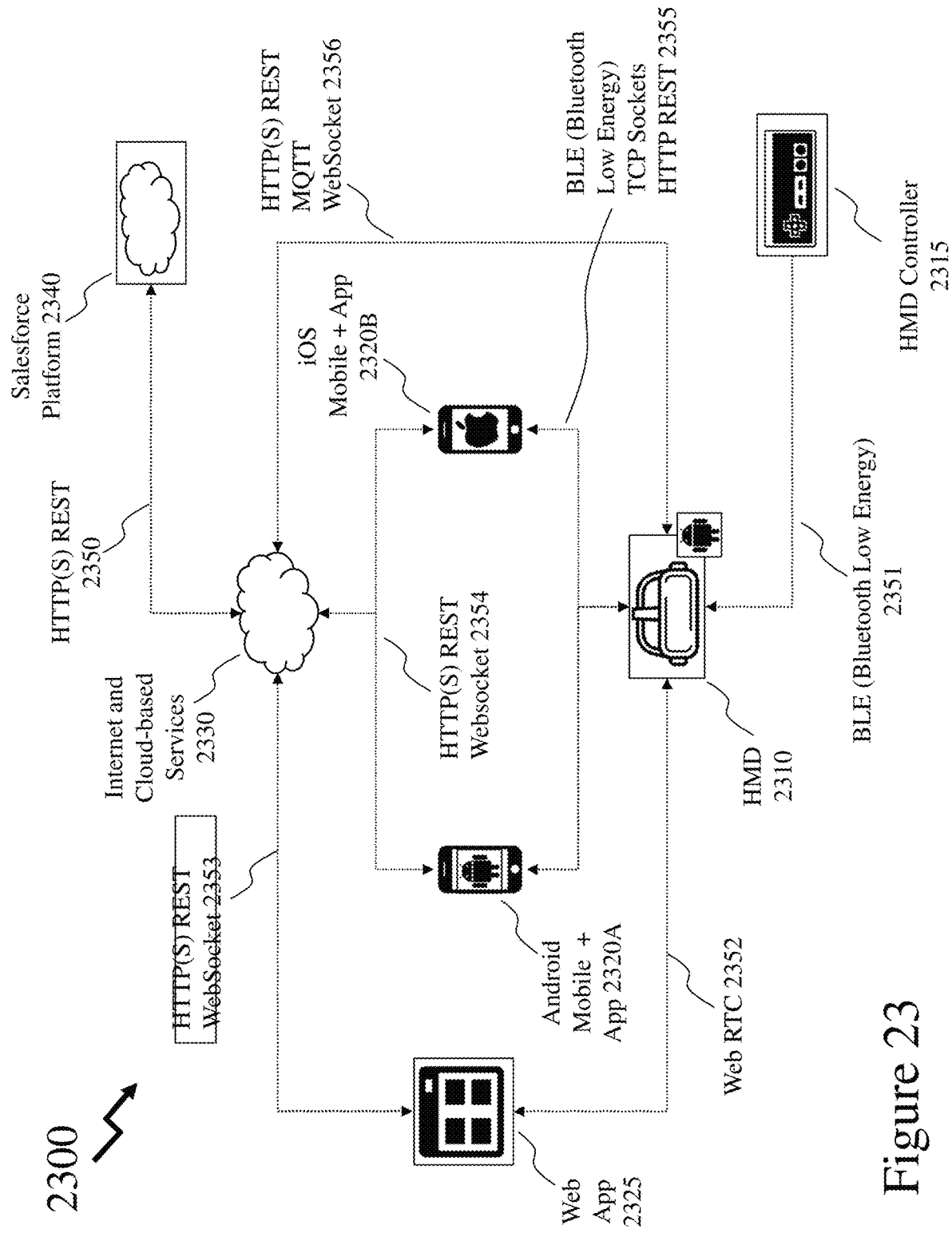
FIG. 23 depicts a novel overall system architecture to support a services-oriented architecture embedded within an HMD.

Referring to FIG. 23 there is depicted a Schematic 2300 of a services-oriented HMD system architecture according to an embodiment of the invention. The very first user interaction may be to make inquiries from the device manufacturer's sales force about a potential purchase. Information about the prospective purchaser of the HMD may be stored in a cloud-based Salesforce Platform 2340. Upon HMD rental or purchase, a state within the Salesforce Platform 2340 may be updated indicating payment details and other information and this data may be made available to other services, for instance through an HTTP(S) Representational State Transfer (REST) Interface 2350. REST allows services, systems, and applications to access and manipulate representations of resources using a uniform and predefined set of stateless operations. The state information within the Salesforce Platform 2340 may thus be shared with the MID vendor's support and other services located within the Cloud 2330 and provided either directly or through cloud services vendors such as Amazon Web Service (AWS), Google, Microsoft Azure, and others.

Upon purchase of the HMD, and further authentication and authorization steps as outlined below, and assuming physical and transport (TCP/IP) connectivity has been established on various links as shown, the services-oriented system architecture 2300 as herein defined and disclosed may become operational. Accordingly, within the embodiment depicted in FIG. 23 this comprises:

Bluetooth Low Energy (BLE) 2351 which may be used to communicate between an HMD controller 2315 and the HMD 2310 for remote HMD control;

Web Real Time Communications (WebRTC) 2352 used to communicate between the HMD 2310 and Web Applications 2325;

HTTP or first HTTPS REST and WebSockets 2353 are used to communicate between Web Applications 2325 and Cloud-based Services 2330;

HTTP or second HTTPS REST and WebSockets 2354 are used to communicate between Mobile Devices 2320A, 2320B and Cloud-based Services 2330;

BLE, TCP Sockets, and HTTP REST 2355 used to communicate between Mobile Devices 2320A, 2320B and the HMD 2310;

HTTP or HTTPS REST, Message-Queueing Telemetry Transport (MQTT) and WebSockets 2356 used to communicate between the HMD and Cloud-based Services 2330.

Figure 24:
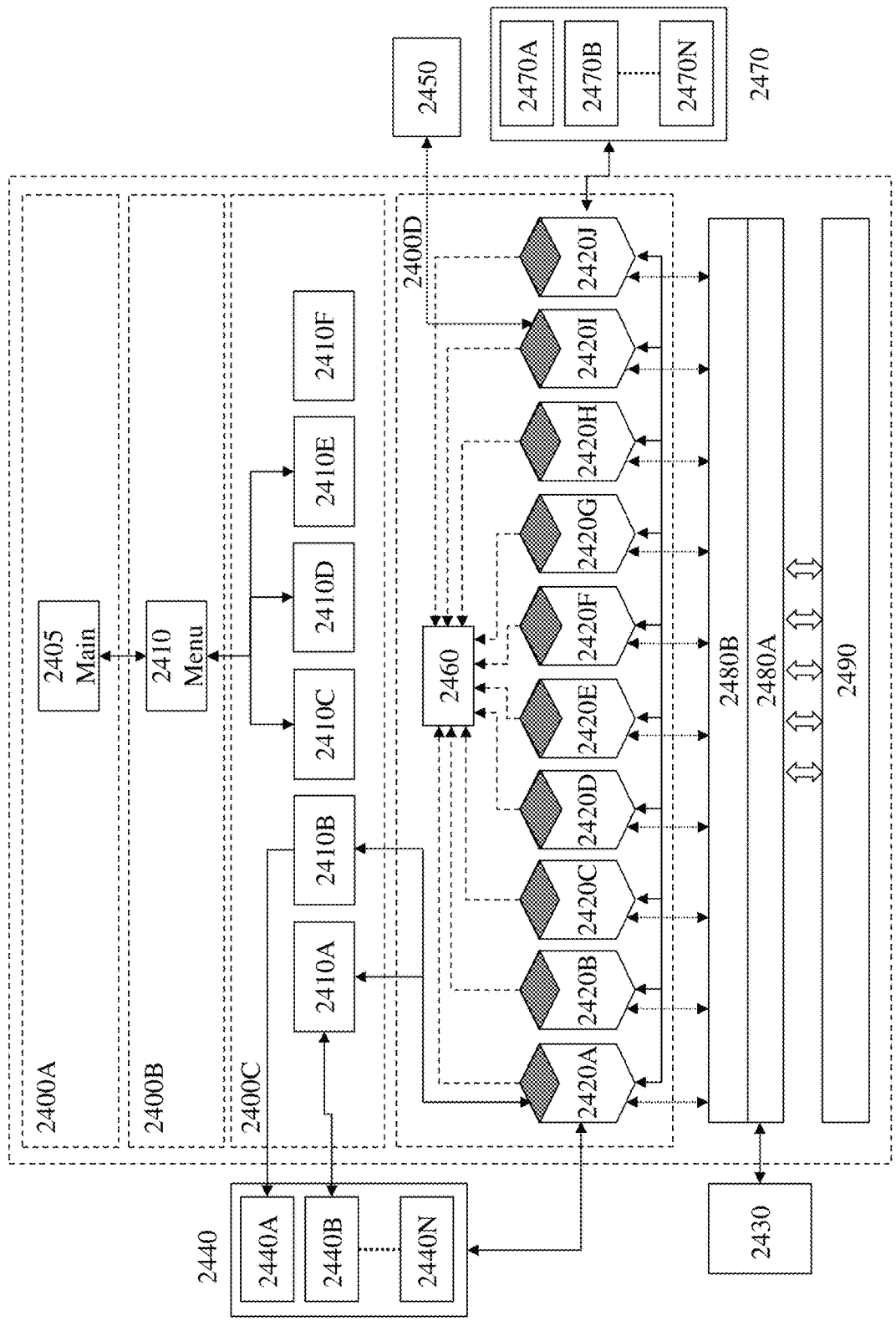
FIG. 24 depicts a novel service-oriented software architecture and software/firmware/hardware hierarchy of an HMD according to an embodiment of the invention.

Referring to FIG. 24 there is depicted a Schematic 2400 of a software/firmware/hardware hierarchy of a NR2I HMD according to an embodiment of the invention exploiting a novel self-contained micro-service orientated architecture including secure on-boarding functionality as well as allowing access to other software functionality/features/upgrades through external repositories. The micro-service-orientated architecture employed within embodiments of the invention exploits a plurality of software-based services and micro-services which employ one or more protocols or application programing interfaces (APIs) to describe how they pass and parse messages using description metadata. SOA as employed within embodiments of the invention therefore provides an architecture for building software that supports the decoupling of core software functions from their physical implementation(s). Accordingly, the SOA allows a NR2I MID vendor or a third party to establish software which is supported, by virtue of this decoupling, by multiple NR2I HMD implementations according to embodiments of the invention. It further allows the MID applications and micro-services to interact with cloud-based services using standard internet protocols. Within the HMD device itself, either internet protocols or standard operating system inter-process messaging may be used to communicate between micro-services.

Accordingly, as described and depicted in respect of FIG. 24 using the SOA software is decomposed into a number of smaller software programs, these being referred to as "reusable micro-services" or "micro-services" wherein these micro-services are distinguished by the fact that the logic they encapsulate can be generic, potentially suitable for many purposes and many hardware implementations including HMDs and other devices, and thus can reused. Beneficially, SOA software allows for a broadened, enterprise-centric emphasis on long term governance, compliance, and benefit. Accordingly, micro-services may make use of other micro-services and can be used by multiple parent software programs to automate multiple tasks.

The micro-services established therefore represent a micro-service inventory wherein the HMD vendor, a supplier of elements of the HMD, or a third party when generating new software, a software program or program, can search its own and/or third party accessible micro-service inventories to identify existing micro-services that can be utilized to automate a portion of the program being developed. Accordingly, whilst reducing the loading on program developers from having to build programming logic that already exists it also means that micro-services can also be reused without disturbing the underlying implementations, thus reducing the potential for errors and greater testing when new functionality and processes are added to a specific platform or platforms, e.g. an HMD. During this process therefore multiple micro-services may be chosen to collectively implement a portion of the program, this being referred to as a micro-service composition, in order carry out a specific task or sub-task of a larger task. Accordingly, the SOA architecture and its associated micro-services described and depicted in respect of FIG. 24 allow for the specific functionalities as described and depicted but they allow through their nature their reuse in other functionalities with other micro-services. Each micro-service is a fully isolated process operating in an isolated context so that a failure or fault in one does not impact others. A micro-service that is stalled waiting upon some event need not stall other micro-services. Guard processes may be used to monitor for the presence of running micro-services, and such guard processes may restart, required micro-services upon detecting their absence.

Hence, referring to FIG. 24 there is depicted in the middle a Service Layer 2400D comprising a plurality of micro-services, first to tenth Micro-services 2420A to 2420J, wherein any of the first to tenth micro-services 2420A to 2420J can either invoke or inject a message to an Overlay Micro-service 2460 which defines an overlay rendered to the user either discretely or in combination with other content. The first to tenth Services 2420A to 2420J may exploit native operating-system standard messaging (for example Android™ Messenger, Implicit or Explicit Intents, or Broadcasts), or a communications architecture such as HTTP representational state transfer (REST), or WebRTC, or other, to provide the necessary interoperability between micro-services. Accordingly, the Overlay 2460 communicates with the display(s) of the HMD or is itself a micro-service employed or exploited by other software within the HMD. The hardware of the HMD is not depicted within FIG. 24 apart from the electronics/processor hardware (Hardware) 2490 upon which the micro-services and applications operate.

Disposed between the Hardware 2490 and the Service Layer 2400D are the Firmware 2480A and Operating system 2480B layers required to allow the Service Layer 2400D to execute upon the Hardware 2490 or alternatively to allow the Hardware 2490 to support the Service Layer 2400D. The Operating System 2480B allows Micro-services 2420A to 2420J to start, stop, and to communicate and synchronize with each other, with HMD applications, and with other connected services, and devices. The operating system 2480B may be proprietary or open-source, but according to embodiments of the invention is a variant of the Linux or Android™ operating systems, supporting multi-processing, multi-threading, virtual memory protection, and inter-process and inter-thread communications. According to embodiments of the invention these micro-services further defined below may be "bound services" allowing their clients to bind to them for communications.

The first to tenth Micro-services 2420A to 2420J may comprise, within an embodiment of the invention:
First Micro-service 2420A—Mobile API Gateway;
Second Micro-service 2420B—Sound and Narration;
Third Micro-service 2420C—Configuration;
Fourth Micro-service 2420D—Update;
Fifth Micro-service 2420E—Production;
Sixth Micro-service 2420F—Media;
Seventh Micro-service 2420G Platform;
Eighth Micro-service 2420H—Logging;
Ninth Micro-service 2420I—eSupport; and
Tenth Micro-service 2420J—Web API Gateway.

The first Micro-service 2420A, Mobile API Gateway, enables mobile applications upon a Device 2440 associated with the user of the HMD (e.g. their smartphone, a PED or a FED) to interact with the HMD through, for example, a wireless interface such as WiFi, Bluetooth, or Bluetooth Low Energy (BLE) wherein the HMD acts as a server with the Device 2440 as a client or vice versa, depending on interface specifics, to exchange data to and/or from one or more Mobile Applications upon the device, depicted as Mobile Applications 2440A to 2400N. In one embodiment of the mobile API gateway, commands are sent from PED to HMD over Bluetooth low energy (BLE), but TCP sockets over WiFi are used for streaming data, and HTTP/HTTPS for transferring media. The HTTP server might run on either phone or HMD, but in one embodiment runs on the Device 2440.

The Mobile API Gateway 2420A also interacts with the Casting Application 2410A and Mirroring Application 2410B, which allow the HMD to display video content broadcast from a PED or mobile phone 2440, or to observe the mobile's screen contents on the HMD, respectively. Note that there are no connections shown between Menu Application 2410 and Casting and Mirroring Applications 2410A and 2410B. The service-oriented architecture defined herein allows these applications to be requested by the mobile device directly through action-events over BLE as further described below.

Figure 25:
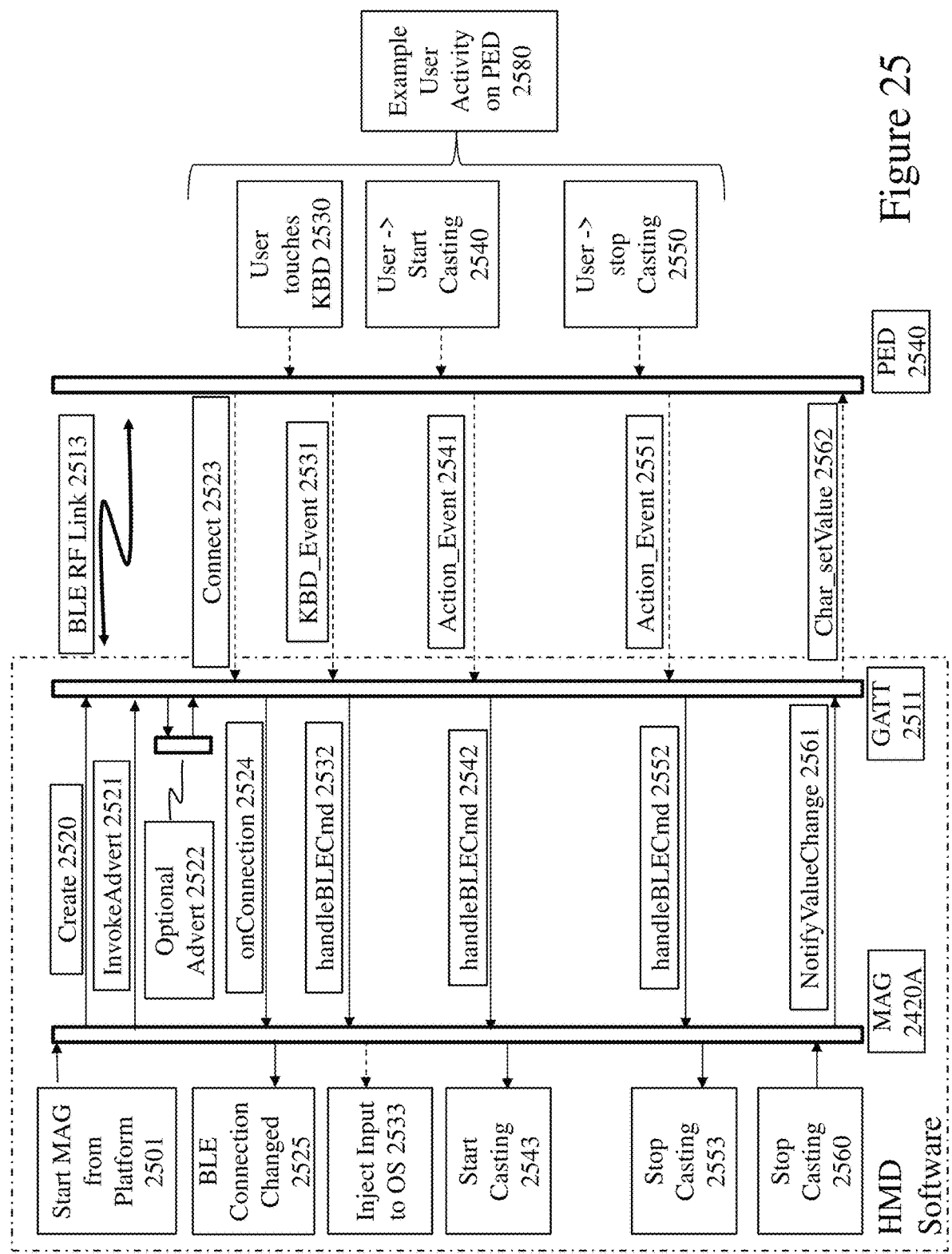
FIG. 25 depicts the execution timeline of a Mobile Applications Gateway used in the HMD software architecture of FIG. 24 to interface and coordinate with mobile devices, FEDs, or PEDs.

Referring to FIG. 25 there is depicted a Mobile Application Gateway Micro-Service 2420 (MAG) operating in a timeline from top to bottom of FIG. 25, shown as first Micro-Service 2420 (MAG) 2420A. The MAG micro-service exchanges messages with the HMD operating system's Generic Attribute Profile GATT BLE server (GATT) 2511, which in turn manages the BLE RF interface and handles communication with BLE clients (PEDs). BLE services and characteristics are defined both within the HMD and in the PED 2440 to allow service-oriented control over the BLE interface. The MAG 2420A is started shortly after boot by the Platform Micro-service 2420G once it has declared that booting and initialization are complete (Start from Platform 2501). MAG 2420A issues Create and InvokeAdvertisement commands (2520, 2521) to the GATT server 2511. If BLE is unconnected, then an optional Advertisement start/stop 2522 is invoked by the GATT server 2511. When the PED 2440 recognizes the HMD BLE, it issues a Connect message 2523. The MAG 2420A is informed of the connection through the onConnection event 2524 from GATT 2511. MAG 2420A informs other applications and micro-services of the HMD system through the BLE_Connection_Changed Event 2525. At this point BLE connectivity between HMD and PED is established: the devices are "paired". User activity on the PED 2580 may now invoke micro-services on the HMD, and vice-versa.

One example use of the PED is as a keyboard or controller external to the HMD. Once paired, for example, the user may press keys on the PED keyboard 2530, generating BLE keyboard events 2531. As GATT 2511 does not process commands itself, it simply relays the handleBLECmd event 2552 to MAG 2420A. In the case of keyboard commands, these are mapped as Human Input Device (HID) commands, and so can be directly injected into the InputManager class of the operating system. This approach allows HMD applications to listen for their keyboard events without needing to know their source—no special processing is needed even if control is remote.

An alternate example is shown further down FIG. 25 as a user initiates media-casting from their PED 2540. A BLE Action Event 2541 with parameters indicating to start casting is sent from the PED 2540. GATT 2511 issues the handleBLECmd message 2542 to MAG 2420A. MAG then issues commands 2543 to start the Casting Application 2410A. The Casting Application 2410A establishes further connections over WiFi or other high-speed links to perform the actual streaming of image content from one screen to the other. No further interaction with the MAG micro-service 2420A is required until termination of casting or mirrored is desired. While casting or mirroring, provided the image-stream connection over WiFi remains intact, the MAG micro-service may crash, be stopped and re-started, etc., yet since the MAG is an independent process in an independent context, the Casting or Mirroring application that it launched may continue to run, and the screen contents may continue to be streamed to or from the PED 2540. This independent execution is a key attribute of the Service Oriented Architecture.

Similar to starting a Casting or Mirroring application, the user may choose to stop the Casting on the PED 2550, which causes an Action Event 2551 to be sent over BLE with details of the event. GATT forwards this event 2552 to the MAG micro-service 2420A, who signals to the Casting Application 2410A to terminate 2553. Alternately, casting or mirroring may be halted locally by the user on the HMD, or because of loss of the high-speed screen-link, in which case WAG 2420A receives a Stop_Casting message 2560 from the Casting Application 2410A, whereupon it informs the GATT server 2511 using a NotifyValueChange message 2561. The GATT server 2511 performs a BLE service Characteristic_SetValue 2562 so that the PED client 2540 who initiated the casting or mirroring is informed of its termination.

Figure 26:
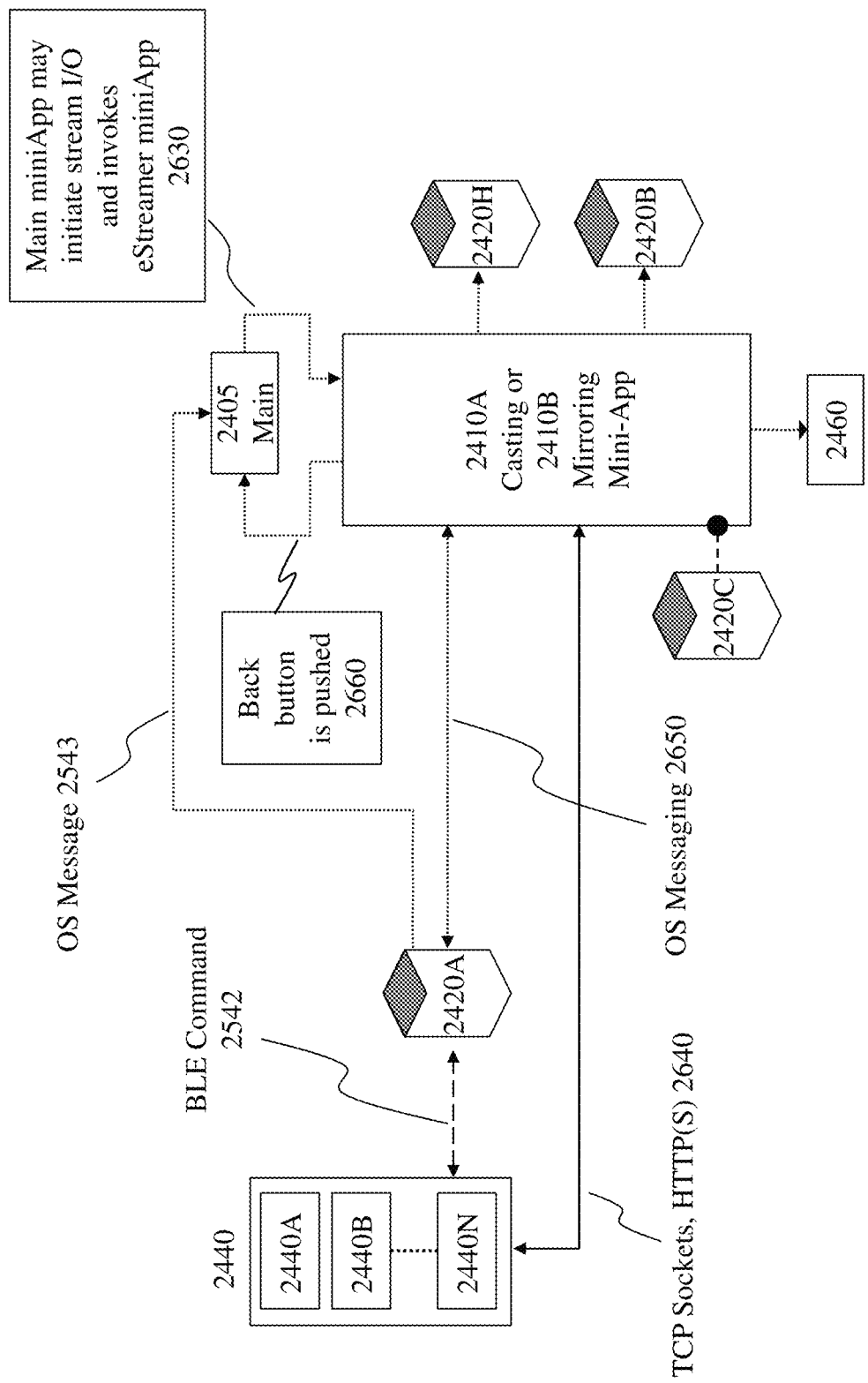
FIG. 26 depicts the operation of two HMD mobile applications, screen Mirroring and media Casting.

The HMD SOA software of FIG. 24 is depicted in operation in FIG. 26 following the sequences of FIG. 25. Referring to FIG. 26, consider that one of PED applications 2440A to 2440N is an application compatible with a HMD. Upon selection of a function requiring casting, for example the display on the HMD of specific images or other content stored on or accessed by the PED, the BLE command 2542 is received by the Mobile Access Gateway (MAG) micro-service 2420A. The MAG 2542 issues an operating system message 2543 to the Main Application 2405 indicating casting or mirroring is desired. The Main Application 2405 invokes (2630) either the Casting 2410A or Mirroring 2410B mini-Apps depending on the nature of the BLE command 2542. The Casting 2410A or Mirroring 2410B mini-App initiates stream input/output (I/O) over TCP sockets and/or HTTP/HTTPS to the PED 2440 and the PED application, and employs operating-system messaging 2650 to the MAG 2420A during the casting or mirroring session, operating in dependence upon configuration data from Configuration micro-Service 2420C. Optionally, stream I/O may be initiated in MainApplication 2405 prior to the invocation of either Casting 2410A or Mirroring 2410B.

During operation image content is streamed from the PED 2440 to the HMD, and displayed by either mini-App 2410A or 2410B. If the streamed content requires narration or audio support, 2410A and 2410B employ the Sound and Narration micro-Service 2420B, communicating using operating system (OS) messaging. Notices, warnings, errors and other logging information are sent to the Logging micro-Service 2420H, again using OS messaging. According to embodiments of the invention, this and other OS messaging is one of the Android™ OS Messenger, explicit Intent, implicit Intent, or a Broadcast class of messaging. In this and similar manners for other micro-services and applications, the Mobile Access Gateway 2420A acts as an intelligent proxy and gateway for other services and applications that interact with paired PEDs, FEDs, or mobile devices such as cellular phones, providing event and protocol translation between internal HMD messaging and the external protocols that provide connectivity to the paired device. The gateway services provided by the MAG 2420A act as a transformation and translation bridge between HMD-based micro-services and cloud-based services: the MAG 1420A translates and transforms data payload between internal HMD clients and external mobile-based clients and services, so that each can be understood by the other. In this way the Mobile Access Gateway 1420A micro-service acts as an intelligent gateway and proxy for other micro-services and HMD applications, providing event and protocol translation between internal HMD messaging and external networking protocols.

The second micro-service 2420B, Sound and Narration is responsible for all audio and text-to-speech processing in the HMD. Other micro-services and mini-applications that require these capabilities use operating system messaging to interact with this micro-service. This micro-service is also responsible for independent volume control for each of System, Media, and Narration. Narration—the reading of displayed text—may be configured to be enabled or disabled on a variety of levels: globally for the HMD, per-application, per-micro-service, or per-subfunction within an application or micro-service. Such configuration is managed, stored by, and retrieved from the Configuration micro-service 2420C. In one embodiment the operating system is Android™, Android.os.Messenger, or Intents are used for communications, and the micro-Service 2420B is implemented as an Android™ sound engine, so communication with the operating system is automated for sound services.

The third micro-Service 2420C, Configuration, is responsible for handling all HMD databases. It provides a non-volatile configuration store that can be accessed by any other micro-service or mini-application with suitable privileges.

The fourth micro-service 2420D, Update, is responsible for maintaining revision-control, downloading, and updating HMD resources such as code, configuration, documentation, etc.

Figure 27:
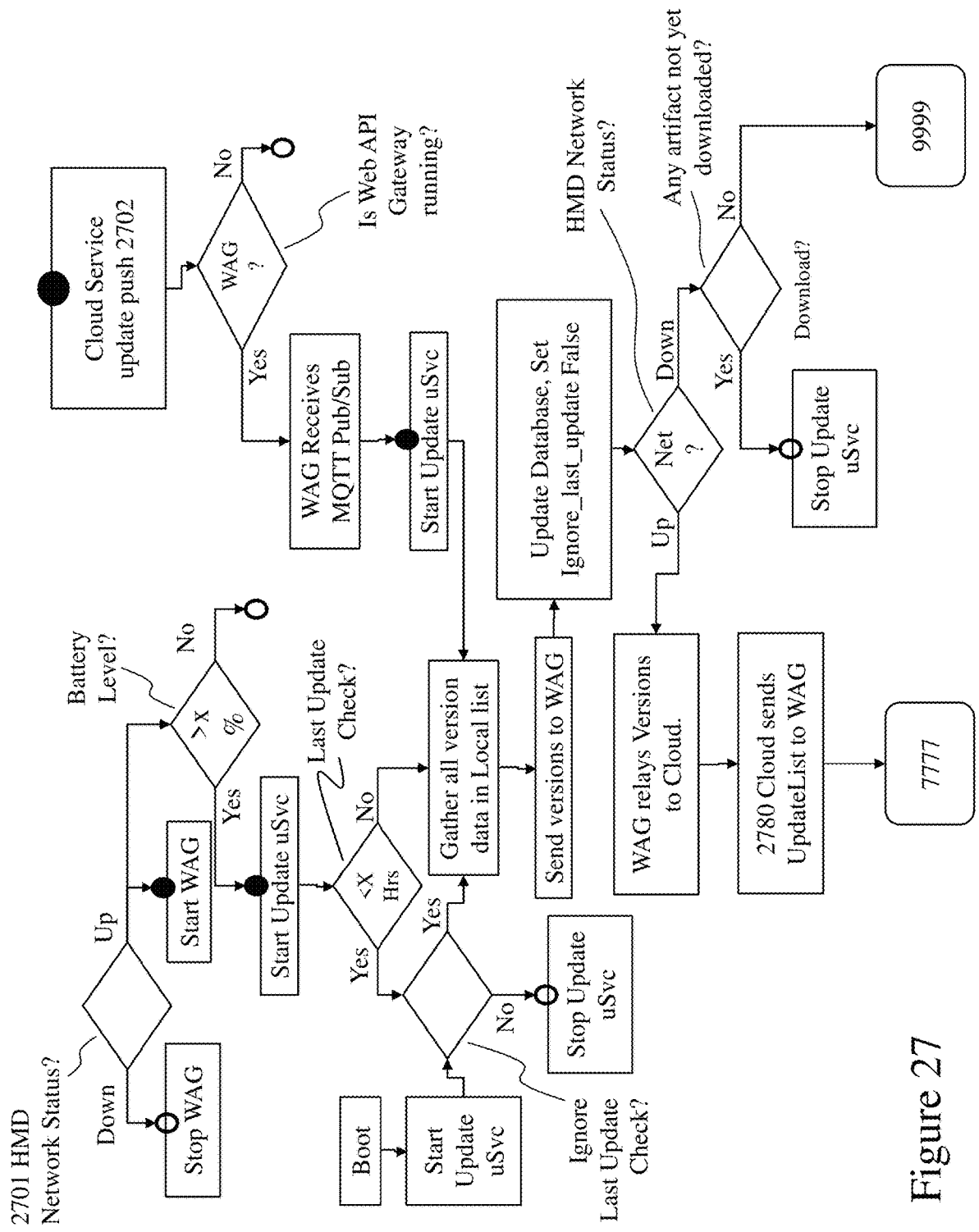
FIG. 27 depicts the first of three flowchart sections defining the operation of an Update service and its interactions with a Platform service and a Web API Gateway service.
Figure 28:
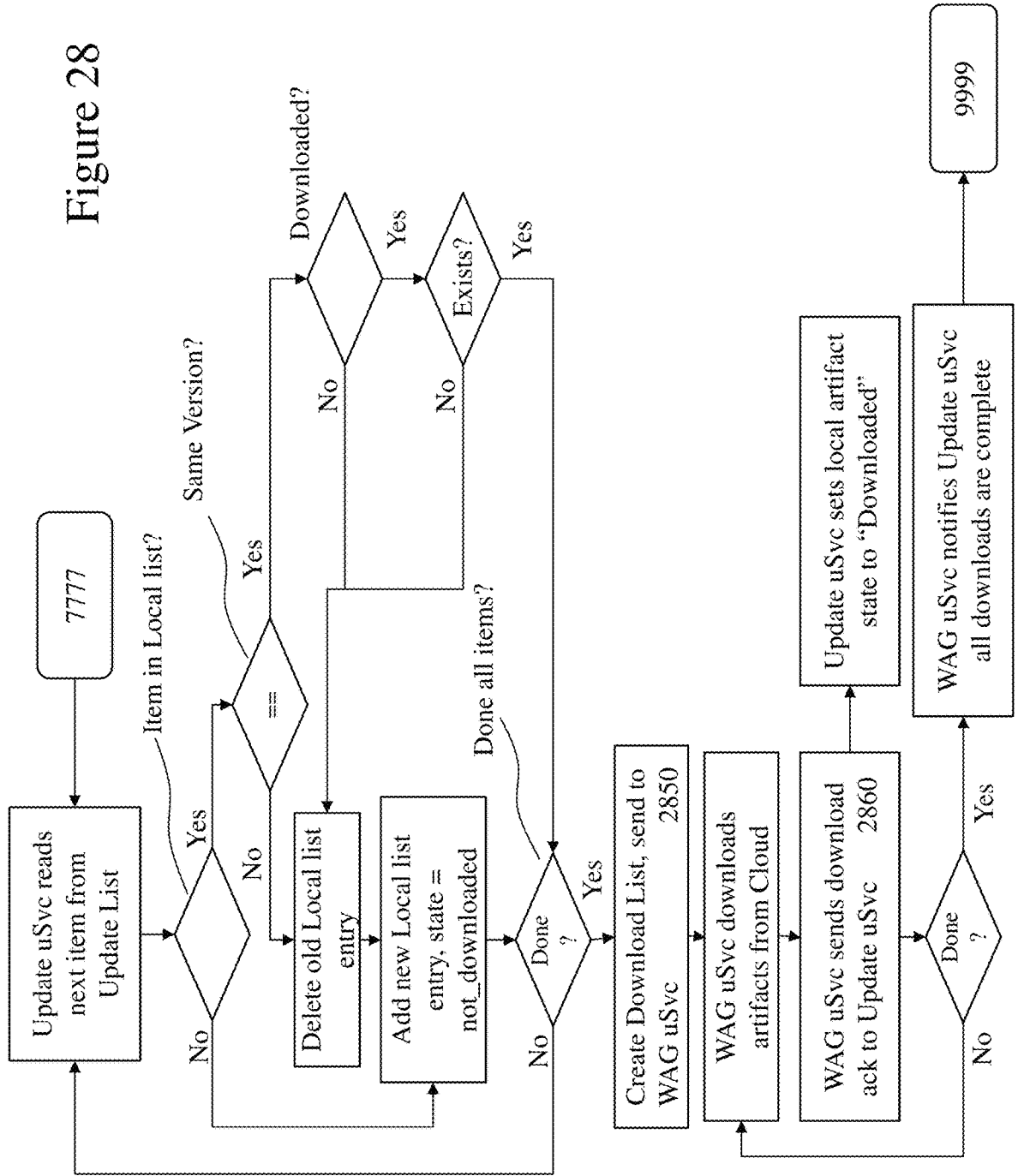
FIG. 28 depicts the second of three flowchart sections defining the operation of an Update service and its interactions with a Platform service and a Web API Gateway service.
Figure 29:
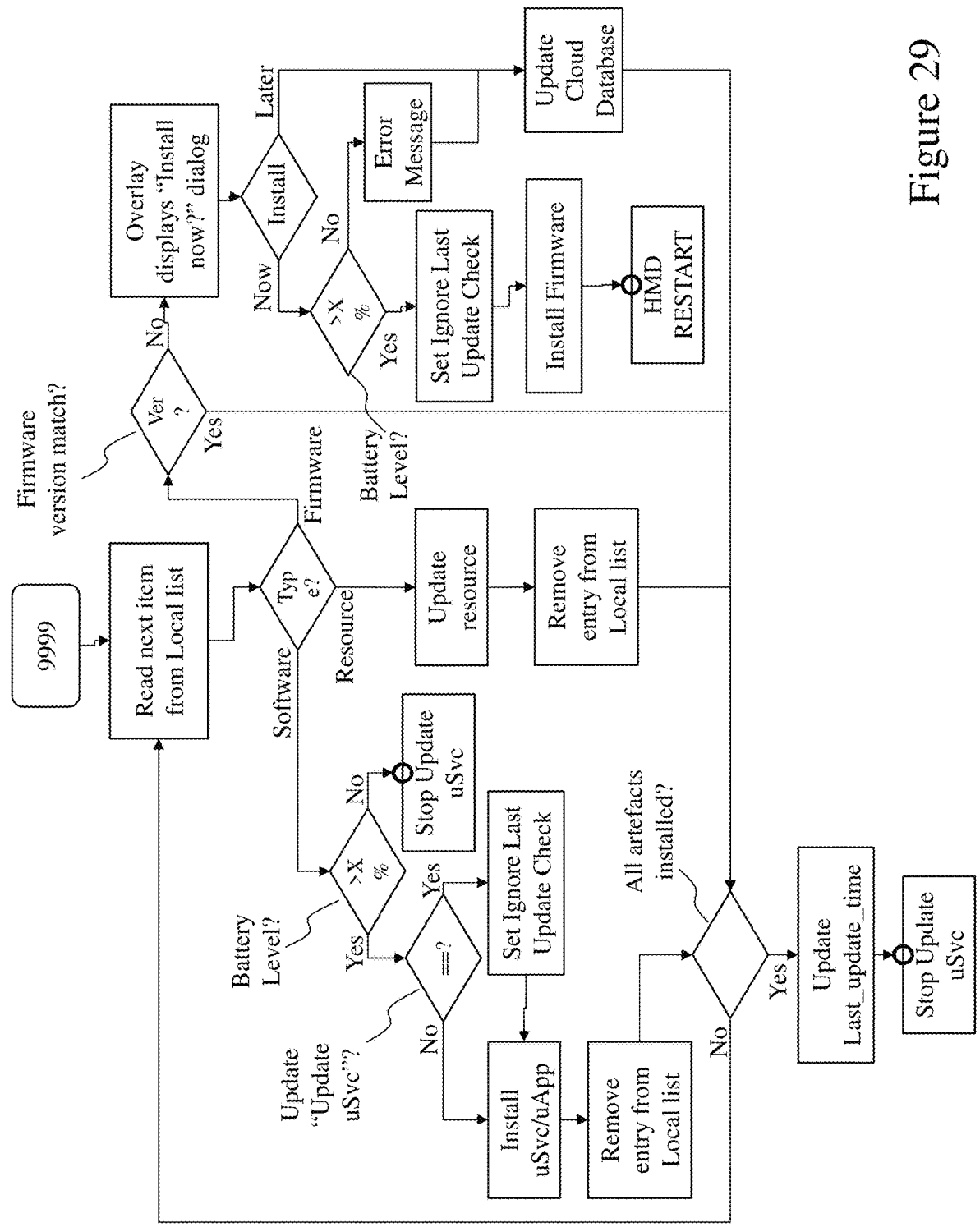
FIG. 29 depicts the third of three flowchart sections defining the operation of an Update service and its interactions with a Platform service and a Web API Gateway service.

Use of MATT, interaction with the Cloud, and cooperative operation of multiple micro-services is depicted in FIGS. 27, 28, and 29 describing the operation of the Update micro-Service 2420D. Referring to FIG. 27 the Platform micro-Service 2420G examines network status 2701 and will start the Wireless API Gateway (WAG) 2420) if so, Platform 2420G will also examine battery status and if the level is above a threshold will also start the Update micro-Service 2420D. The Update micro-Service 2420D may also be started as a result of a new revision of a revision-tracked artifact in the cloud. In this case a Cloud-based service performs an MQTT push 2702 on a topic to which the HMD is subscribed. The message indicating new artifacts are available is received by the WAG 2420J, which then starts the Update micro-Service 2420D.

If the HMD is booting up, or if the elapsed time since the last update check is greater than a threshold, the Update micro-service proceeds to create a local list of all version data for all local version-tracked artifacts, such as software, firmware, documentation, etc., else it is halted. This list of artifact state and version data is then sent from Update 2420D to the WAG 2420J, which is responsible for updating databases and setting the "Ignore Last Update_Check" flag to false. Provided the network status is Up, the WAG 2420J will send the local version list to the Cloud revision-management service. The cloud revision-management service then returns an UpdateList 2780 to the WAG 2420I The UpdateList is processed beginning with tag 7777 in FIG. 28. The Update Micro-Service 2420D iterates through artifacts in the UpdateList and compares to local information, creating a DownloadList 2850 entry for all items that do not match version, do not exist, or are not yet marked as "downloaded", As the WAG 2420J downloads each item in the list successfully it notifies 2860 Upgrade 2420D. When all items have been downloaded, execution proceeds to tag 9999 on FIG. 29. At this point, different processing is selected for each of types "Firmware", "Software", and "Resource" as follows:

"Firmware" is low-level programming code that cannot be installed without requiring a restart of the HMD operating system;

"Resources" are objects that are not directly part of the software/firmware dependency structure such as documentation, sample images or configuration data, etc.

"Software" is middle and upper-level code that may be installed and then executed without requiring a system restart In the case of a Firmware item, the Overlay screen is used to provide a user dialog, the battery level is checked, and the firmware optionally updated and HMD restarted. In the case of a Resource item update, the resource is simply updated and the entry removed from the list. In the case of a Software item, the battery level is checked, then the Update micro-Service 2420D checks if it is upgrading itself, and if so, sets the Ignore_Last_Update_Check to True before installation, so that a second update-check will be forced in case the change to Update 2420D was necessary before further updates could be performed. Once all items in the list have been processed, the Last_Update_Time variable is updated, and the Update Micro-Service 2420D stops. In such a manner the Update micro-service 2420D operates in coordination with a service-based cloud revision-management and software distribution system to keep HMD firmware (including the operating system), software and other resources and artifacts up to date with the latest distributions from the HMD vendor or other sources.

The fifth micro-service 2420E, Production, is a service for use by HMD manufacturers during manufacture for purposes of initialization, configuration, calibration, and low-level manual device control for testing.

The sixth micro-service 2420F, Media, is responsible for creating and hosting a nano-HTTP server that provides external access to HMD media files over the network. This micro-Service is triggered from the Mobile API gateway 2420A and runs in order to support a mobile application Gallery function that allows a paired PED or mobile device to view image files and videos stored on the HMD.

The seventh micro-service 2420G, Platform, is responsible for running some low-level system services and starting many other eSight user services. The Platform microservice 2420G may be registered with the operating system to receive BOOT_COMPLETED and other events from the operating system 2480B so that it can start itself immediately, and thereafter start other micro-services and HMD applications upon receipt of these events. It starts a Motion Nano-Service, the Sound micro-Service 2420B, the Mobile API Gateway micro-Service 2420A, the Overlay 2460, and the HDMI mini-Application 2420F when HDMI devices are connected. It may start a payment micro-service used to control HMD operation independence upon rental or purchase payment information received from a cloud payment service. It registers with the Operating System 2480B for network changes so that it can start the Web API Gateway 2420J when the network connection is created. It also creates the user folders and directory structure.

The eighth micro-service 2420H, Logging, is used by all micro-services and mini-applications for the handling of their logging data and storage in local non-volatile memory. The Logging micro-service 2420H may communicate with the Web Application Gateway micro-service 2420J in order to send logging information to cloud-based services.

Ninth Micro-service 2420I, eSupport, allows the HMD to communicate with a Web Application 2450 associated with the HMD vendor, for example, allowing the user of the HMD to access support, help guides, etc. The eSupport micro-service 2420I may allow a remote caregiver using a web-based application or service to either remotely view HMD on-screen contents, project content onto the HMD display, or to remotely control the HMD on behalf of the user. It may employ the Web API Gateway 2420J in order to coordinate and enable the connection, in particular the WAG 2420J may be responsible for handling authentication and authorization and optionally initialization of transport-layer security (TLS) on behalf of other micro-services. A mobile application paired with the HMD may be used to confirm a remote caregiver request for access to a user's HMD. Initially, both the Web application and HMD are acting as WebSocket clients of the cloud services for handshaking and connection establishment, but afterwards the ninth Microservice 2420I and Web Application 2450 may communicate directly for example via a peer-to-peer Web Real-Time Communication (WebRTC) connection for streamed screen data. Control information between Web application and the HMD may continue to occur over WebSockets.

Tenth micro-service 2420J, Web API Gateway (WAG), allows the HMD to access Cloud Services 2470 and accordingly applications/services within these Cloud Services 2470. These applications/services being depicted as Cloud Applications 2470A to 2470N. For example, a first Cloud Application 2470A may be a vision healthcare application whilst second Cloud Application 247013 is a physical healthcare application. Another application may be a software revision-management and download application, another a payment-management system. The tenth Microservice 2420J may, for example, exploit a message transport such as Message Queuing Telemetry Transport (MQTT), for example, which is an open Organization for the Advancement of Structured Information Standards (OASIS) and ISO standard (ISO/IEC 20922) providing a lightweight, publish-subscribe network protocol for transporting messages between devices.

The WAG 2420J may employ translation of protocols from internet-based messaging to operating-system-based messaging in performing its functions. This micro-service also downloads firmware, software, and other resources in conjunction with the Update micro-service 2420D. MQTT push notifications from cloud-based services 2470 are received and processed by this service. Upon receipt of "update" or "version" notifications, WAG 2420J will start Update 2420D. Upon receipt of a "support" notification, WAG 2420J will start the Support micro-service, and upon receipt of a payment notification will start a payment micro-service. When a micro-service or HMD application wants to communicate with the cloud, it first binds to the WAG 2420J and registers a callback handler to receive data. It then sends to and receives from the WAG 2420J messages using these bindings. The gateway services provided by the WAG 2420J act as a transformation and translation bridge between HMD-based micro-services and cloud-based services: the WAG 1420J translates and transforms data payload between internal HMD clients and external cloud-based clients and services, so that each can be understood by the other. In this way the Wireless Access Gateway micro-service acts as an intelligent gateway and proxy for other micro-services and HMD applications, providing event and protocol translation between internal HMD messaging and external networking protocols.

The WAG 2420J is responsible for handling security for network-case communications. It uses a device-unique X.509 certificate to authenticate and authorize with cloud services. The WAG 2420J may implement Transport Layer Security (TLS) so that all traffic to and from the cloud is encrypted.

An HMD Controller 2430 interfaces with the HMD, for example using BLE with the HMD Controller 2430 as the server and the HMD as the client. Accordingly, the user can enter commands to the HMD through the HMD Controller 2430. Typically an HMD controller 2430 will have a number of push-buttons, keys, and optionally a pointing device such as a track-pad. By mapping the HMD Controller 2430 as a Human Interface Device (HID) to the Operating System 2480B, micro-services 2420(x) and mini-Applications 2410 (x) may use normal operating system routines to interface with the HMD Controller 2430. Optionally, the HMD Controller 2430 and Device 2440 are the same physical device.

Represented above the Service Layer 2400D is Application Layer 2400C comprising first to sixth Applications 2410A to 2410F respectively. The first to sixth Applications 2410A to 2410F may comprise, within an embodiment of the invention:

First Application 2410A—Casting;
Second Application 2410B—Mirroring;
Third Application 2410C—OnBoarding
Fourth Application 2410D—eReader;
Fifth Application 2410E—Gallery; and
Sixth Application 2410F—HDMI.

First Application 2410A Casting is invoked from a PED 2440 application over BLE and allows playback or display of video or image content stored on or accessed by the mobile device or PED 2440. Audio content that accompanies video streamed from the PED 2440 is routed to the Sound and Narration micro-service 2420B for HMD playback.

Second Application 2410B Mirroring is also invoked from a PED 2440 application and allows display of the PED 2440 screen contents on the HMD display. In this case any PED audio playback will occur locally on the PED, not the HMD.

Third application 2410C onBoarding provides a tutorial introduction to the HMD operation for new users and assists with initial device setup and configuration. When the HMD is initially shipped from the manufacturer it may be configured in a "shipping" mode in which the HMD automatically launches the OnBoarding application. A flag User Setup Complete may be used to indicate that the user has completed the onboarding process. Micro-services and applications that start other micro-services and applications may check this flag to determine if they should proceed to start those other microservices and applications or not. The HMD manufacturer may specify business logic that precludes use of certain micro-services and applications until the OnBoarding process has been completed.

In OnBoarding, a series of screens with instructions are presented to the user along with an audio narration of the text. The first screen allows language selection so that the rest of the process will be conducted in the users' preferred language. After language selection, the user is prompted to adjust the Inter-Pupil Distance (IPD) setting of the HMD displays to align with the user's own IPD. A target screen optionally consisting of cross-hairs within a box or circle is presented to the user, and the narration repeated until an indication is received from the user to continue, which may be a button-press or touch of a haptic interface such as a touch-screen. Optionally the target-screen box will be drawn near the periphery of the display, where aberrations and distortions are most sensitive to pupil location within the eyebox. The process is repeated for the other eye, and for both eyes at the same time, in order to set mutual left/right alignment. Optionally the Onboarding Application 2410C may guide the user through operation of Bioptic Tilt. The location and operation of eye-relief adjustment features may then be displayed and narrated, with a target as in supra displayed on-screen.

After initial setup, the HMD device may be configured for network access, for instance over WiFi. A Web Application or mobile phone application may be used to generate a QR code that may be scanned by the HMD on-board camera in order to configure WiFi SSID, password, security mode, or other system parameters. A mobile or Web application may be used to create an account in a cloud-based service with username and password authentication (where username may be an email address). An authentication email with an authentication link may then be sent from the web application or a related cloud service to the user wherein clicking on the authentication link allows the mobile or Web application to proceed, wherein the user may enter further details such as identity, gender, age, eye condition, address, contact information.

The next step in the onboarding process is to register the HMD device itself so that it might interact autonomously with web and cloud-based services. First a user may sign in to either the mobile or Web application using their username/password credentials. The Web or mobile application, on determining that the HMD device has not yet been registered for cloud services, generates an on-screen QR scan-code with a one-time token for authentication. The user scans the QR code using the HMD camera, and the HMD sends both the token and the HMD serial number to the HMD vendor's cloud services for tracking. At this point the user's account is set up, their device is registered, and a configuration-set that corresponds to the user's detailed information such as eye condition, age, etc.

The user may then be guided through an automated series of steps to introduce the HMD functionality. For example, the user may be presented with text saying "Swipe Backwards" which is narrated aloud, and the onboarding application then waits for a backwards-swipe on a haptic interface, providing feedback to the user on whether the task was performed correctly. Similarly this process may be repeated for all user-interface functions available on the HMD itself. Note that the normal function of the user interface may be over-ridden during the onBoarding tutorial. If an external HMD Controller 2430 is detected, the onBoarding tutorial may invoke another level of automated screens, narration, user-interface tasks, and task-checking and user-feedback specific to the features of the external controller 2430.

Fourth application 2410D eReader allows HMD users to browse through locally stored files including Portable Document Format (PDF) files for display. The PDF viewing function of 2410D eReader allows the setting of specific colour-filters to be applied to the displayed version of the file. Colour-filters may include at least Blue on Yellow, Yellow on Blue, Black on White. White on Black, Black on Yellow, Yellow on Black, Blue on White or White on Blue. Similar colour filters may apply to any app or the Overlay.

Fifth application 2410E Gallery allows HMD users to browse through and display pictures and videos stored locally on the HMD device, optionally having been captured and stored using the on-board Camera 1960A. Similar colour-filtering options as in 2410D in supra may be applied.

Sixth application 2410F HDMI allows the display of externally-sourced video content on the HMD through the use of an external HDMI connector. There may be no way to navigate through menu-selection to the HDMI application. The HDMI application 2410F may be automatically invoked by the Platform micro-service 2420G (or other micro-service) when the Platform micro-service 1420G detects the connection of an external HDMI device. The operating system may inform the Platform 1420G microservice (or other micro-services) of these events using broadcast messaging (for instance for such global events as "Boot completed" or "low battery"), explicit or implicit intents, or a messenger class. Similar colour-filtering options as in 2410D in supra may be applied in the HDMI application, or to any application or micro-service as part of device, application, or micro-service configuration as is handled by Configuration 2420C.

System Security

Figure 30:
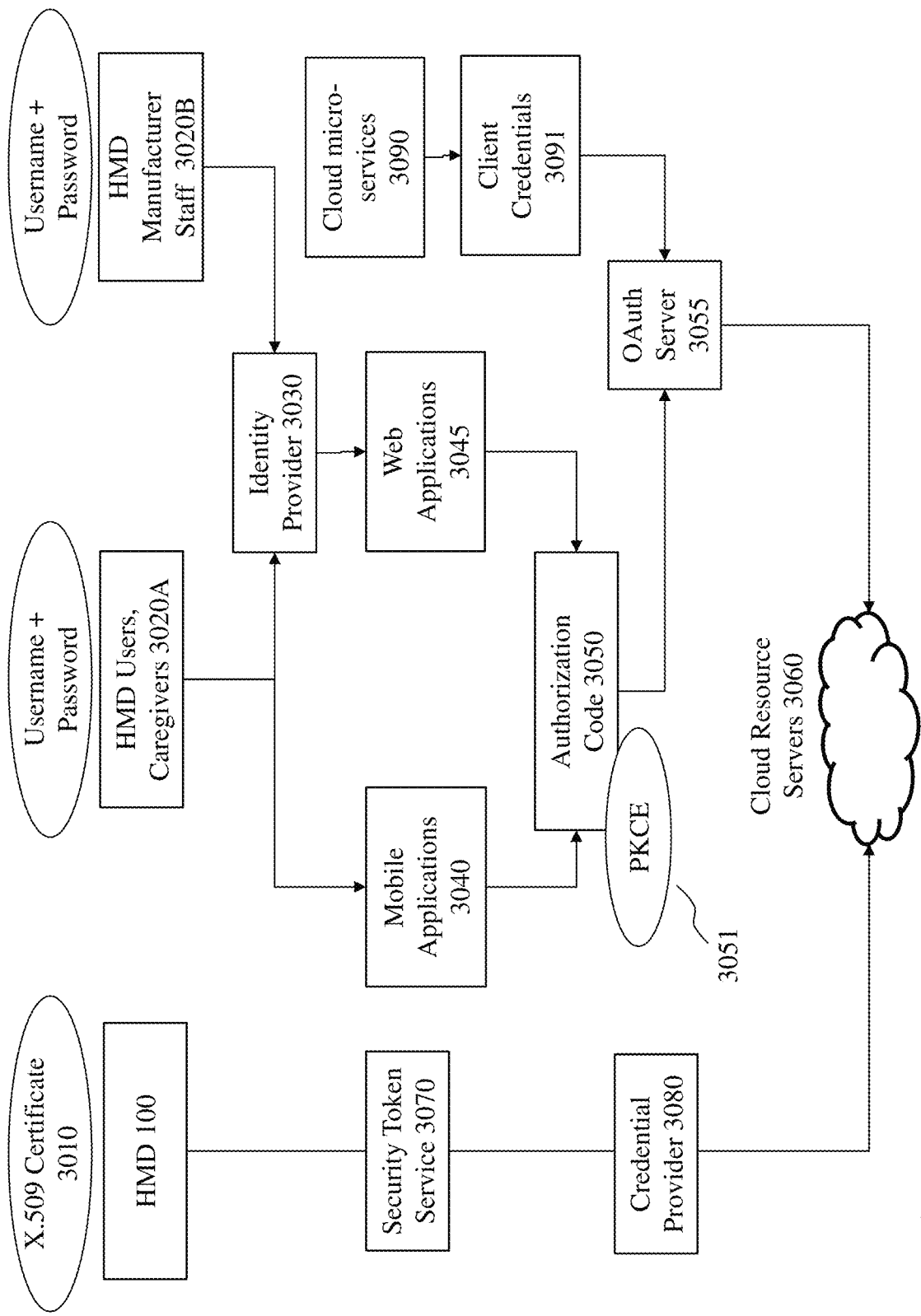
FIG. 30 depicts an authentication and authorization architecture for a service-oriented HMD architecture.

Connected devices such as a Service-Oriented HMD require security in their operation. Referring to FIG. 30 there is depicted a security architecture for such systems. Of note is that every HMD is allocated an X.509 security certificate during manufacturing, thus allowing the use of mutual transport-layer security (TLS) with a dual-authentication process. The certificate may be acquired by the HMD manufacturer from a cloud-based provider and programmed along with public and private keys into HMD non-volatile memory. This is unlike traditional internet one-way security models in which a client browser does not typically have a unique X.509 certificate, and therefore may be unknown to and therefore untrusted by a web server, but the server is authenticated and trusted by the client based on the server's X.509 certificate.

HMD Users and Caregivers 3020A as well as HMD Manufacturing Staff 3020B may use username/password-based authentication. An Identity Provider 3030 cloud service may be employed for user identity and credential management, which then provides the required authentication credentials to any Web applications 3045 to which Users, CareGivers 3020A or Manufacturing staff 3020B require access. Users may directly enter their usernames and password credentials into Mobile applications 3040. Independent of whether access to cloud resources is required by a Web 3045 or Mobile 3040 application, an Authorization Code 3050 is generated using the Proof Key Code Exchange (PKCE) 3090 technique and processed by an Authorization Service 3055 that provides access tokens which govern which particular cloud-based services and resources 3060 and optionally which HMD-based micro-services the HMD is authorized for. Other Cloud Micro-services 3090 may also provide Client Credentials 3091 to the OAuth Server 3055. The access tokens generated by the OAuth Server 3055 may consist of a session token and a set of permissions for specific resources or services. The HMD device itself employs a Security Token Service 3070 and Credential Provider 3080 to provide it with credentials so as to allow direct HMD access to cloud based services 3060, as for instance mediated by the Media API Gateway 2420J. The HMD vendor may assign an HMD device a set of temporary, limited privilege credentials to access cloud resources providing limited access to trusted devices only. HMD device and user permissions are controlled using Role-Based Access Control (RBAC).

Other Aspects of the Hmd Service-Oriented Software Architecture

The service-oriented architecture herein described allows for authentication and authorization of both users and devices. Role Based Access Control (RBAC) is used to grant or deny service-access. Integrated within the HMD vendor's cloud services may be a Sales and Billing Service that interacts with HMDs and their users. This Sales and Billing Service may interact with the HMD using MQTT and other protocols. The HMD may operate a Payment Service that is responsible for comparing the current system date with a payment due date stored locally on the device or received from the cloud via the Web API Gateway 2420J. The HMD may subscribe to a payment topic and the cloud based Sales and Billing Service may use MQTT to update the locally stored payment due date. The HMD Payment Service may display a waring and disable the HMD when it detects the current date is after the payment due date. When the user makes the required payment, the HMD vendor's Sales and Billing Service updates the payment topic, the Web API Gateway Receives the new payment date push notification, informs the HMD Payment Service, which then unlocks the HMD device. The granting or denial of service may be performed on a much finer granularity, at the individual service or application level. This type of functionality is extremely difficult to achieve in a scalable fashion in anything but a service oriented architecture.

Accordingly, the user may through a Menu 2410 in Menu Layer 2400B access one or more Applications, such as first to sixth Application 2410A to 2410F respectively for example, which call upon micro-services, such as first to tenth Micro-services 2420A to 2420J respectively for example, to provide the required functions. Above the Menu Layer 2400B is depicted Functional Layer 2400A representing a default operating mode for the HMD, e.g. display of image input from Camera 1560A. A user-initiated event such a as a Controller 2430 button-press or other input may be used to navigate from the default Camera view 2405 to the Menu view 2410.

For example, an application "Object Identifier" may access a camera and a structured light source in order that the application renders to the user within the Overlay 2460 distance information to objects identified within the image acquired from the camera in order to aid a user with low visual acuity navigate within their surroundings. Alternatively, an application "Navigate" may access a camera and a positioning system, e.g. global positioning system (GPS) as a mobile application upon the user's smartphone, to establish an overlay comprising navigation information. Alternatively, the user may access a web application "Visual Acuity" which renders visual content to the user and based upon vocalized responses assesses the visual acuity of the user without engaging other hardware elements of the HMD.

Optionally, within embodiments of the invention any Application may control the visibility of the Overlay 2460, an overlay component of the rendered content.

Optionally, within embodiments of the invention any Micro-service is able to invoke or inject a message to the Overlay 2460, an overlay component of the rendered content.

Optionally, within embodiments of the invention any Application can inject an invocation menu item in Menu or the Settings of the HMD.

Optionally, within embodiments of the invention the mobile applications may be based upon a single operating system (e.g. Android™ or iOS for example) or upon multiple operating systems (e.g. Android™ and iOS for example).

Optionally, hardware elements such as the Hall effect sensor for sensing the temple arm extension, speaker(s), microphone(s), touch pad(s), haptic interface(s), etc. may each have an associated Micro-service.

Accordingly, within embodiments of the invention an HMD employs a novel SOA exploiting a service based design that decouples applications from hardware. Each micro-service is a modular standalone piece of software that may be independently started, stopped, upgraded, downgraded and restarted as a separate process. The failure of any micro-service does not impact the execution of other micro-services. HMD applications may make use of the micro-services installed as well as services accessible through mobile and web applications in order to accomplish their objectives.

Optionally, within embodiments of the invention the micro-services inter-communicate using operating-system inter-process communications calls.

Optionally, within embodiments of the invention the micro-services expose an API to the applications within the Application Layer 2400C or other micro-services within the Service Layer 2400D.

Optionally, within embodiments of the invention the running application is deemed the owner of the display and makes API calls to the micro-services below in order to execute its functions. Optionally, within embodiments of the invention an application seeking to become the owner of the display requires user selection. Optionally, within embodiments of the invention an application seeking to become the owner of the display does so automatically if a status associated with the application is higher than one current controlling the display (e.g. a warning application may have higher status than a browser).

Mitigation of Optical Train Effects

A variety of designs for the optical train within a NR2I vision system or NR2I HMD may be employed in order to implement an NR2I optical system which fulfils the requirements outlined in the background. These optical trains have included, but are not limited to, applying catadioptric techniques, introducing new elements such as aspherical surfaces, holographic and diffractive optical components, exploring new design principles such as using projection optics to replace an eyepiece or microscope type lens system in a conventional NR2I design, and introducing tilt and decenter or even freeform surfaces. Examples include curved mirrors, and diffractive, holographic, polarized, and reflective waveguides.

Within these different designs those exploiting freeform optical technology have demonstrated particular promise in providing the required design tradeoff between a compact NR2I systems and optical performance. In particular, a wedge-shaped freeform prism-lens taking advantage of total internal reflection (TIR) allows for minimizing the light loss, thereby improving the brightness and contrast of the displayed images, whilst allowing the display to be positioned above the user's eyeline or to the sides of the head. It is important to note that the ergonomic features for adapting a NR2I HMD to accommodate the range of user head sizes of users and their specific eye geometries are invariant and independent of the particular optical train chosen for the NR2I display. Accordingly, the embodiments of the invention described below with respect to the configuration, design and modification of a NR2I HMD may be applied to other designs of optical train in addition to those described and depicted without departing from the scope of the invention as defined by the claims.

Figure 31:
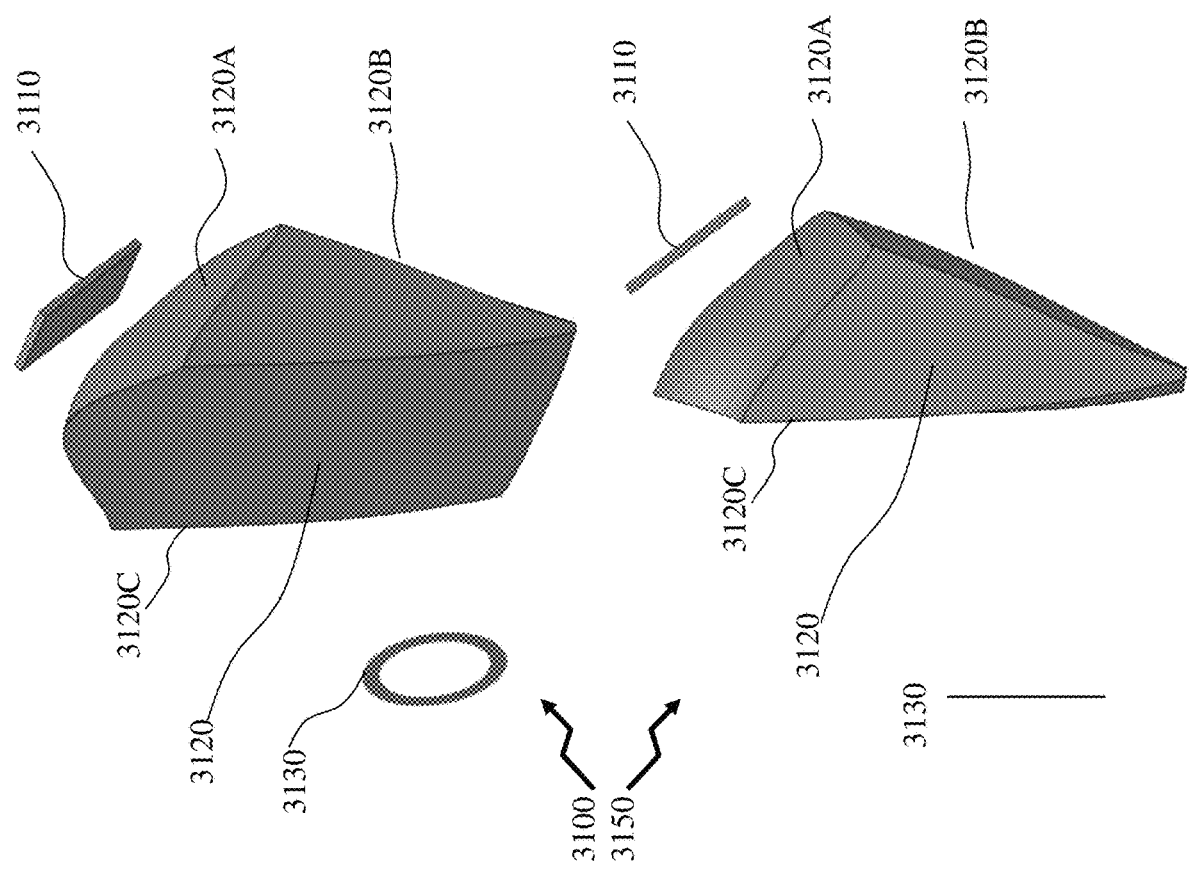
FIG. 31 depicts a free-form prism lens as may be used in HMDs.
Figure 32:
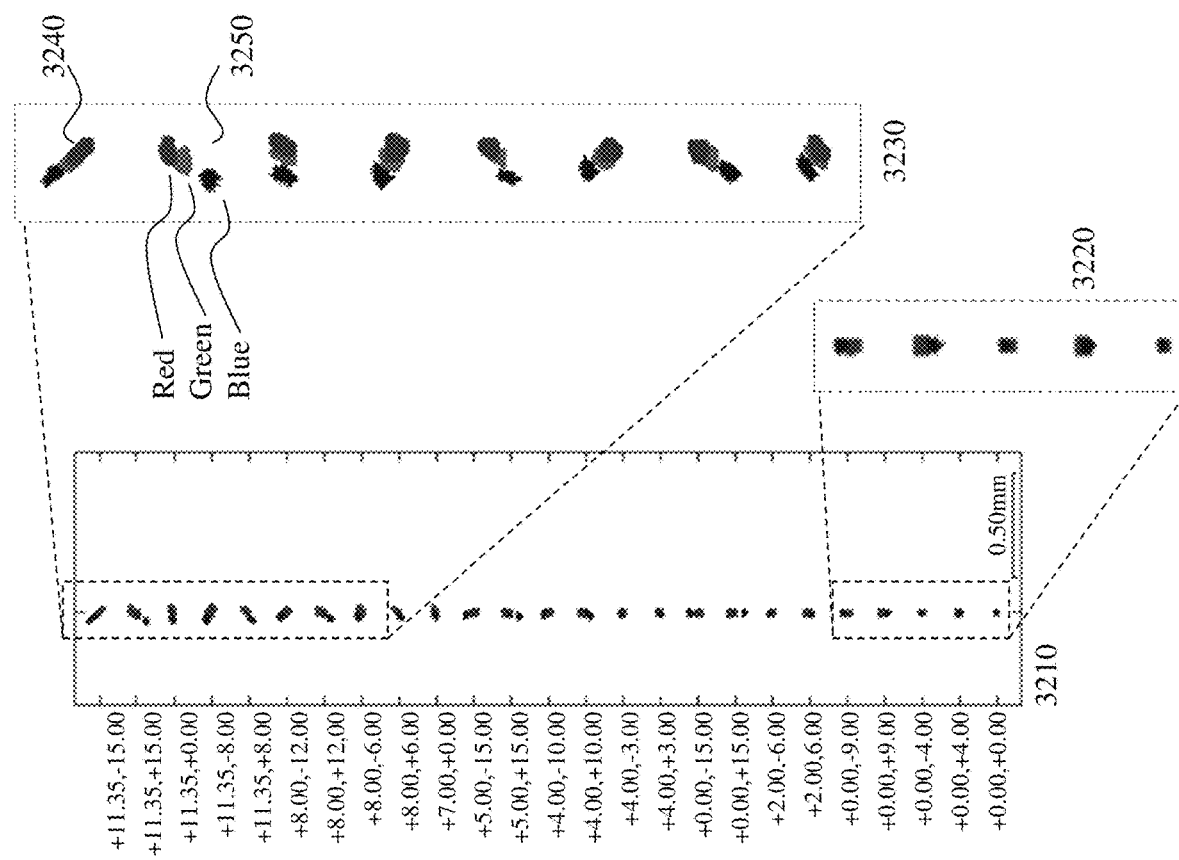
FIG. 32 depicts the variation in distortion, chromatic aberration, and RMS spot size as a function of angular displacement within the field of view.

Referring to FIG. 31 there is depicted a free-form prism lens 3120A, micro-display 3110, and eyebox 3130. Light emitted from the micro-display is received on prism surface 3120A, internally reflected from surfaces 3120C and then 3120B, to exit the prism from surface 3120C and then to enter the user's eye through eyebox 3130. FIG. 32 illustrates the spread of a micro-display's red, green, and blue pixels at a variety of x and y angular displacements from the centre of the eyebox for one instance of an optical train, in this case the prism of FIG. 31 as light propagates through it. At the bottom of the chart 3220 at the x=0.00, y=0.00 location, the chromatic alignment and root-mean-square (RMS) spot-diameter is small, whereas at the top of the chart 3240, 3250 at x=+11.35, y=+/−15.00 (3240, 3250), the RMS spot-size has increased, and the three colours are separated due to chromatic aberration.

Figure 33:
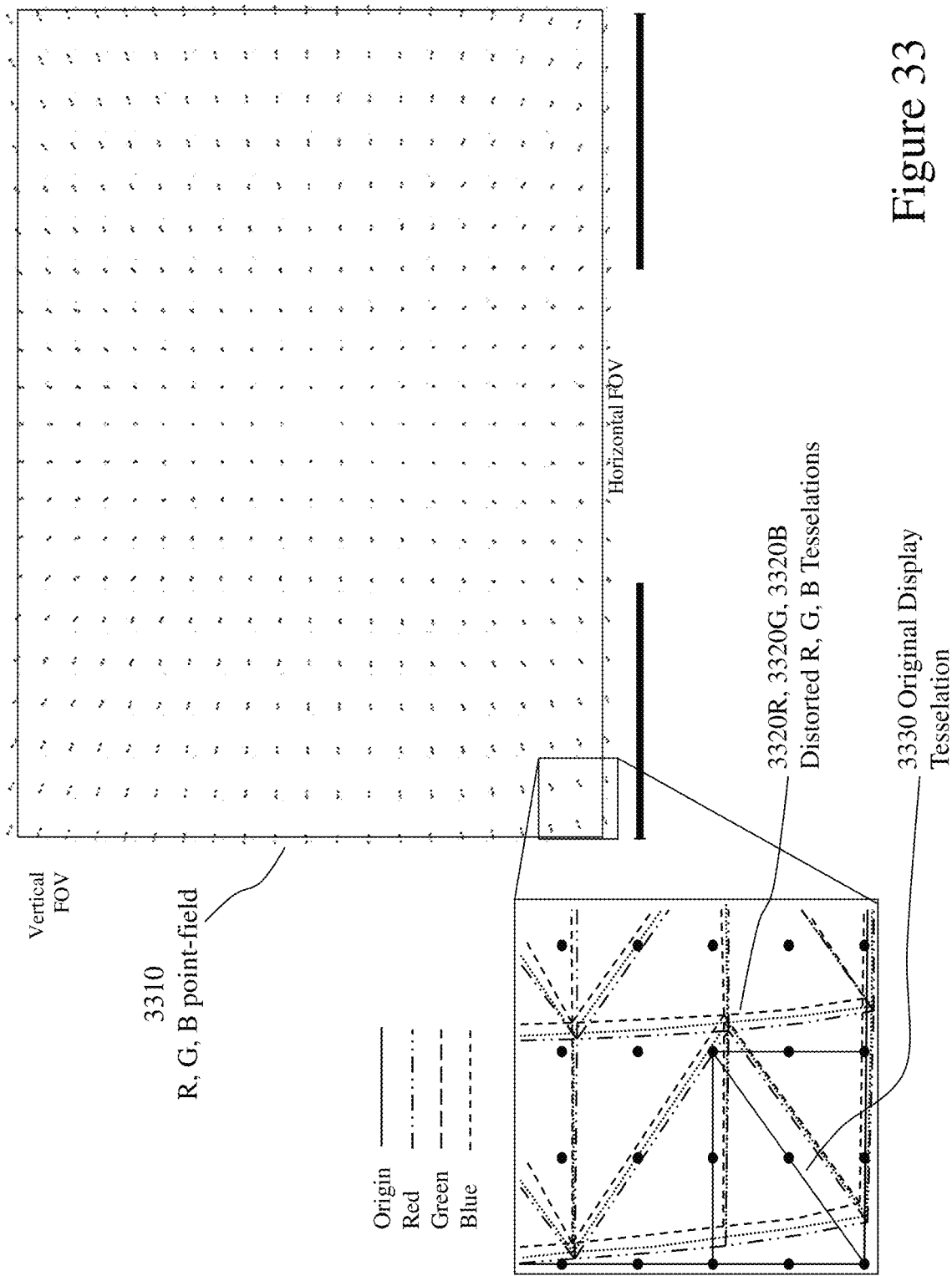
FIG. 33 depicts the spot-field across the user's field of view as well as a regular triangular tessellation of the display area and distorted tessellations for each of Red Green and Blue coloured light.

Referring to FIG. 33 the effect is displayed using both a coloured point-field 3310 and triangular tessellations of the lower-left corner of the field of view (FOV) in 3320 and 3330. In 3310 one can observe the tight spot size and grouping near the centre of the field of view, versus larger spot-size and significant distortion and chromatic aberration at the periphery. In 3320, each of the red, green, and blue tessellations corresponds to the distortion and chromatic aberration that a tessellation of the original micro-display surface 3330 experiences as it transits the optics train. Only the bottom-left two triangles of the original triangular tessellation are shown in 3330, along with the tessellations of the eye-box field-of-view after the optical train distortions for each of red, green and blue in 3320R, 3320G, 3320B. Clearly one might use any of a variety of tessellations: triangular, rectangular, hexagonal. Notice that each primary display colour component experiences a different path through the optics train. Note that the mapping from the original rectilinear tessellation 3330 to 3320(R,G,B) is the forward-transform of the optical pipeline, that which would be computed in performing ray-tracing from the display towards the user eyebox.

Figure 34:
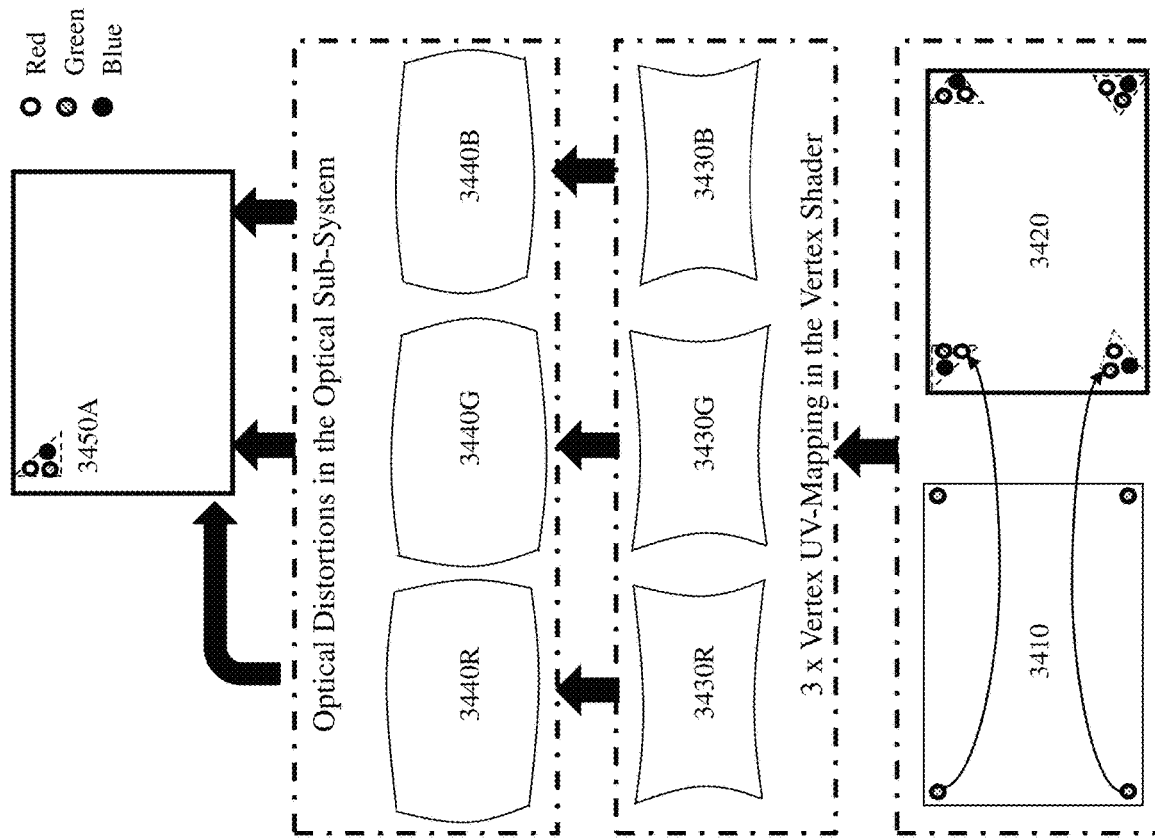
FIG. 34 depicts the use of electrical image pre-distortion so as to pre-compensate for optical distortions in an optical train.

In U.S. Pat. No. 9,836,828 filed Apr. 22, 2016 entitled "Methods and Devices for Optical Aberration Correction" and related filings the Applicants disclosed a means of employing general-purpose graphics-processing units (GPUs) to provide electronic image pre-compensation before display so as to compensate for and mitigate the effects of distortions and chromatic aberrations of the optics train. Referring to FIG. 34 represented are the micro-display 3410, and again that same display, but this time observing the three R, G, and B sub-pixels within each macro-pixel in 3420. In 3430R, 3430G, and 3430B, three tessellation-based coordinate mappings are defined that despite using the forward-transform of the optical distortions 3440R, 3440G, 3440B, respectively, to accomplish the task. The effect of per-colour electrical pre-distortion 3430$x$ and subsequent optical distortions 3440$x$ is to produce a rectilinear, chromatically fused image for the user 3450A.

Figure 35:
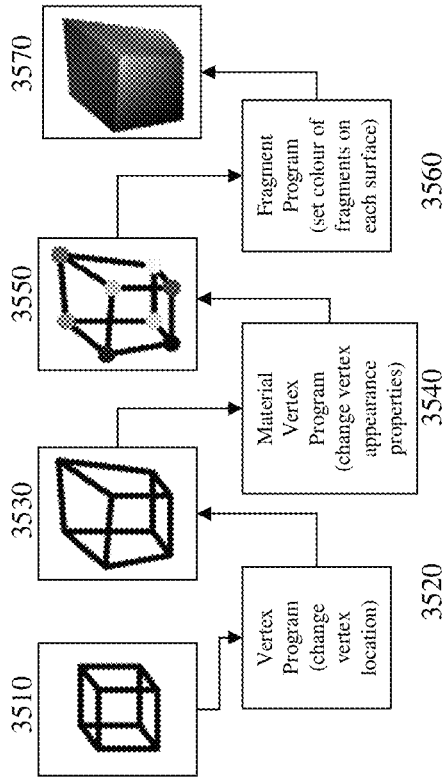
FIG. 35 depicts typical graphics processing pipeline functions.
Figure 36:
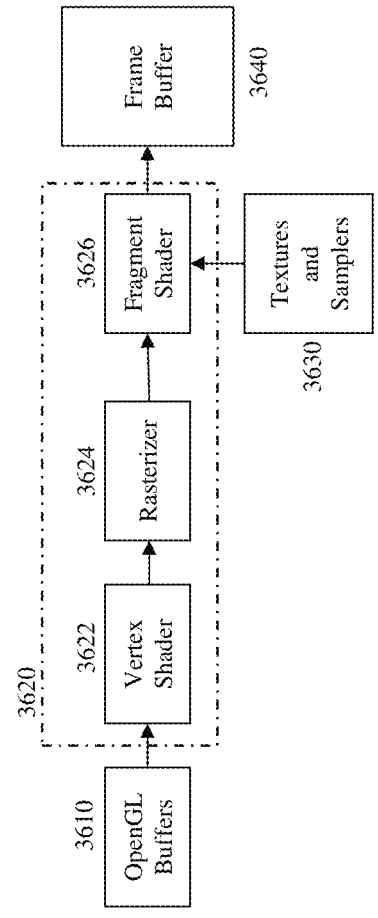
FIG. 36 depicts a typical graphics process unit (GPU) hardware pipeline.

In the instant disclosure general purpose graphics-processing units (GPUs) are employed to perform the electronic image pre-distortion. Typical prior art use of these processors is as shown in FIGS. 35 and 36. In FIG. 35 objects 3510 are first transformed in 3-space by the Vertex Shader 3520 shader to create a perspective view of the object 3530. A further vertex program 3540 then applies colouring information to each vertex of the object 3550. At this point the Fragment Shader 3560 performs colouring of the objects 3570. FIG. 20 depicts a typical GPU processing pipeline 3620 comprising a Vertex Hader 3622, Rasterizer 3624, and Fragment Shader 3626. The GPU 3620 reads OpenGL vertex buffers 3610 that define objects such as 3510. The Fragment Shader 3626 receives processed object data from the Rasterizer 3624 as well as Textures and Samplers 3630 that define how each object's surfaces shall be rendered into a Frame Buffer 3640. In these prior-use graphics applications:

there are typically hundreds if not thousands of objects to be displayed in a typical GPU image, for instance in gaming applications;
  each object will potentially have a different texture defined for its different surfaces;
  objects are translated and rotated in 3-space by a vertex-program prior to further processing;
  the fragment shader does no coordinate transformations, those having been performed earlier in the pipeline, but rather does texture-sampling and pixel-colouring of object surfaces only.

Figures 37, 38:
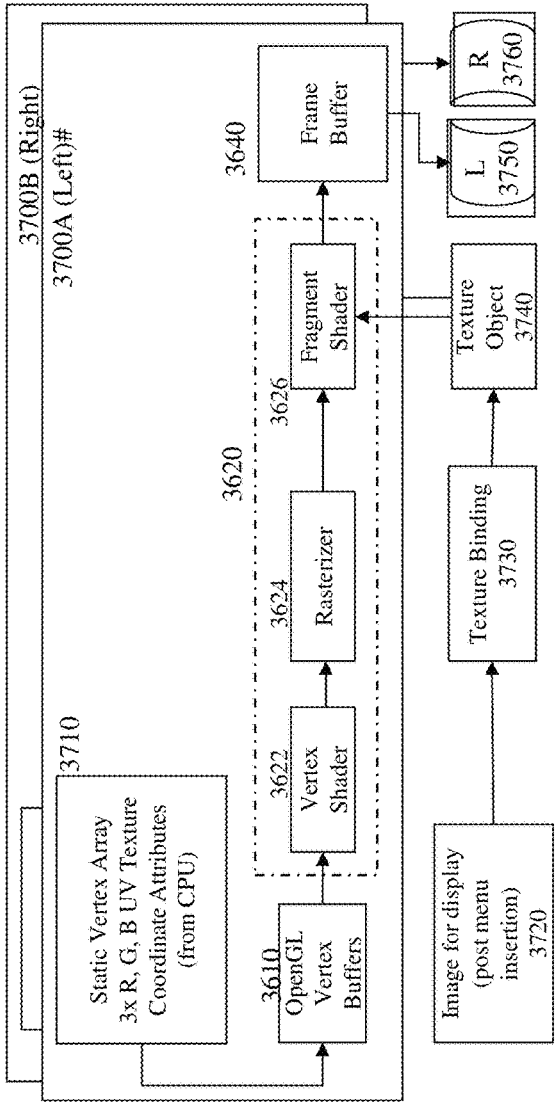
FIG. 37 depicts a novel means of performing image pre-distortion using a GPU to compensate for chromatic aberration in the optical train of an HMD.
FIG. 38 depicts OpenGL Vertex- and Fragment-shader programs that may operate on GPUs in order to perform the pre-distortion of FIG. 37.

Referring to FIG. 37 depicted schematically is a system employing a GPU pipeline for electronic image pre-distortion for the compensation of optical-train distortion and chromatic aberration. The regular Tessellation of the Display Area 3330 in XY-space (From FIG. 33) defines the vertices of the Static Vertex Array 3710. At each vertex location are also stored attributes defining the three UV-space coordinates that define the corresponding R, G, and B Distorted Tessellations 3320R, 3320G, 3320B. An OpenGL Vertex Buffer 3610 is prepared by the CPU and sent to the GPU. Provided the distortions in the optical train remains unchanged, there is no need to update this vertex buffer. If a need to perform alternate mappings is required, for instance as a result of user eye-motions, changes in the optical train, etc., the CPU may update the vertex buffer with new mappings. Images for display 3720 are bound 3730 to Texture Objects 3740 so that they may be accessed by the fragment shader. The pipeline of the GPU 3620 is comprised of a Vertex Shader 3622, Rasterizer 3624, and Fragment Shader 3626. The Rasterizer 3624 is not employed in this disclosure, as information is sent directly from Vertex Shader 3622 to Fragment Shader 3626, with a null Rasterizing function. After colouring by the Fragment Shader, frames in the Frame Buffer 3640 are sent for display. Note that portions of this process may be duplicated (3700A, 3700B) for each of left 3750 and right 3760 displays.

The programming of the GPU is depicted using OpenGL code in FIG. 38. In this figure:

lines 2-5 (Item 3810) define the Vertex Buffer 3610, wherein line 2 is the XY vertex location in display-space, and the next three lines define the R, G, and B UV coordinates in texture-space 3815;
  a pipeline binding 3820A, 3820B is defined to pass these additional UV coordinates forward through the GPU pipeline from Vertex to Fragment shader;
  the vertex program in lines 10-13 copies 3825 the vertex-buffer UV attributes to the bound pipeline variables VTexCoordRed, vTexCoordGreen, vTexCoordBlue;
  the fragment shader program performs not the typical one, but instead three separate and independent colour-assignments, each assignment to only one of the primary display colours. Further, each one of these independent colour-assignments uses a different UV-space coordinate-pair during texture-sampling 3830.

Now with reference to FIG. 34 indicating that an inverse-electronic pre-distortion mapping is required for the pre-compensation of the optical distortions that follow, and referring back to FIG. 33 regarding the tessellations, consider the effect of the program of FIG. 38 on pixels located near the bottom left of FIG. 33. During fragment-shading, and because the sampler is using the passed-forward UV coordinates, and not the display XY coordinates for sampling, the very bottom-left display pixel will get its colour information from image locations to the right within the image, as indicated by the warped tessellations 3320R, 3320G, 3320B. The colour information for the bottom-left pixel will be pulled independently for each of Red, Green, and Blue from the locations of the bottom-left corner of each of the three tessellations 3320R, 3320G, 3320B, respectively. Phrased another way, the image-content is "drawn inwards" by the optics as it transits the optical train at the bottom-left. During display, then, by "reaching inwards" for pixel-colouring information during texture-sampling, and since the texture contains the image data to be displayed, the image content is actually "pulled outwards" before it is displayed from the bottom-left pixel of the display, thus accomplishing the exact inverse-transform that is required, but without ever having to have ray-traced or computed the inverse of the original forward-transforms of the optics pipeline (3430R, 3430G, 3430B). The irregularly-shaped tessellations defined by the Red, Green, and Blue UV attributes in the vertex buffer represent the forward transforms 3440R, 3440G, 3440B, yet, because of the unique use of the GPU vertex and fragment shaders described in supra, a compensating and opposing set of mappings 3430R, 3430G, 3430B are achieved during final sub-pixel colour assignment, and thus mitigate and compensate for the distortions in the optical train.

Figure 39:
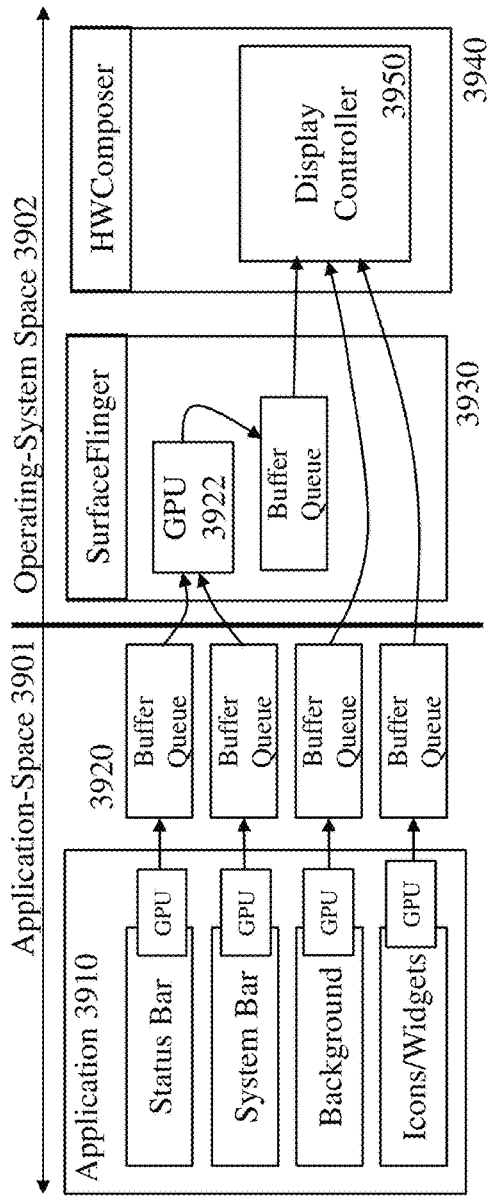
FIG. 39 depicts typical usage of an Android™ graphics software pipeline.

In some embodiments the HMD may run an operating system such as Android™ environment (note: "Android" is a trademark of Google LLC). Referring to FIG. 39 the standard Android™ graphics rendering structure is shown. Applications 3910 control the screen when running and may write to multiple layers for rendering, such as a status layer, a system bar layer, a background layer, and so on as shown. Typically a GPU may be employed to assist in drawing these screen-layers. These layers are then passed using BufferQueues 3920 to the Operating System, in this case to the SurfaceFlinger 3930 service. SurfaceFlinger 3930 may perform compositing of layers using the GPU 3922 as is shown for the top two BufferQueues, but the bottom two in this particular example can be composed directly by the Display Controller 3950 inside the Hardware Composer 3940.

Figure 40:
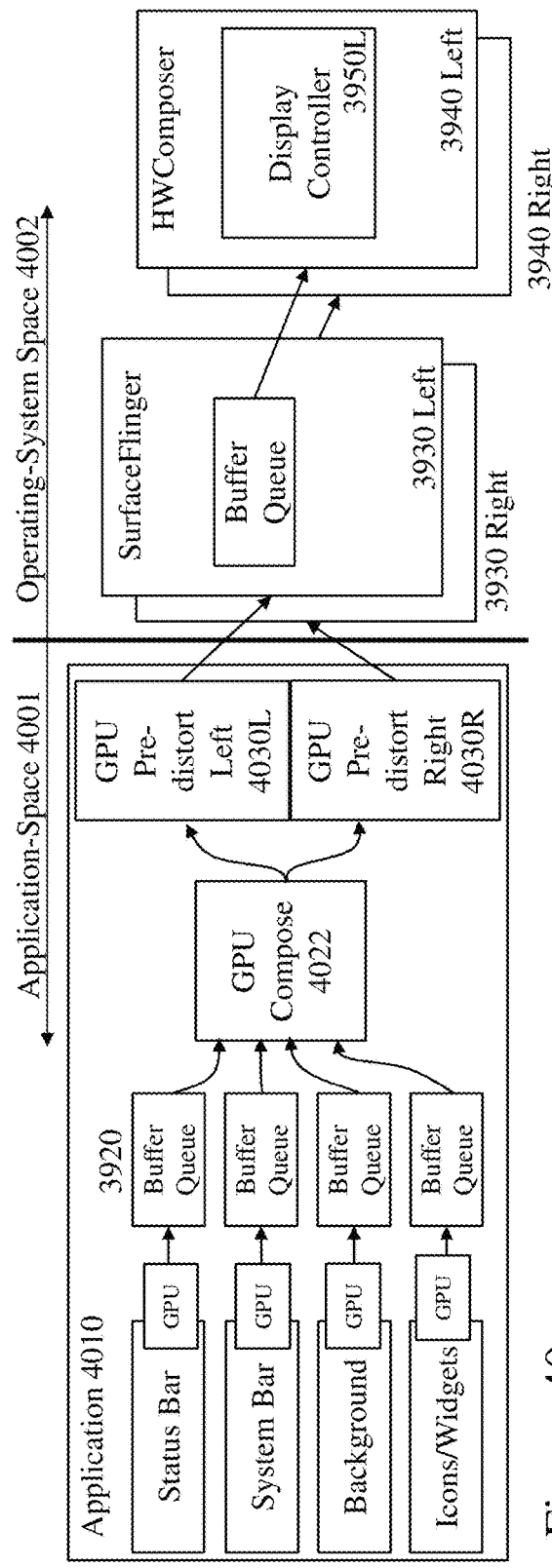
FIG. 40 depicts a prior-art implementation of the image pre-distortion of FIG. 37 using the Android™ graphics processing pipeline of FIG. 39.

Now referring to FIG. 40 there is depicted an implementation of image pre-distortion as described in supra and in U.S. Pat. No. 9,836,828 filed Apr. 22, 2016 entitled "Methods and Devices for Optical Aberration Correction" and related filings as implemented within an Android™ operating environment. As before, the Application 4010 may have multiple layers, each using BufferQueues 3920 to pass content to be rendered. However, because image-pre-distortion is required, the multiple layers should be composed together in application-space 4022. Image pre-distortion is also done by the GPU in application-space separately for left and right displays separately if needed, and passed as a single buffer-queue per display to SurfaceFlinger 3930, which essentially performs the null function of passing buffers to HWComposer 3940, which transparently passes frames to the Display Control 3950(L,R).

There are a number of disadvantages to the implementation of FIG. 40 wherein the image pre-distortion is applied within application-space as part of the application. This is necessary when operating on a standard operating system such as Android™ though, because the pre-distortion should be applied to all layers, and the SurfaceFlinger 3930 and Hardware Composer 3940 do not implement image manipulations, just the compositing of multiple layers. As in FIG. 39, each layer has its own BufferQueue 3920, but now instead of compositing in SurfaceFlinger 3930 or Hardware Composer 3940 as shown in FIG. 39, because of the image pre-distortion requirement, composition should now be performed in application-space so application-code should be written to do so. Pre-distortion for each of left 4030L and right 4030R displays is again done in application-space before buffer-queues are employed to pass image data to SurfaceFlinger 3930 for display on left and right displays. In this architecture applications should be hardware-aware and the operating system is under-utilized.

Figure 41:
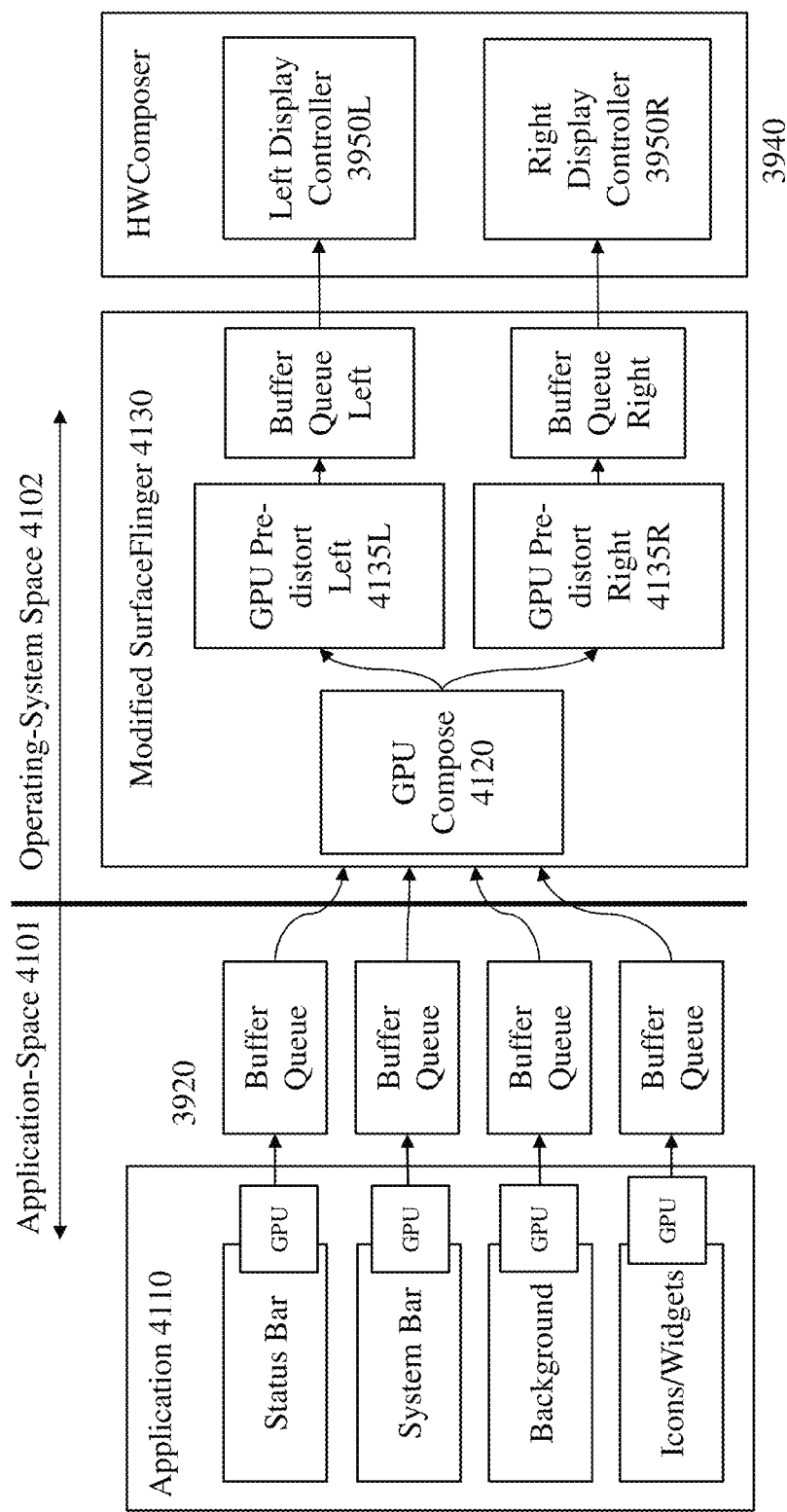
FIG. 41 depicts a fourth-generation pre-distortion architecture in which layer composition and image pre-distortion has been moved into the operating system layer.

Referring now to FIG. 41, the system has been re-architected to better employ the operating system and achieve application independence from hardware. In this architecture, SurfaceFlinger 4130 is modified to perform both a composition function 4120 and an image pre-distortion function 4135L. 4135R. As there is no composition to do in the HWComposer 4140, it simply passes data to Left Display 4150L and Right Display 4150R. This architectural approach of modifying SurfaceFlinger 4130 so as to move the image pre-distortion function from Application Space 4101 to Operating Systems Space 4102 is a significant factor in allowing a service-oriented architecture, where no one application is responsible for overall operation. Because in FIG. 41 the pre-distortion is now located in the Android™ graphics pipeline after the composition function, all layers may now be treated as standard Android™ screen layers, manipulated using standard libraries and operating system calls. Many different applications or mini-Applications and services and micro-services may now be written without having the burden of all the composing and image-manipulation code needing to be included in the application or service itself. In the case where the HMD display is to be mirrored upon another device, for instance during an eSupport micro-service 2420I session in which a caregiver desires to see the HMD user's view, a third screen rendering (left and right pre-distortions being the first two) may be performed in which no image pre-distortion is applied, and the composited image placed in virtual display implemented as a buffer in memory as opposed to a hardware display. The contents of this in-memory screen-buffer may then be streamed to the eSppport caregiver who is watching their view from a Web Application such as in FIG. 23 item 2325 over a protocol such as WebRTC.

Artificial Intelligence and Machine Learning in HMDS

HMDs typically have a variety of operating modes and parameters that should be set or configured before or during operation for any given Use Case, and these should be set in dependence upon a wide variety of factors, not limited to:
  user visual processing characteristics;
  user preferences;
  current user task;
  ambient conditions;
  image content;
  HMD hardware capabilities;
  HMD software capabilities.

Parameters and modes to be set may include but not limited to:
  camera focus, resolution and zoom-level;
  image contrast enhancement, binarization, and colour-mappings;
  other image enhancements e.g. edge detection and enhancement;
  image transforms for blind-spot avoidance;
  complex processes such as text identification and text-to-speech synthesis;
  display brightness and opacity.

Achieving optimal or even simply satisfactory device performance in the face of this complexity can be a daunting task. The instant application discloses below means by which machine learning can create optimized device operating parameters and modes for instance by a trained artificial neural network, and which thereafter might be set automatically by the same machine learning system or neural network.

Figure 42:
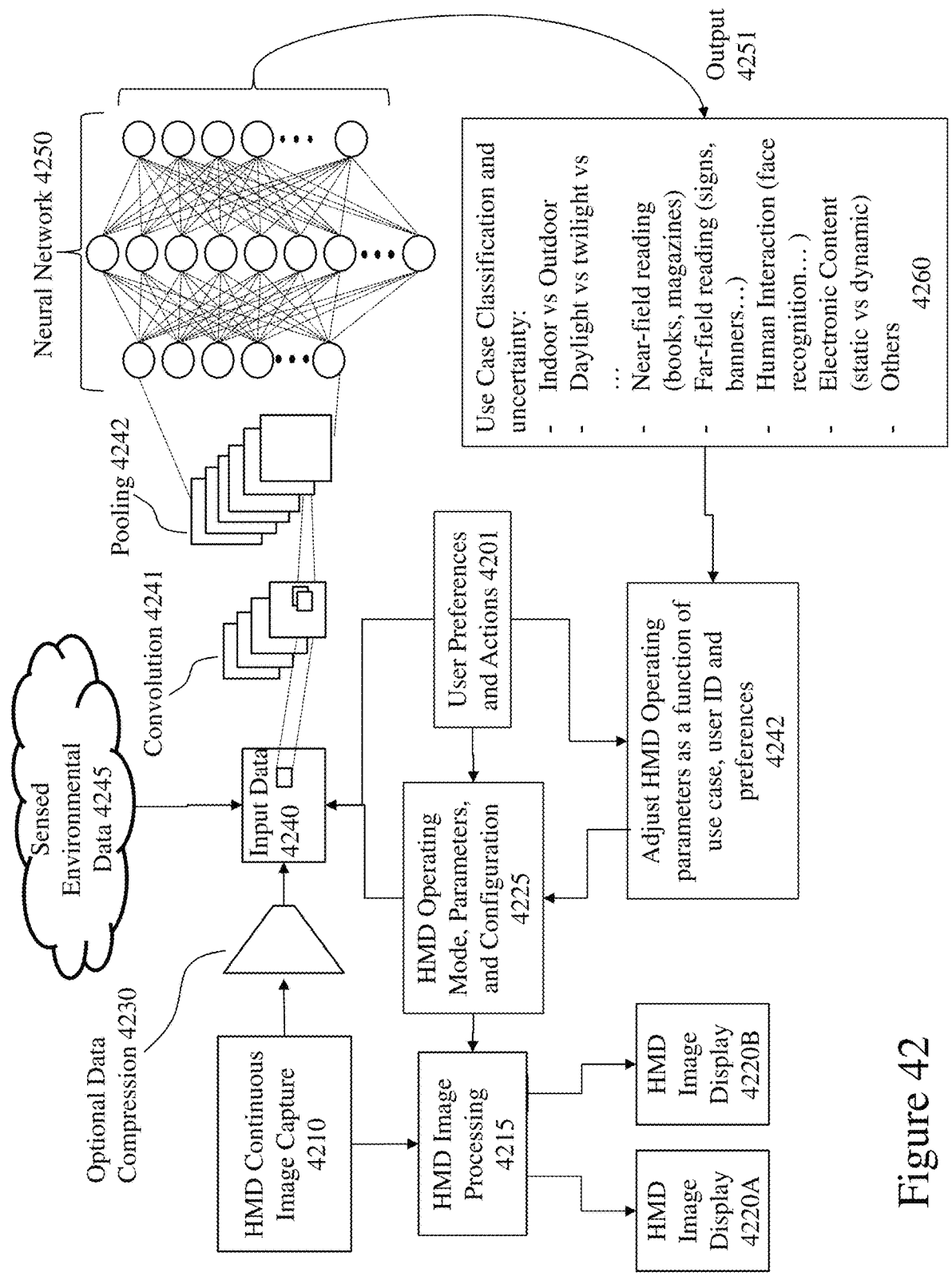
FIG. 42 depicts a closed-loop adaptive HMD based on neural network processing.

Referring to FIG. 42 there is depicted a system-level schematic of an HMD system incorporating a Neural Network 4250 for automated operation. During normal operation images are continuously captured by some image capture device 4210, which is processed upon the HMD 4215, in dependence upon HMD Operating Mode, Parameters and Configuration 4225 and are then displayed, typically to Left and Right eyes of a user 4220A, 4220B. In prior art, HMD Operating Mode, Parameters and Configuration 4225 are set manually, and elements 4230 through 4250 are absent, most notably the automated setting of HMD Operating Mode 4225 from 4242. FIG. 42, however, includes elements 4230 through 4270 in order to form a closed-loop system capable of learning, optimizing, and automating behaviours.

Captured images 4210 may be optionally pre-processed 4230 to reduce data bandwidth, and combined with Operating Parameters and Configuration 4225, Environmental Data 4245 (for example from ambient or other light sensors), and User Input 4201 to form an Input 4240 to a neural network processing system. Optional stages of Convolution 4241 and Pooling 4242 may precede the Neural Network 4250. The Output 4251 of the Neural Network is a classification of the Use Cases 4260 along with probabilities for each. Note that only a small sample of potential use cases are illustrated in 4260. An HMD-local function 4270, which may be implemented as a look-up table, another neural-network or other function takes as input the classification 4260 and the User Input 4201 to dynamically adjust the HMD Operating Mode, Parameters, and Configuration 4225, thus effecting an adaptation of the HMD Image Processing 4215 to the Use Case 4260 in real time.

Figure 43:
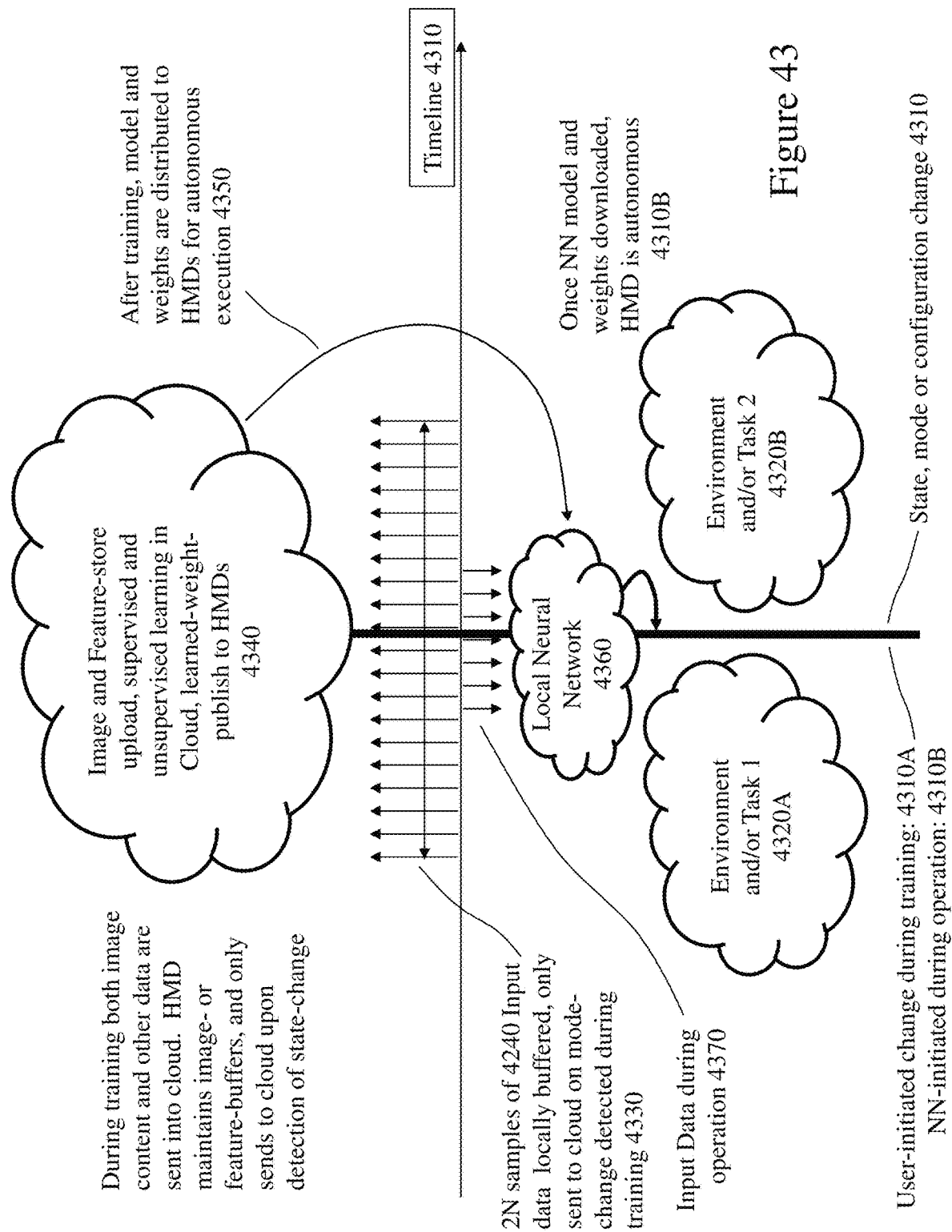
FIG. 43 depicts manual and automated mode-switching on an adaptive automated HMD, such as depicted in FIG. 42.

There are two phases to neural-network operation, the training phase, which may be supervised or unsupervised and that is highly computationally intensive, and the operating phase, which is much less so, though vector operations can be greatly assisted through co-processors such as Graphics Processing Units (GPUs) Digital Signal Processors (DSPs) or other hardware support. Referring to FIG. 43 a Timeline 4310 of a Change Event 4310 is depicted from a first Environment or Task 4320A to a second Environment or Task 4320B. During supervised training, the HMD continuously captures up to 2N samples 4330 of Input data 4240 for some integer N. Upon a user-initiated mode or configuration change 4310A, the 2N samples of Input Data 4240 are either pushed into the Cloud 4340 to be stored in a Training Set, or a local training function may be run upon the neural network model. A single service with two internal operating modes might be used for the neural network training versus operating modes, or different and independent micro-services might be used for each of these functions. If independent, these independent neural network services may operate simultaneously, both learning and autonomously controlling device operation. Upon collection of a sufficient number of Training Set Samples, the neural-network model may be designed, and weights may be trained either locally on the HMD or offline in the Cloud. After cloud-based training, the neural-network model and weights may be downloaded to the HMD 4350 for autonomous operation. Local-training information such as updated neural weights may be communicated from HMD to cloud. During the operating phase, Input Data 4240 are fed 4370 to the HMD-local implementation of the Neural Network 4360 (which may comprise also 4241, 4242, 4250) which then performs automated operating mode-changes 4310B on behalf of the user. Optionally the user may be prompted asking whether they would like to accept the new mode change, or not.

Within the Cloud 4340 during training, the collected Input Data 4240 will be analyzed. Training a neural network with a large number of nearly identical data (for example adjacent video frames) may actually hinder learning due to overfitting. Normalized mutual information, $F(f_i,f_j)$, will be used as a difference metric between video frames $f_i$ and $f_j$. Using an iterative algorithm, we will select N video frames before the transition and N video frames after the transition that minimizes $\Sigma_{i=1}^{2N}\Sigma_{j=1}^{2N}Y(f_i,f_j)$ for $i \neq j$. Images will also be analyzed using normalized mutual information to identify those that are similar. Because users may initiate mode-switching either before or after the task or environmental change for which the new mode applies, temporal shifting between user input actions and other captured Input Data 4240 may be used to achieve optimal temporal alignment of input data during supervised training. User input actions may be considered to have occurred earlier or later, or as an atomic mode-change even if the change required more than one step to complete, for instance adjustment of both brightness and contrast.

The Neural Network may operate as a micro-Service within the HMD. During training, the monitoring of environment and user and buffering of Input Data 4240 may be performed by a micro-Service. Data exchanged with the Cloud 4340 may be encrypted, and may use the Web API Gateway micro-Service 2420J for all external communications. A Neural Network Micro-Service may directly or indirectly, for instance through the WAG 2420J, or Update micro-Service 2420D, employ an MQTT subscription to be informed when new neural network models and weights are available.

The neural network may also be trained for a variety of other functions.

Struggling User: compare this user's behavior with itself with similar users' behaviours and detect anomalies where a user constantly repeats a behavior that might be automated by a neural network, where a user is operating their HMD outside of a normal range of operation, indicating potential device failure, where the neural network might proactively inform the device manufacturer, for instance using the WAG 2420J.

Field-of-view object identification: process field-of-view images to identify and classify objects according to safety, urgency, and interest. Curbs, stairs, obstacles and tripping hazards might be classified as safety hazards and made to flash rapidly in a recognizable way to the user, for example. Street signs, bus routes etc. might be urgent, store signs merely of interest. Each object-type might be differentially displayed. Further processing might also be used to establish object motion-vector information in 3-space, wherein rapidly approaching objects are highlighted distinctly or audibly, for example.

Adaptive User Interface: the neural network may be trained by observing the user's navigation of the user interface and seek to restructure the interface so as to reduce the number of user steps required to navigate to often-used configurations or menu locations. If the neural-network determines that a menu-restructuring is desirable, it may determine a new structure, and push that structure to the Cloud so that HMD support personnel can co-navigate the altered menu structure along with the user.

Intelligent fall detection: the HMD with a multiplicity of inertial and environmental sensors along with extensive communications capability is well suited for use of a neural network to filter out both false-positives and false-negatives. Filtering could employ a combination of acceleration above a threshold for a short time, followed by acceleration below a threshold for a long time, along with other sensor data remaining relatively static. Upon classifying the input as a "Fall Event" from which the user is not self-recovering, the HMD might make a direct mobile call to an emergency response number if it possesses a SIM and mobile radio itself, or use BLE pairing to a PED to cause it to dial out, or to send information over WiFi through the Wireless Access Gateway 2420J.

The NR2I HMD may operate upon captured images so as to improve the intelligibility of the image presented to the user, for instance employing contrast enhancement, increased colour saturation, cartooning, etc. The user may specify that the current image be saved as a JPEG file, for instance. In cases where the user has elected to save a captured image, the NR2I HMD operating mode and parameters may be saved as meta-data within or along with the JPEG image file along with the raw image, so that later post-processing and display software can both access the raw image as well as mimic the modified image that was displayed through the NR2I HMD to the user.

The Processor 1905 as described and depicted in FIG. 19 and the Hardware 2490 in FIG. 24 may comprise, within embodiments of the invention, a processing subsystem which contains both general purpose processor(s) and dedicated image processor(s) as well as volatile and non-volatile memories, input/output interfaces, and power control functions. The Wireless Interface 1910 as described and depicted in FIG. 19 may provide single wireless standard operation or multiple wireless standard operation on upon single bands or multiple bands. Within embodiments of the invention the Wireless Interface 1910 may provide a short-range wireless interface, e.g. Bluetooth, a medium range wireless interface, e.g. Wi-Fi, or a long-range wireless interface, e.g. Global System for Mobile Communications (GSM).

Optionally, the External Interface 1945 as described and depicted in FIG. 19 such as USB and/or HDMI interfaces allow for wired connectivity such that these may be employed to either provide image-data to the NR2I HMD for enhancement and display to the user, or they may be employed to transmit image data currently being presented to the user to another device, another display ("display replication"), or to a remote location, e.g. an ophthalmologist, eye physician, NR2I HMD supplier etc. Display-replication can be particularly useful during clinician-assisted training calibration, and device setup.

Optionally, the processing of image data may be solely within the NR2I HMD, solely within one or more remote servers to which the NR2I HMD is connected via a global communications network (commonly referred to as the "cloud") or an associated PED and/or FED or it may be alternatively distributed between two or more of these, capable of being executed independently upon two or more, or dynamically allocated according to constraints such as processor loading, battery status etc. Accordingly, the image acquired from a camera associated with the NR2I HMD may be processed by the NR2I HMD directly but image data to be displayed acquired from an external source processed by a PED for combination with that provided by the NR2I HMD or in replacement thereof. Optionally, processing within the NR2I HMD may be offloaded to the PED during instances of low battery of the NR2I HMD, for example, wherein the user may also be advised to make an electrical connection between the NR2I HMD and PED in order to remove power drain from the Bluetooth interface or another local LAN/PAN etc.

Accordingly, it would be evident to one skilled the art that the NR2I HMD with associated PED may accordingly download original software and/or revisions for a variety of functions including diagnostics, display image generation, and image processing algorithms as well as revised ophthalmic data relating to the individual's eye or eyes. Accordingly, it is possible to conceive of a single generic NR2I HMD being manufactured that is then configured to the individual through software and patient ophthalmic data. Optionally, the elements of the PED required for network interfacing via a wireless network (where implemented), NR2I HMD interfacing through a WPAN protocol, processor, etc. may be implemented in a discrete standalone PED as opposed to exploiting a consumer PED. A PED such as described in respect of FIG. 24 allows the user to adapt the algorithms employed through selection from internal memory as well as define an ROI through a touchscreen, touchpad, or keypad interface for example.

Further the user interface on the NR2I HMD may be context aware such that the user is provided with different interfaces, software options, and configurations for example based upon factors including but not limited to cellular tower accessed, Wi-Fi/WiMAX transceiver connection, GPS location, and local associated devices. Accordingly, the NR2I HMD may be reconfigured for the user based upon the determined context. Optionally, the NR2I HMD may determine the context itself based upon any of the preceding techniques where such features are part of the NR2I HMD configuration as well as based upon processing the received image from the camera and or ambient light sensor. For example, the NR2I HMD configuration for the user wherein the context is sitting watching television based upon processing the image from the camera may be different to that determined when the user is reading, walking, driving etc. In some instances, the determined context may be overridden by the user such as, for example, the NR2I HMD associates with the Bluetooth interface of the user's vehicle but in this instance the user is a passenger rather than the driver.

It would be evident to one skilled in the art that in some circumstances the user may elect to load a different image processing algorithm and/or NR2I HMD application as opposed to those provided with the NR2I HMD. For example, a third-party vendor may offer an algorithm not offered by the NR2I HMD vendor or the NR2I HMD vendor may approve third party vendors to develop algorithms addressing particular requirements. For example, a third-party vendor may develop an information sign set for the Japan, China etc. whereas another third-party vendor may provide this for Europe.

Optionally the NR2I HMD can also present visual content to the user which has been sourced from an electronic device, such as a television, computer display, multimedia player, gaming console, personal video recorder (PVR), or cable network set-top box for example. This electronic content may be transmitted wirelessly for example to the NR2I HMD directly or via a PED to which the NR2I HMD is interfaced. Alternatively, the electronic content may be sourced through a wired interface such as USB, I2C, RS485, etc. as discussed above. In the instances that the content is sourced from an electronic device, such as a television, computer display, multimedia player, gaming console, personal video recorder (PVR), or cable network set-top box for example then the configuration of the NR2I HMD may be common to multiple electronic devices and their "normal" world engagement or the configuration of the NR2I HMD for their "normal" world engagement and the electronic devices may be different. These differences may for example be different processing variable values for a common algorithm or it may be different algorithms.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Such variations and modifications of the embodiments described herein includes that specific dimensions, variables, scaling factors, ratios, etc. may be varied within different limits or that these may be approximate rather than absolute.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A near-to-eye (NR2I) head-mounted display (HMD) system comprising:
   a frame configured to encompass a head of a user;
   a first temple arm attached at a first end to a first side of the frame and configured to project forward along a first side of the head of the user;
   a second temple arm attached at a first end to a second side of the frame opposite the first side of the frame and configured to project forward along a second side of the head of the user opposite to the first side of the head of the user; and
   a display assembly attached at a first location to a second distal end of the first temple arm with a first universal joint and at a second location to a second distal end of the second temple arm with a second universal joint; wherein each of the first universal joint and the second universal joint provide for motion in two degrees of freedom with respect to the head of the user;
a first degree of freedom of the two degrees of freedom is rotational motion within a sagittal plane of the user;
the second degree of freedom of the two degrees of freedom is rotational motion within an axial plane of the user;
each of the first universal joint and the second universal joint are located proximal a first temple and a second temple of the user respectively when worn by the user;
the first temple arm is extensible and comprises a first thumbwheel and a first track wherein the first thumbwheel interacts with the first track to translate the first universal joint at the second distal end of the first temple arm relative to the first end of the first temple arm;
the second temple arm is extensible and comprises a second thumbwheel and a second track wherein the second thumbwheel interacts with the second track to translate the second universal joint at the second distal end of the second temple arm relative to the first end of the second temple arm; and
an eye-relief of the user with respect to the display assembly can be independently set for each eye of the user.

2. The NR2I HMD according to claim 1, wherein
the first temple arm is attached at the first end to the first side of the frame with a hinge which supports rotational motion of the first temple arm within a sagittal plane of the user;
the second temple arm is attached at the second end to the second side of the frame with another hinge which supports rotational motion of the second temple arm within a sagittal plane of the user.

3. The NR2I HMD according to claim 2, wherein
the hinge, the another hinge, the first universal joint and the second universal joint accommodate variations in a size of the frame of the NR2I HMD relative to a fixed size of the display assembly.

4. The NR2I HMD according to claim 1, wherein
the first universal joint and the second universal joint accommodate variations in a size of the frame of the NR2I HMD relative to a fixed size of the display assembly.

5. The NR2I HMD according to claim 1, wherein
the frame comprises:
  a first portion configured to fit around the front of the head of the user;
  a second portion configured to fit around the rear of the head of the user;
  a first track linking a first side of the first portion to a first side of the second portion along the first side of the head of the user;
  a second track linking a second side of the first portion to a second side of the second portion along the second side of the head of the user; and
  a thumbwheel disposed within the first portion; wherein
  the thumbwheel engages the first track and the second track such that rotation of the thumbwheel provides circumferential adjustment of the frame.

6. The NR2I display according to claim 5, wherein
each of the first portion of the frame and the second portion of the frame incorporate at least one hollow region housing one or more cables which run from the first portion of the frame to the second portion of the frame; and
the one or more cables are looped within the at least one hollow region to accommodate variations in the configuration of the frame to accommodate the head of the user; and
a portion of the one or more cables looped are either withdrawn from the at least one hollow region as the first portion of the frame and the second portion of the frame are translated away from each other or inserted into the at least one hollow region as the first frame portion of the frame and the second portion of the frame are translated towards each other.

7. The NR2I HMD according to claim 1, wherein
the first temple arm comprises a first sensor;
the second temple arm comprises a second sensor;
the first sensor and second sensor measure the eye-relief of the display assembly; and
a processor forming part of the NR2I HMD provides data to the user established in dependence upon the readings obtained from the first sensor and the second sensor.

8. A near-to-eye (NR2I) head-mounted display (HMD) comprising:
  a processor for executing software comprising instructions stored upon one or more non-volatile, non-transitory storage media; wherein
  the software when executed by the processor comprises:
    an operating system layer;
    an HMD-specific service layer comprising a plurality of HMD-specific services; and
    an HMD application-layer comprising a plurality of HMD applications; wherein
  the HMD-specific service layer provides the plurality of HMD-specific services to the plurality of HMD applications via one or more application programming interfaces; and
  each HMD application of the plurality of HMD applications is isolated from the remaining HMD applications of the plurality of HMD applications; and
  each HMD application of the plurality of HMD applications is isolated from the plurality of HMD-specific services.

9. The NR2I HMD according to claim 8, wherein
a HMD-specific service of the plurality of HMD-specific services allows a remote client in communication with the NR2I HMD to view content currently rendered to a user of the NR2I HMD and to adjust one or more elements of the NR2I HMD; wherein
the one or more elements are at least one of settings of the NR2I HMD, functions of the NR2I HMD, the mode of operation of the NR2I HMD, and the configuration of the NR2I HMD.

10. The NR2I HMD according to claim 8, wherein
a HMD-specific service of the plurality of HMD-specific services provides a platform service which starts and stops at least one of a HMD-specific service of the plurality of HMD-specific services and a HMD application of the plurality of HMD applications in dependence upon one or more events detected by a hardware portion of the NR2I HMD.

11. The NR2I HMD according to claim 8, wherein
a HMD-specific service of the plurality of HMD-specific services provides a platform service which starts and stops at least one of a HMD-specific service of the plurality of HMD-specific services and a HMD application of the plurality of HMD applications in dependence upon events detected by a hardware portion of the NR2I HMD; and the at least one of the HMD-specific service of the plurality of HMD-specific services and the HMD application of the plurality of HMD applications are established in dependence upon the one or more events detected by the hardware portion of the NR2I HMD.

12. The NR2I HMD according to claim 8, wherein
a HMD-specific service of the plurality of HMD-specific services acts as an intelligent gateway for a portion of the plurality of HMD-specific services; and the portion of the plurality of HMD-specific services require communications to or from mobile device which is paired with the NR2I HMD.

13. The NR2I HMD according to claim 8, wherein
a HMD-specific service of the plurality of HMD-specific services acts as an intelligent gateway for one or more other HMD-specific services of the plurality of HMD-specific services when the NR2I HMD is in communications with a mobile device.

14. The NR2I HMD according to claim 8, further comprising
a cloud-based service which maintains a list of current versions of local resources of the NR2I HMD; wherein a HMD-specific service of the plurality of HMD-specific services that acts as an update service for the NR2I HMD and which maintains a list of local versions of local resources;

another HMD-specific service of the plurality of HMD-specific services provides a communications service communicating with the cloud-based service through a communications interface of the NR2I HMD and acts as an intelligent gateway for the update service; and the update service and the communications service coordinate with the cloud-based service to download one or more files to the NR2I HMD and update the local resources of the NR2I HMD in dependence upon the downloaded one or more files such that the current versions of the local resources of the NR2I HMD match those specified with the list of current versions maintained by the cloud-based service.

15. The NR2I HMD according to claim 14, wherein
the communications service subscribes to Message Queueing Telemetry Transport (MQTT) topics on behalf of the update service; and the communications service interacts with the update service in dependence upon MQTT push notifications received from the cloud-based service.

16. The NR2I HMD according to claim 8, wherein
a HMD-specific service of the plurality of HMD-specific services is a neural network service;

the neural network service may operate in either of a training mode or an operating mode;

when operating in the training mode the neural-network service performs at least one of sends input data to a cloud-based neural network service for the purposes of collecting training, validating, and testing input data acquired from the NR2I HMD;

adjusts the weights of a local neural network in dependence upon input data; and when operating in the operating mode the neural network service processes input data acquired from the NR2I HMD using a local neural-network model in order to determine a current use classification;

the NR2I HMD applies image processing to acquired visual content to be displayed to a user of the NR2I HMD in dependence upon the current use case classification, and the input data is comprised of at least one of compressed or uncompressed NR2I HMD image data, a current NR2I HMD operating mode, one or more operating parameters of the NR2I HMD, a current configuration of the NR2I HMD, environmental data relating to an environment around a user of the NR2I HMD, one or more user preferences and one or more user actions.

17. The NR2I HMD according to claim 16, wherein
the neural network service operates in both training and operating modes simultaneously.

18. The NR2I HMD according to claim 16, further comprising
a HMD-specific service of the plurality of HMD-specific services is a gateway service which subscribes to a plurality of Message Queueing Telemetry Transport (MQTT) topics on behalf of the neural network service;

the gateway service translates and transforms the MQTT messaging into internal NR2I HMD operating system messaging;

the neural network service operates in dependence upon the internal NR2I HMD operating system messaging.

19. A near-to-eye (NR2I) head-mounted display (HMD) system comprising:
a frame configured to encompass a head of a user;

a first temple arm attached at a first end to a first side of the frame and configured to project forward along a first side of the head of the user;

a second temple arm attached at a first end to a second side of the frame opposite the first side of the frame and configured to project forward along a second side of the head of the user opposite to the first side of the head of the user;

a display assembly attached at a first location to a second distal end of the first temple arm with a first universal joint and at a second location to a second distal end of the second temple arm with a second universal joint; wherein each of the first universal joint and the second universal joint are located proximal a first temple and a second temple of the user respectively when worn by the user; and a battery housing configured to house a removable battery which provides electrical power to the NR2I HMD; and the removable battery which comprises one or more cells for storing electrical charge, an audiovisual output element, a processor and an inertial sensor; and the processor upon determining motion of the removable battery through measurements acquired from the inertial sensor generates an audiovisual output with the output element in dependence upon a state of charge of the one or more cells established by the processor.

20. The NR2I HMD according to claim 19, wherein
each of the first universal joint and the second universal joint provide for motion in two degrees of freedom with respect to the head of the user;

a first degree of freedom of the two degrees of freedom is rotational motion within a sagittal plane of the user;

the second degree of freedom of the two degrees of freedom is rotational motion within an axial plane of the user.

21. The NR2I HMD according to claim 19, wherein
the display assembly comprises one of more prism based optical display (POD) assemblies;

each POD assembly comprises a display for rendering content to a user of the NR2I HMD and an optical train for coupling the rendered content on the display to the eye of the user; and at least one of:

the optical train is a horizontally disposed freeform prism and the optical train is a horizontally disposed freeform prism with a freeform compensator for the user's direct field of view.

22. The NR2 HMD according to claim 19, wherein the display assembly comprises one of more prism based optical display (POD) assemblies; and each POD assembly comprises:
  a micro-display disposed in a predetermined position relative to the front of an eye of a user of the NR2I display;
  an optical train to couple the micro-display to the user's eye and allow the user to view their external environment through the optical train; and
  a plurality of micro-shutters disposed with respect to the optical train between the external environment and the optical train.

23. The NR2I HMD according to claim 19, wherein the display assembly comprises one of more prism based optical display (POD) assemblies;

each POD assembly comprises:
  a micro-display disposed in a predetermined position relative to the front of an eye of a user of the NR2I display;
  an optical train to couple the micro-display to the user's eye and allow the user to view their external environment through the optical train; and
  a plurality of micro-shutters disposed with respect to the optical train between the external environment and the optical train;

the user can view a synthesized image comprising a first portion provided by one or more display regions of the micro-display and a second portion provided by one or more environment regions of the external environment;

a first subset of the plurality of micro-shutters associated with the one or more display regions are configured to block the external environment; and a second subset of the plurality of micro-shutters associated with the one or more environment regions are configured to pass the external environment.

24. The NR2I HMD according to claim 19, wherein the display assembly comprises:
  a left optical assembly comprising a first micro-display disposed in a predetermined position relative to the front of a left eye of a user of the NR2I display and a first optical train to couple the first micro-display to the user's left eye; and
  a right optical assembly comprising a second micro-display disposed in a predetermined position relative to the front of a right eye of a user of the NR2I display and a second optical train to couple the second micro-display to the user's right eye; and the processor generates the content to be displayed by the first micro-display and the second micro-display; and the display assembly position can be adjusted towards or away from the head of the user by extending or retracting the first temple arm and the second temple arm;

the display assembly position laterally with respect to the head of the user can be adjusted by moving the display assembly with respect to the frame through the allowed motion of the first universal joint and second universal joint; and the display assembly position vertically with the respect to a line of sight of the user can be adjusted through the allowed motion of the first universal joint and second universal joint.

25. The NR2I HMD according to claim 19, further comprising a processor for executing software comprising instructions stored upon one or more non-volatile, non-transitory storage media; wherein the software when executed by the processor comprises:
  an operating system layer;
  an HMD-specific service layer comprising a plurality of HMD-specific services; and
  an HMD application-layer comprising a plurality of HMD applications; wherein the HMD-specific service layer provides the plurality of HMD-specific services to the plurality of HMD applications via one or more application programming interfaces; and each HMD application of the plurality of HMD applications is isolated from the remaining HMD applications of the plurality of HMD applications; and each HMD application of the plurality of HMD applications is isolated from the plurality of HMD-specific services.

26. The NR2I HMD according to claim 19, further comprising a battery housing configured to house a removable battery which provides electrical power to the NR2I HMD; and the removable battery; wherein the removable battery comprises:
  a means by which the processor detects insertion of the removable battery into the battery housing of the NR2I HMD;
  a means wherein the processor is able to control power-flow from the removable battery to the battery housing of the NR2I HMD; and
  wherein the processor disables power-flow when the insertion-detection means indicates to the processor that the removable battery is not inserted into the battery housing of the NR2I HMD.

* * * * *